(12) United States Patent
Kuribayashi

(10) Patent No.: US 12,061,742 B2
(45) Date of Patent: Aug. 13, 2024

(54) DISPLAY DEVICE AND CONTROL DEVICE

(71) Applicant: NIKON CORPORATION, Tokyo (JP)

(72) Inventor: Hidenori Kuribayashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/313,995

(22) PCT Filed: Jun. 28, 2017

(86) PCT No.: PCT/JP2017/023761
§ 371 (c)(1),
(2) Date: Apr. 15, 2019

(87) PCT Pub. No.: WO2018/003861
PCT Pub. Date: Jan. 4, 2018

(65) Prior Publication Data
US 2019/0243469 A1  Aug. 8, 2019

(30) Foreign Application Priority Data

Jun. 28, 2016  (JP) .................................. 2016-128211

(51) Int. Cl.
*G06F 3/01* (2006.01)
*G06F 3/0346* (2013.01)
(Continued)

(52) U.S. Cl.
CPC ............ *G06F 3/017* (2013.01); *G06F 3/0346* (2013.01); *G06F 3/041* (2013.01); *G06F 3/0412* (2013.01);
(Continued)

(58) Field of Classification Search
CPC ...... G06F 3/0346; G06F 3/041; G06F 3/0412; G06F 3/044; G06F 3/047; G09G 5/00;
(Continued)

(56) References Cited

U.S. PATENT DOCUMENTS

2005/0185276 A1    8/2005  Tomisawa et al.
2008/0074560 A1*   3/2008  Ichieda ............... H04N 9/3147
                                                             348/739
(Continued)

FOREIGN PATENT DOCUMENTS

CN       102668390 A       9/2012
JP       2005-234240 A     9/2005
(Continued)

OTHER PUBLICATIONS

Sep. 17, 2019 Office Action issued in Japanese Patent Application No. 2018-525216.
(Continued)

*Primary Examiner* — Wing H Chow
(74) *Attorney, Agent, or Firm* — Oliff PLC

(57) ABSTRACT

A display device includes: a first display unit that displays a first image at a remote position; a second display unit that displays a second image and a third image at a position different from a position of the first image, the third image having luminance different from luminance of the second image; a detection unit that detects an operation performed by a user with respect to the first image; and a display control unit that adjusts a display mode for at least either one of the first image displayed by the first display unit and the second image displayed by the second display unit, based upon the operation detected by the detection unit.

13 Claims, 36 Drawing Sheets

(51) Int. Cl.
*G06F 3/041* (2006.01)
*G06F 3/044* (2006.01)
*G06F 3/047* (2006.01)
*G09G 5/00* (2006.01)
*G09G 5/02* (2006.01)
*G09G 5/10* (2006.01)
*G09G 5/36* (2006.01)
*G09G 5/38* (2006.01)

(52) U.S. Cl.
CPC ............ *G06F 3/0418* (2013.01); *G06F 3/044* (2013.01); *G06F 3/047* (2013.01); *G09G 5/00* (2013.01); *G09G 5/02* (2013.01); *G09G 5/10* (2013.01); *G09G 5/36* (2013.01); *G09G 5/38* (2013.01)

(58) Field of Classification Search
CPC .. G09G 5/02; G09G 5/10; G09G 5/36; G09G 5/38
See application file for complete search history.

(56) References Cited

U.S. PATENT DOCUMENTS

| | | |
|---|---|---|
| 2010/0245345 A1 | 9/2010 | Tomisawa et al. |
| 2011/0151926 A1* | 6/2011 | Kim ........................ G06F 3/017 455/556.1 |
| 2012/0280987 A1 | 11/2012 | Iwane |
| 2013/0187852 A1 | 7/2013 | Ebina et al. |
| 2014/0015794 A1 | 1/2014 | Ueno et al. |
| 2015/0042640 A1* | 2/2015 | Algreatly ............. H04N 9/3185 345/419 |
| 2015/0279037 A1* | 10/2015 | Griffin .................. G09G 5/006 345/1.3 |
| 2016/0004114 A1 | 1/2016 | Kuramoto |

FOREIGN PATENT DOCUMENTS

| | | |
|---|---|---|
| JP | 2007-141082 A | 6/2007 |
| JP | 2009-011567 A | 1/2009 |
| JP | 2012-203737 A | 10/2012 |
| JP | 2013-168120 A | 8/2013 |
| JP | 2016-014777 A | 1/2016 |
| WO | 2009/044437 A1 | 4/2009 |
| WO | 2011/158911 A1 | 12/2011 |

OTHER PUBLICATIONS

Sep. 19, 2017 International Search Report issued in International Patent Application No. PCT/JP2017/023761.

Jul. 19, 2021 Office Action issued in Chinese Patent Application No. 201780050219.4.

Feb. 21, 2022 Office Action issued in Chinese Patent Application No. 201780050219.4.

Nov. 29, 2022 Office Action issued in Chinese Patent Application No. 201780050219.4.

* cited by examiner (a)

(b)

(c)

(a)

(b)

(c)

(a)

(b)

(c)

(b)

(c)

(a)

(b)

(a)

(b)

(a)

(b)

(a)

(b)

(a)

(b)

DISPLAY DEVICE AND CONTROL DEVICE

TECHNICAL FIELD

The present invention relates to a display device and a control device

BACKGROUND ART

There is an electronic device disclosed in the related art, which is capable of detecting an operation, performed with respect to a three-dimensional object displayed in midair, via a capacitive touch sensor that calculates the distance between a finger and a touch panel (see PTL 1). While PTL 1 describes that the electronic device detects an operation performed with respect to a three-dimensional object (target), full operability of operations performed with respect to the object is not assured in the art disclosed in PTL 1.

CITATION LIST

Patent Literature

PTL 1: Japanese Laid Open Patent Publication No. 2012-203737

SUMMARY OF INVENTION

According to the 1st aspect, a display device comprises: a first display unit that displays a first image at a remote position; a second display unit that displays a second image and a third image at a position different from a position of the first image, the third image having luminance different from luminance of the second image; a detection unit that detects an operation performed by a user with respect to the first image; and a display control unit that adjusts a display mode for at least either one of the first image displayed by the first display unit and the second image displayed by the second display unit, based upon the operation detected by the detection unit.

According to the 2nd aspect, a display device comprises: a first display unit that displays a first display image, displayed by a first display device, at a position set apart by a predetermined distance from the first display device; a second display unit that displays a second display image at a position different from a position of the first display image by a second display device, the second display image having a higher display luminance in an area other than an area corresponding to the first display image; an operation detection unit that detects an operation performed by a user for the first display image; an acquisition unit that sets a detection reference near the first display image and ascertains a positional relationship between the detection reference and the operation performed by the user; and a control unit that executes display control through which a display mode for the second display image displayed by the second display unit is altered in relation to the first display image displayed by the first display unit, based upon the positional relationship ascertained by the acquisition unit.

According to the 3rd aspect, a control device that controls a second display taking a position different from a position of a first display in midair, comprises: an acquisition unit that ascertains a positional relationship between a detection reference used to detect an operation performed by a user at the first display and a position at which the operation is detected; and a control unit that controls the second display based upon the positional relationship ascertained by the acquisition unit.

DESCRIPTION OF EMBODIMENTS

First Embodiment

In reference to drawings, the display device in the first embodiment will be described. The first embodiment will be described in reference to an example in which the display device in the embodiment is mounted in an operation panel. It is to be noted that the display device in the embodiment may be mounted in an electronic apparatus other than an operation panel. It may be mounted in, for instance, a portable telephone, a television set, a tablet terminal, a portable information terminal device such as a wristwatch-type terminal, a personal computer, a music player, a landline telephone unit or a wearable device. In addition, the display device in the embodiment may be integrated into an electronic system such as a digital signage system. Examples of such digital signage systems include a compact display unit built into, for instance, an automatic vending machine or the like or a large display unit, assuming a size greater than a typical adult person, which may be installed at a wall surface in a building. Furthermore, the display device in the embodiment may be built into, for instance, a panel of an automatic cash machine (ATM) at which the user enters a PIN number, an amount of money and the like on, a panel of an automatic ticket vending machine that dispenses railway tickets, bus tickets, commuter passes and the like, or a panel on any of various types of information search terminal systems installed in libraries, art galleries and the like. Moreover, the display device in the embodiment may be installed in any of various types of robots (including, for instance, mobile robots and electronic devices such as self-propelled vacuum machines).

Figure 1:
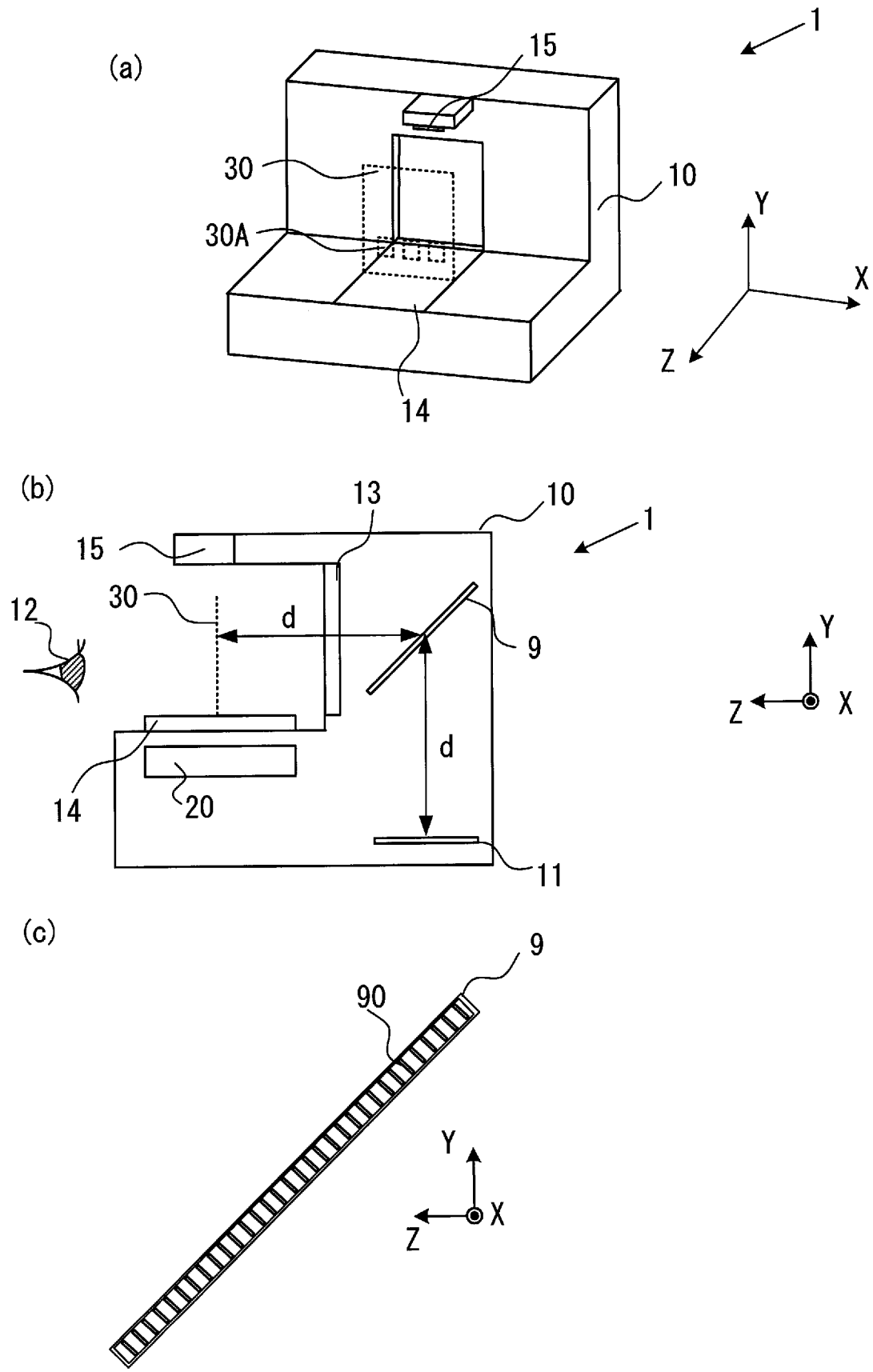
FIG. 1 Illustrations of the structure of the display device achieved in a first embodiment, in a perspective view in (a), in a sectional view in (b) and in a sectional view showing the structure of the image-forming optical system in (c)

FIG. 1($a$) is a perspective view of a display device 1, FIG. 1($b$) is a sectional view showing part of the display device 1 in an enlargement and FIG. 1($c$) is a side elevation providing an enlarged view of part of the display device 1. It is to be noted that for purposes of better clarity, the explanation will be given in reference to a coordinate system assuming an X axis, a Y axis and a Z axis, set relative to the display device 1 as indicated in the figures. It is to be also noted that the coordinate system set for these purposes does not need to be an orthogonal coordinate system assuming the X axis, the Y axis and the Z axis, and it may instead be a polar coordinate system or a cylindrical coordinate system. In other words, any of these coordinate systems may be set relative to the display device 1, as long as the X axis is set to extend along the shorter sides of the rectangular display area of the display device 1, the Y axis is set to extend along the longer sides of the rectangular display area of the display device 1 and the Z axis is set to extend along a direction perpendicular to the display area.

The display device 1 includes a body 10, having installed therein a control unit 20, an image-forming optical system 9, a display unit 11, an operation detector 13, a stage 14 and a projector 15. The image-forming optical system 9, the display unit 11, the operation detector 13, the stage 14 and the projector 15 are disposed inside the body 10. The display unit 11, constituted with, for instance, a liquid crystal display or an organic EL display, includes a plurality of display pixel arrays arranged in a two-dimensional pattern. Under control executed by the control unit 20, the display unit 11 displays an image corresponding to display image data.

As FIG. 1($c$) shows, the image-forming optical system 9, having a plurality of micromirror elements 90 disposed in a two-dimensional pattern therein, is set with a predetermined angle relative to the ZX plane, e.g., with a 45° tilt. The image-forming optical system 9 reflects light departing a display image brought up at the display unit 11 and advancing toward the + side along the Y direction, and thus forms a real image of the displayed image in the space above the stage 14 as a midair image or floating image 30. At this time, the midair image 30 is formed at a position that is symmetry with the display surface of the display unit 11 in relation to the image-forming optical system 9. This means that a distance d between the display surface at the display unit 11 and the image-forming optical system 9 and a distance d between the image-forming optical system 9 and the midair image 30 are equal to each other. As a result, a person operating the display device 1 (hereafter will be referred to as a user 12) is able to view the display image displayed at the display surface of the display unit 11 as the midair image 30 floating in the space above the stage 14. It is to be noted that a structure that may be adopted in such an image-forming optical system 9 is described, for instance, in Japanese Laid Open Patent Publication No. 2016-14777 in specific terms. In addition, the image-forming optical system 9 does not need to adopt the structure described above, and may instead include convex lenses. It is to be noted that convex lenses, depending upon their focal length, may assume a significant thickness along the optical axis and, for this reason, a Fresnel lens structure may be adopted instead. An optimal image-forming optical system 9 to be included in the display device 1 may be selected in correspondence to a specific set of requirements such as those descried above.

Furthermore, the display device 1 may display a midair image 30 by adopting the light-field method of the known art, as will be explained later in reference to variation 2 of the first embodiment.

In addition, the position at which the midair image 30 is displayed can be moved along the Z direction by allowing the distance d between the display unit 11 and the image-forming optical system 9 measured along the Y direction, to be variable. For instance, as the distance between the display unit 11 and the image-forming optical system 9 is reduced, i.e., as the display unit 11 is moved along a direction running toward the image-forming optical system 9, the midair image 30 is displayed at a position further away from the user 12 (toward the − side along the Z direction). If, on the other hand, the distance between the display unit 11 and the image-forming optical system 9 is increased, i.e., if the display unit 11 is moved along a direction running away from the image-forming optical system 9, the midair image 30 is displayed at a position closer to the user 12 (toward the + side along the Z direction). The display unit 11 can be moved along the Y direction via a drive device such as a motor, another type of actuator or the like (not shown).

It is to be noted that in conjunction with a certain type of image-forming optical system 9, the relationship may be reversed from that described above. Namely, as the display unit 11 is moved along a direction running toward the image-forming optical system 9, the midair image 30 may be displayed at a position closer to the user 12 (toward the + side along the Z direction). If, on the other hand, the distance between the display unit 11 and the image-forming optical system 9 is increased, i.e., if the display unit 11 is moved along a direction running away from the image-forming optical system 9, the midair image 30 will be displayed at a position further away from the user 12 (toward the − side along the Z direction). This means that the direction along which the display unit 11 is moved will be adjusted in correspondence to the type of image-forming optical system 9 being used.

The midair image 30 includes a plurality of icons 30A (operation buttons) corresponding to operation buttons via which various settings may be selected for the display device 1 and instructions for implementing various functions of the display device 1 may be issued. The icons 30A in the embodiment may be set over, for instance, one row by three columns.

The operation detector 13, disposed parallel to the XY plane at a position further toward the Z direction − side relative to the stage 14, which will be described later, may be configured with, for instance, a transparent capacitive panel (hereafter will be referred to as a capacitive panel) of the known art. The operation detector 13 configured with a capacitive panel forms an electric field with electrodes constituted of a substantially transparent material. When the user 12 moves his finger or a stylus toward the midair image 30 in order to perform an operation at the display position of the midair image 30, the operation detector 13 detects the position of the finger or the stylus as an electrostatic capacitance value. For instance, it may compare the electrostatic capacitance values detected at the four corners of the transparent capacitive panel so as to detect the position of the finger of the user 12 along the X axis and the Z axis based upon the electrostatic capacitance values detected at the four corners.

It is to be noted that the operation detector 13 may instead be disposed upon the stage 14 so as to range parallel to the ZX plane.

In addition, the operation detector 13 takes an electrostatic capacitance detection range, which is a predetermined range extending from its surface along the Z direction, as will be described in detail later. The operation detector 13 detects the distance between the operation detector 13 and the finger or the stylus present within the predetermined detection range (i.e., the position on the Y axis) based upon the electrostatic capacitance values detected at the four corners of the transparent capacitive panel by, for instance, comparing the electrostatic capacitance values detected at the four corners. It will be obvious that the midair image 30 must be formed via the image-forming optical system 9 so that it occupies a position within the predetermined detection range of the operation detector 13, and preferably a position around the midway point of the predetermined detection range along the Z direction. As described above, the operation detector 13 detects an operation performed at the display position of the midair image 30 by the user 12 with his finger or with a stylus, enabling the user 12 to perform operations with respect to the midair image 30 without having to directly touch the operation detector 13. It is to be noted that while the following description will be provided by assuming that the user 12 uses his finger to perform an operation at the display position of the midair image 30, the same principle will apply to an operation performed via a stylus or the like.

The stage 14 is disposed so that its surface ranges parallel to the ZX plane, and a midair image 30 is displayed above the stage 14. While the following description is provided by assuming that the stage 14 has a rectangular shape, the present embodiment may be adopted in conjunction with a stage taking any of various shapes such as a round shape and a polygonal shape, instead of a rectangular shape.

The projector 15, disposed upward relative to the stage 14 (toward the Y direction + side), projects a projection image onto the stage 14 by projecting image data formed on the display element toward the Y direction − side under control executed by the control unit 20. The projector 15 projects the projection image at a predetermined position relative to the position of the midair image 30.

Figure 2:
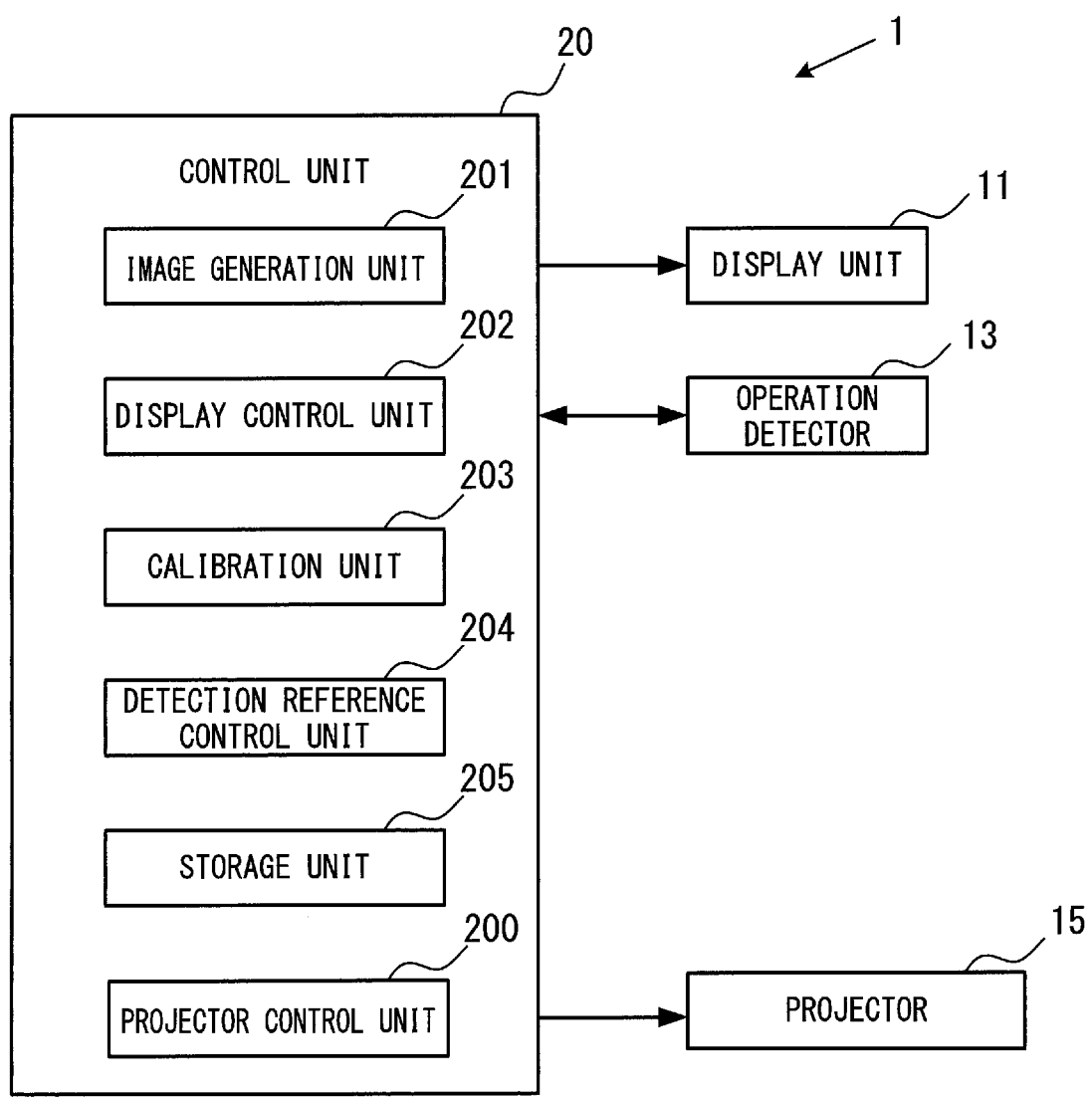
FIG. 2 A block diagram showing the essential configuration of the display device achieved in the first embodiment FIG. 3 A schematic presentation of a midair image displayed in the first embodiment in a schematic illustration in (a) and in sectional views, each indicating the relationship among the operation detector, the midair image and the detection reference, in (b), (c) and (d)

FIG. 2 is a block diagram showing the control unit 20, and the display unit 11 and the operation detector 13 controlled by the control unit 20, among the components configuring the display device 1. The control unit 20, comprising a CPU, a ROM, a RAM and the like, includes an arithmetic operation circuit that controls various structural elements of the display device 1, including the display unit 11 and the operation detector 13, based upon a control program and executes various types of data processing. The control unit 20 includes an image generation unit 201, a display control unit 202, a calibration unit 203, a detection reference control unit 204, a storage unit 205 and a projector control unit 200. The storage unit 205 includes a nonvolatile memory where the control program is stored, a storage medium where image data to be displayed at the display unit 11 and the like are stored, and the like. It is to be noted that the correspondence between the distance from the surface of the operation detector 13 to the fingertip and the electrostatic capacitance when the operation detector 13 detects the fingertip is stored in advance in the storage unit 205. Accordingly, as the fingertip is positioned within the predetermined detection range of the operation detector 13, the operation detector 13 is able to detect the electrostatic capacitance at the fingertip, and thus detect the position of the fingertip along the Z direction based upon the detected electrostatic capacitance and the correspondence stored in the storage unit 205, as explained earlier.

Based upon image data stored in the storage medium, the image generation unit 201 generates display image data corresponding to a display image to be brought up on display at the display unit 11. The display control unit 202 brings up the image corresponding to the display image data generated by the image generation unit 201 at the display unit 11. In addition, as the user 12 performs an operation at the display position of an icon 30A in the midair image 30, the display control unit 202 executes display image switchover control for the display unit 11 in correspondence to the type of the icon 30A that has been operated. It is to be noted that in response to an operation of user 12 performed at the display position of the icon 30A in the midair image 30, the display control unit 202 may execute control other than the display image switchover control for the display unit 11. For instance, assuming that the user 12 performs an operation at the display position of an icon 30A in the midair image 30 while a movie image is on display as the display image at the display unit 11, the display control unit 202 may execute control for playing the movie image currently displayed at the display unit 11 or for stopping the movie playback.

The calibration unit 203 executes calibration processing in first and second calibration processing modes, as will be described in detail later. The detection reference control unit 204 sets a detection plane, i.e., a detection reference, in the space above the stage 14. More specifically, the detection reference control unit 204 sets the detection reference at the position taken by (or at a position within a predetermined range from) the midair image 30 within the predetermined detection range of the operation detector 13. The detection reference control unit 204 also decides that the finger of the user 12 has reached the detection reference based upon an electrostatic capacitance value detected by the operation detector 13. Namely, the detection reference control unit 204 decides that the user 12 has performed an operation at the display position of the icon 30A when the finger position (the position on the X axis, the Y axis and the Z axis) corresponding to the value of the electrostatic capacitance detected by the operation detection unit 13 matches the position of the detection reference having been set. The detection reference control unit 204 sets the detection reference at a predetermined specific initial position. The initial position set for the detection reference is stored in advance in the storage unit 205. It is to be noted that the initial position of the detection reference may be a universal position shared by all users, or a different initial position may be set for each user 12 based upon the history of use of the display device 1 by the particular user 12. It is to be noted that the detection reference control unit 204 may adjust or correct the detection reference position based upon the results of calibration processing to be described later.

Furthermore, the position of the detection reference (its initial position and an adjusted or corrected position) may be set to range over the entire plane (over the X axis and the Y axis) of the operation detector 13 or may be set to range over only part of the plane. Moreover, the position of the detection reference, having been set when the display device 1 was last used and stored in the storage unit 205, may be read out and selected as the initial position of the detection reference. It is to be noted that the detection reference control unit 204 may decide that the user 12 has performed an operation at the display position of the icon 30A when the finger position corresponding to the electrostatic capacitance value detected by the operation detector 13 substantially matches the position of the detection reference, as well as when the finger position exactly matches the position of the detection reference. A specific range over which the finger position is considered to substantially match the position of the detection reference may be set in advance.

The projector control unit 200 projects an auxiliary image, which will help the user 12 perceive the position taken along the X direction and the Z direction by the midair image 30 brought up on display, onto the stage 14 by controlling the projector 15. This auxiliary image will be described in detail later.

FIG. 3(a) presents an example of a midair image 30 that may be displayed by the display device 1, and FIG. 3(b) and FIG. 3(c) schematically illustrate the positional relationship among the body 10 or the operation detector 13, the midair image 30 and a detection reference 40. FIG. 3(b) indicates the positional relationship between the midair image 30 and the detection reference 40 in a sectional view taken over a plane parallel to the YZ plane, whereas FIG. 3(c) indicates the positional relationship between the midair image 30 and the detection reference 40 in a sectional view taken over a plane parallel to the ZX plane.

The midair image 30 in FIG. 3(a), which is a first image (first display image), includes three icons 30A set over one row by three columns as explained earlier. The icons 30A constitute a first portion of the midair image 30, which is to be operated by the user 12. On the stage 14 located further downward (toward the Y direction − side) relative to the icons 30A, an auxiliary image 31 is projected by the projector 15. The auxiliary image 31, constituting a second portion different from the icons 30A constituting the first portion of the midair image 30, is an image used as a cue that helps the user 12 to perceive the positional relationship with respect to an icon 30A along the Z direction and is projected onto a specific projection area 140 on the stage 14. The auxiliary image 31 is composed of first ranges 311 and a second range 312. It is to be noted that the auxiliary image 31, the specific projection area 140, the first ranges 311 and the second range 312 will be described in detail later. The detection reference 40 in FIGS. 3(b) and 3(c) is set by the detection reference control unit 204 in the vicinity of the position taken by the midair image 30. More specifically, the detection reference 40 is set by the detection reference control unit 204 at a position slightly more toward the user 12 (toward the Z direction + side) in the example presented in the figures. An icon within the midair image 30 is indicated by a bold dotted lines 30A in FIG. 3(b). It is to be noted that while the icons 30A, which are part of the midair image 30, take up positions matching that of the midair image 30, the bold dotted lines indicating the icons 30A are offset from the solid line indicating the midair image 30 in FIGS. 3(b) and 3(c) so as to distinguish the icons 30A.

As shown in FIGS. 3(b) and 3(c), the operation detector 13 assumes an electrostatic capacitance detection range 13A set above the stage 14 (Y direction + side). In FIGS. 3(b) and 3(c), the electrostatic capacitance detection limit, present at a point taken along the Z direction further frontward (toward the + side along the Z direction) relative to the operation detector 13, is indicated with a dotted line 13a, and the interval between the electrostatic capacitance detection limit 13a and the operation detector 13 is indicated as an electrostatic capacitance detection range 13A.

In the example presented in FIG. 3(b), the detection limit 13a is set above the end of the stage 14 located on the Z direction + side. This means that the capacitance detection range 13A matches the length Hz of the stage 14 measured along the Z direction. Under these circumstances, since the stage 14 and the capacitance detection range are in alignment over the ZX plane, an operation performed by the user 12 in the space above the stage 14 can be detected by the operation detector 13. It is to be noted that the size of the stage 14 over the ZX plane does not need to match the capacitance detection range and a capacitance detection range smaller than the stage 14 may be set or a capacitance detection range greater than the stage 14 may be set instead.

The midair image 30 is formed above the stage 14, at a position set apart from the operation detector 13 by a distance H1 toward the + side along the Z direction. The detection reference 40 is set at a position upward relative to the stage 14, set apart from the operation detector 13 by a distance H2 (H1<H2) toward the + side along the Z direction. The midair image 30 and the detection reference 40 are set so as to take positions within the electrostatic capacitance detection range 13A. It is to be noted that while the detection reference 40 in FIGS. 3(b) and 3(c) is set further toward the + side along the Z direction relative to the midair image 30, it may instead be set further toward the − side along the Z direction relative to the midair image 30 or may be set in exact alignment with the position of the midair image 30, as long as it takes a position within the electrostatic capacitance detection range 13A of the operation detector 13. A range outside the area set for the detection reference 40 within the detection range 13A will hereafter be referred to as a detection reference outside range 41.

It is to be noted that the detection reference control unit 204 may adjust the position of the detection reference 40 described above by allowing it to move along the Z direction within the detection range 13A. For instance, the detection reference control unit 204 may move the detection reference 40, set as shown in FIGS. 3(b) and 3(c), toward the + side or the − side along the Z direction based upon the results of calibration processing executed as will be described later. While the midair image 30 and the detection reference 40 are shown in FIGS. 3(b) and 3(c) as flat planes ranging parallel to the XY plane, they do not need to be flat planes but instead may be curved planes. In addition, the detection reference 40 may include stages, each corresponding to one of the icons 30A, as indicated in FIG. 3(d), instead of being formed as a flat plane. In other words, the distance between a given icon 30A and the part of the detection reference 40 corresponding to the particular icon may be different from the distance between another icon 30A and the part of the detection reference 40 corresponding to the other icon. A detection reference 40 that includes the stages described above, is particularly effective when the midair image 30 is a stereoscopic image and the positions of the plurality of icons 30A are offset relative to one another along the Z direction. For instance, the positions of detection references 40, each corresponding to one of the icons 30A, may be offset in correspondence to the offset with which the plurality of icons 30A in the stereoscopic midair image 30 are shifted along the Z direction so as to ensure that the distances between the icons 30A and the corresponding detection references 40 remain constant. In addition, the position of a detection reference 40 among the detection references 40, each set in correspondence to one of the plurality of icons 30A shown in FIG. 3(d), may be adjusted by moving it independently. Namely, when calibration processing has been executed based upon an operation performed for the icon 30A located at the left end in the drawing sheet on which FIG. 3(d) is presented, the detection reference control unit 204 may move the position of the detection reference 40 set in correspondence to the icon 30A at the left end of the drawing along the Z direction. At this time, the detection reference control unit 204 does not change the Z-direction positions of the detection references 40 set in correspondence to the other icons 30A (the icons 30A at the center and at the right end in the drawing in FIG. 3(d)).

When the fingertip of the user 12 has reached a point set apart from the operation detector 13 by the distance H2, the operation detector 13 outputs a detection output corresponding to the distance H2. Based upon the detection output provided by the operation detector 13, the detection reference control unit 204 decides that the position of the fingertip of the user 12 has matched the detection reference 40 and accordingly decides that an operation has performed with his fingertip at the display position of an icon 30A. Through this process, the display device 1 detects an operation performed by the user 12 at the display position of the particular icon 30A in the midair image 30 and executes a function corresponding to the icon 30A having been operated. For instance, it executes display image switchover at the display unit 11.

The icons 30A take positions set apart from the operation detector 13 by the distance H1. The icons 30A are displayed as part of the midair image 30 and for this reason, the visual perception of the display positions of the icons 30A in the midair image 30, i.e., the distance H1, of one user 12 may be different from that of another user 12. In addition, the visual perception of the display positions of the icons 30A of a given user 12 may change depending upon the environment in which he operates the display device 1. For instance, when the detection reference 40 is set so as to align with the position of the midair image 30, a user 12 may move his finger toward an icon 30A in the midair image 30 in order to perform an operation at the display position of the particular icon 30A. In this situation, the user 12 may feel that there is still some distance between his finger and the icon 30A (the finger is still located toward the + side along the Z direction) although the finger has, in fact, reached the icon 30A, i.e., the detection reference 40. Under such circumstances, an unintended icon operation will be executed. Another user 12 may move his finger toward an icon 30A in the midair image in order to perform an icon operation. This user 12 may feel that his finger has reached the icon 30A and that he is therefore, performing an operation at the display position of the icon 30A, even though his finger is actually still located further toward the + side along the Z direction relative to the icon 30A, i.e., the detection reference 40. In this case, no icon operation will be executed, contrary to the intention of the user 12. In either scenario, the user 12 is bound to feel that the response to his efforts at icon operation is poor.

In addition to a midair image operation mode that may be set when performing operations for the midair image 30 as described above, a calibration processing mode can be set in the display device 1 in the embodiment, so as to improve the response to icon operations. The display device 1 set in the calibration processing mode adjusts the display mode for an auxiliary image 31, without altering the positional relationship between the midair image 30 and the detection reference 40. The auxiliary image 31, displayed in a predetermined fixed area (a second display area) includes a low-luminance region (first region) assuming a shape based upon the midair image 30, i.e., a first range 311, and a second region, i.e., a second range 312, with higher luminance than the first region, which is located outside the first region. Namely, the display device 1 displays a second image (second display image) with high display luminance over the second range 312 different from the first range 311, which is a region corresponding to the midair image 30, and displays a third image in the first range 311 with luminance different from the luminance of the second image. The display device 1 creates a perception in the user 12 as if the display position of the midair image 30 has moved along the Z direction (depthwise direction) by moving the position of the first region with the low luminance within the fixed area. Through these measures, the display device 1 ensures that an icon operation performed by the user 12 is detected at a position at which the detection reference 40 is set by leading the user 12 to adjust the position at which he performs the icon operation along the depthwise direction. The following is a detailed description of the calibration processing mode. It is to be noted that the low luminance region may be totally dark, i.e., the luminance may be set to 0.

It is to be noted that the display device 1 in the calibration processing mode may adjust the display mode for the auxiliary image 31 while also adjusting the positional relationship between the midair image 30 and the detection reference 40, instead of adjusting the display mode for the auxiliary image 31 without altering the positional relationship between the midair image 30 and the detection reference 40.

As explained earlier, first and second calibration processing modes are available in the display device 1 in the embodiment. In the first calibration processing mode, calibration processing is executed while the midair image operation mode is not in effect, i.e., while midair image operation mode execution is not underway. In the second calibration processing mode, calibration processing is executed while the midair image operation mode execution, following startup of the display device 1, is underway. The processing in the first and second calibration processing modes is executed by the calibration unit 203 shown in FIG. 2.

The first or second calibration processing mode may be selected by the user 12 via a calibration processing mode selector operation button (not shown) located at the display device 1. The control unit 20 may select and execute the midair image operation mode if neither the first calibration processing mode nor the second calibration processing mode has been selected via the calibration processing mode selector operation button. In addition, if the display device 1 does not have a calibration processing mode selector operation button, the second calibration processing mode may be a default mode. The first calibration processing mode and the second calibration processing mode will now be described in that order. It is to be noted that the first or second calibration processing mode may be selected via an icon in the midair image instead of via an operation button.

The first calibration processing mode will be explained first. As the display device 1 is started up, the user 12 may operate the calibration processing mode selector operation button to select the first calibration processing mode. The calibration unit 203 in FIG. 2 starts the first calibration processing mode once the first calibration processing mode has been selected in response to the operation performed by the user 12. The image generation unit 201 generates display image data, and the display unit 11 brings up a display image to be used in calibration processing based upon the display image data. The image generation unit 201 generates auxiliary image data and the projector 15 projects an auxiliary image 31 onto the stage 14 based upon the auxiliary image data.

FIG. 4(a) is a schematic illustration presenting an example of a midair image 300 of a display image generated for purposes of calibration processing, an auxiliary image 31 and a projection area 140 set on the stage 14, over which the auxiliary image 31 is projected. The midair image 300 includes a calibration icon 300A. The image generation unit 201 displays a message "Touch this icon for calibration", superimposed on the calibration icon 300A. It is to be noted that the image generation unit 201 does not necessarily have to display the message "Touch this icon for calibration" to start calibration processing. For instance, the user 12, having selected the calibration processing mode, may already be cognizant of a specific operation to be performed in the calibration processing mode and in such a case, the image generation unit 201 does not display the message.

In the embodiment, a shadow of the icon 300A is displayed as the auxiliary image 31. Namely, in the example described below, an image equivalent to a shadow that would be formed as the icon 300A, assuming that it is a physical object actually present in midair, was illuminated from above (from a point located on the Y direction + side), is displayed as the auxiliary image 31.

The projection area 140 is an area of the stage 14 over which an auxiliary image 31 is projected by the projector 15 when it casts projection light from the entire range over which the display elements are disposed. The embodiment will be described by assuming that the projection area 140 is set on the stage 14 over a predetermined range centered around the position set apart from the operation detector 13 by a distance H1 toward the Z direction + side. It is to be noted that a projection area 140 may be set in advance on the stage 14 and the projector 15 may project an auxiliary image 31 by casting projection light from a range, which is part of the overall display element range, corresponding to the projection area 140. In the example presented in FIG. 4, the projection area 140 ranges along the front/rear direction (toward the + side and the − side along the Z direction) so that its front and rear ends are each set apart by a distance h1 (<H1) from the position set apart from the operation detector 13 by the distance H1 further toward the Z direction + side relative to the operation detector 13. Namely, in the example presented in FIG. 4, the projection area 140 is set so as to range over part of the stage 14. It is to be noted that the present embodiment is not limited to the example presented in FIG. 4 and the projection area 140 may instead range over the entire area of the stage 14.

The image generation unit 201 generates auxiliary image data expressing a condition in which a shadow corresponding to the shape of the icon 300A is formed under the icon 300A, i.e., in the projection area 140 centered on the position set apart from the operation detector 13 by the distance H1. For instance, for an icon 300A assuming a prismatic shape, the image generation unit 201 will set the shadow in a rectangular shape, whereas for an icon 300A assuming a cylindrical column shape, on the other hand, the image generation unit 201 will set a circular shadow. Furthermore, for a planar icon 300A, the image generation unit 201 will set a linear shadow area. The shadow in the example presented in FIG. 4 takes a rectangular shape.

The image generation unit 201 generates auxiliary image data by selecting different display luminance levels for a range taking on a shape corresponding to the icon 300A and a range outside the range taking on a shape corresponding to the icon 300A. In this situation, the image generation unit 201 sets a low luminance level for the range taking on the shape corresponding to the icon 300A and a high luminance level for the outside range. Namely, the image generation unit 201 generates auxiliary image data by altering the luminance distribution based upon the shape of an icon 30A. The auxiliary image data projected by the projector 15 express an auxiliary image 31 that includes a first range (first region) 311 and a second range (second region) 312 with different luminance distributions, present within an area that is part of, and inside the projection area 140. As explained earlier, the auxiliary image 31 is projected inside a fixed area, which is part of, and inside the projection area 140. The first range 311, which assumes a shape corresponding to the icon 300A, is a low luminance region inside the auxiliary image 31, i.e., within the projection area 140. The second range 312, located outside the first range 311, is a high luminance region inside the auxiliary image 31. It is to be noted that while an explanation will be provided below on an example in which the first range 311 and the second range 312 are projected over an area that is only part of the projection area 140, the present embodiment is not limited to this example and the first range 311 and the second range 312 may instead be projected over the entire projection area 140. For purposes of clarification, the luminance distributions in the first ranges 311 and the second range 312 in the auxiliary image 31, are indicated by using dots in FIG. 3 and FIG. 4 so as to illustrate the first ranges 311 and the second range 312 as ranges having different luminance levels by adding dots at high density in the first ranges 311.

The image generation unit 201 generates auxiliary image data by setting a range corresponding to a first range 311 at a central area and setting a range corresponding to the second range 312 outside the range corresponding to the first range 311. The projector 15 projects the auxiliary image 31 onto the projection area 140 by projecting these auxiliary image data. Namely, the projector 15 projects the first range 311 at the position set apart from the operation detector 13 by the distance H1 toward the Z direction + side and projects the second range 312 outside the first range, as illustrated in FIG. 4(a).

It is to be noted that a control unit that controls operations of the projector 15 and a generation unit that generates auxiliary image data may be built into the projector 15. In such a case, the generation unit may generate auxiliary image data in much the same way as does the image generation unit 201 described above. In addition, the control unit that controls operations of the projector 15 may control an operation of the projector 15 so as to project an auxiliary image 31, based upon a control signal input thereto from the projector control unit 200 in the control unit 20.

As explained above, the first range 311 is a dark area with lower luminance relative to the second range 312, and thus, the user 12 will experience a perception as if the first range 311 is a shadow of the icon 300A formed as it is illuminated from above (from the + side along the Y direction). The user 12, looking at the midair image 300, perceives the position of the icon 300A in the midair image 300 along the Z direction based upon the positional relationship between the first range 311 projected onto the stage 14, which is an actual physical object, and the stage 14 itself. As a result, the user 12 perceives as if the icon 300A is displayed at a position set apart from the operation detector 13 by the distance H1. In other words, the display device 1 helps the user 12 ascertain the position of the midair image 300, provided as the first display, along the depthwise direction, i.e., the position of the detection reference 40, by providing the auxiliary image 31 as the second display.

FIG. 4(c) and FIG. 4(d) present an example in which the position at which the first range 311 is projected is adjusted toward the − side along the Z direction while the display positions at which the midair image 300 and the icon 300A are displayed remain unchanged from those in the initial display shown in FIG. 4(a) and FIG. 4(b). Namely, in this example, the image generation unit 201 has generated auxiliary image data by moving the range corresponding to the first range 311 toward the − side along the Z direction and the projector 15 has cast projection light based upon the auxiliary image data. The midair image 300 brought up on display retains transmissivity, and for this reason, the user 12 is not able to recognize the position of the midair image 300 in a stable manner. In other words, the display position of the midair image 300 is visually recognized by the user 12 as unstable along the Z direction. Accordingly, the display device 1 brings up on display the first range 311, equivalent to a shadow, near the midair image 300 as a cue with respect to the display position of the midair image 300 so as to create a perception in the user 12 as if the midair image 300 is displayed along the Z direction at the position of the first range 311. The user 12 thus observes, based upon the relative positional relationship of the low luminance first range 311 to the midair image 300 and the icon 300A, as if the icon 300A is located along the Z direction at the position taken by the first range 311 along the Z direction or a nearby position. This means that when the first range 311 is projected further away, as shown in FIG. 4(c) and FIG. 4(d), relative to the display position at which the midair image 300 and the icon 300A are displayed, viewed from the side where the user 12 is located, the user 12 perceives as if the icon 300A in FIG. 4(c) is located at a position further toward the − side along the Z direction relative to that in the initial display.

FIG. 4(e) and FIG. 4(f) present an example in which the position at which the first range 311 is projected is adjusted toward the + side along the Z direction while the display positions at which the midair image 300 and the icon 300A are displayed remain unchanged from those in the initial display. Namely, the image generation unit 201 has generated auxiliary image data with the range corresponding to the first range 311 shifted toward the + side along the Z direction and the projector 15 has cast the projection light based upon the auxiliary image data. In this situation, too, the user 12 observes, based upon the relative positional relationship of the first range 311 to the midair image 300 and the icon 300A, as if the icon 300A is located along the Z direction at the position taken by the first range 311 along the Z direction or a nearby position. This means that when the first range 311 is projected further frontward, as shown in FIG. 4(e) and FIG. 4(f), relative to the display position at which the midair image 300 and the icon 300A are displayed, viewed from the side where the user 12 is located, the user 12 perceives as if the icon 300A in FIG. 4(e) is located at a position further toward the + side along the Z direction relative to that in the initial display.

It is to be noted that while the position of the first range 311 taken along the Z direction on the stage 14 is shifted by projecting, via the projector 15, auxiliary image data generated by adjusting the range corresponding to the first range 311 in the example described above, the present embodiment is not limited to this example. For instance, the projector 15 may be disposed so as to be allowed to move along the Z direction, with a range corresponding to the first range 311 and a range corresponding to the second range 312 set in advance on the plurality of display pixels at the projector 15. As such a projector 15 moves along the Z direction in correspondence to a displacement quantity calculated as will be explained later, the position of the first range 311, too, will move.

In reference to FIG. 5, the position of the finger of the user 12 relative to a midair image 300 and the display of an auxiliary image 31, brought up during the calibration processing, will be explained. FIG. 5(a) presents a sectional view, schematically illustrating a relationship among the operation detector 13, the midair image 300, the detection reference 40 and the position of a finger F.

The detection reference control unit 204 sets the detection reference 40 at a position near the midair image 300, e.g., a position slightly more toward the Z direction + side relative to the midair image 300, as indicated in FIG. 5(a). It will be obvious that the detection reference control unit 204 may instead set the detection reference 40 so as to align it with the midair image 300 or may set it at a position slightly more toward the Z direction − side relative to the midair image 300. In this situation, the display control unit 202 may bring up on display, for instance, the midair image 300 shown in FIG. 4(a).

The user 12, following the instructions in the message superimposed on the icon 300A in the midair image 300, moves his fingertip F toward the icon 300A in order to perform an operation at the display position of the icon 300A, as shown in FIG. 5(a). As the fingertip F, moving toward the Z direction − side, reaches the electrostatic capacitance detection range 13A of the operation detector 13 shown in FIG. 2, the operation detector 13 detects the movement of the fingertip F of the user 12 approaching the icon 300A, i.e., the movement toward the − side along the Z direction, as a change in the electrostatic capacitance.

FIG. 5(b) shows the fingertip F having moved further toward the − side along the Z direction and having reached a position indicated by a dotted line 50 located slightly more toward the + side along the Z direction than the detection reference 40. It is assumed that the user 12, feeling that his fingertip F has reached the display position of the icon 300A and has performed an operation of "touching" (as if to press down) the icon 300A, has then moved the fingertip F toward the + side along the Z direction by a predetermined distance. The operation detector 13 detects the movement of the fingertip F toward the − side along the Z direction described above, i.e., the fingertip F pressing on the icon 300A, and the subsequent reverse movement by the predetermined distance as changes in the electrostatic capacitance. Once the operation detector 13 detects the fingertip F pressing on the icon 300A and the subsequent reverse movement of the fingertip F by the predetermined distance as described above, the detection reference control unit 204 decides that an operation has been performed at the display position of the icon 300A. It is to be noted that the furthest reach position to which the fingertip F of the user 12 moves inward (toward the − side along the Z direction) in order to press on the icon 300A for an operation at the display position of the icon 300A before the fingertip F moves in the reverse direction by the predetermined distance will be referred to as a reach position. Namely, the position indicated by the dotted line 50 will be referred to as the reach position.

If the reach position 50 is located closer to the user 12 (toward the + side along the Z direction) relative to the detection reference 40 as shown in FIG. 5(b), the operation detector 13 cannot detect the fingertip F of the user 12 at the detection reference 40. In this situation, the reach position 50 must move closer to the midair image 300, i.e., toward the − side along the Z direction, compared to the position shown in FIG. 5(b), in order for the fingertip F of the user 12 to be detected at the detection reference 40. The control unit 20 in the embodiment ascertains the positional relationship between the position at which an operation performed by the user 12 has been detected by the operation detector 13 and the detection reference 40, and adjusts the display mode for the auxiliary image 31 based upon this positional relationship. Through these measures, the display device 1 guides the fingertip F of the user 12 at the reach position 50 toward the Z direction − side relative to the position shown in FIG. 5(b). Namely, in order to create a perception in the user 12 as if a midair image 300' and an icon 300A' are located at the position indicated by the two-point chain line in FIG. 5(b), a first range 311' indicated with a dotted line is projected on the stage 14 so as to guide the fingertip F of the user 12 toward the − side along the Z direction relative to the position indicated in the figure. The image generation unit 201 adjusts the projection position at which the first range 311 is projected further downward relative to the icon 300A displayed as shown in FIG. 4(a) to the projection position indicated in FIG. 4(c). The image generation unit 201 generates auxiliary image data by moving the range corresponding to the first range 311 further toward the Z direction − side and the projector 15 projects projection light based upon these auxiliary image data. Namely, the image generation unit 201 controls the direction along which the first range 311 is to move based upon the positional relationship between the position at which the operation performed by the user 12 is detected and the detection reference 40. In this situation, the image generation unit 201 controls the direction along which the position of the gravitational center of the luminance distribution moves, as will be explained later, based upon the positional relationship between the position at which the operation performed by the user 12 is detected and the detection reference 40.

Through the process described above, the image generation unit 201 adjusts the projection position of the first range 311 so that the user 12 experiences a perception as if the display position of the icon 300A has moved along a direction determined based upon an operation performed by the user 12 pressing on the icon 300A, without altering the range of the auxiliary image 31. This means that the image generation unit 201 adjusts the projection position of the first range 311 relatively by adjusting the display mode for the second image (second display image) based upon the operation detected by the operation detector 13. It is to be noted that the user 12 performing a pressing operation does not need to move his finger strictly along the Z direction. Even when the user 12 performs a pressing operation at an angle relative to the Z axis, if a Z-direction component is included in the direction of the gesture, the control unit 20 may decide that the user 12 has performed a pressing operation. In response, the image generation unit 201 may adjust the projection position of the first range 311 so as to create a perception in the user 12 as if the display position of the icon 300A has moved along the Z direction, i.e., the direction determined based upon the pressing operation.

It is to be noted that the image generation unit 201 may adjust the projection position of the first range 311, i.e., the position of the gravitational center of the luminance distribution, which will be explained later, based upon a pressing operation performed by the user 12 so as to create a perception in the user 12 as if the display position of the icon 300A has moved along a direction matching that of the pressing operation performed by the user 12, determined based upon the pressing operation.

The image generation unit 201 determines a displacement quantity representing the extent to which the first range 311 is to move based upon the extent of offset between the detection reference 40 and the reach position 50, i.e., based upon the distance between them along the Z direction. The image generation unit 201 adjusts, based upon the distance having been determined, the position of the gravitational center of the luminance distribution in the auxiliary image data used for the initial display. Namely, if the reach position 50 is offset from the detection reference 40 toward the Z direction + side by an extent, i.e., an offset quantity of 2 cm, the image generation unit 201 determines a displacement quantity for the position of the gravitational center of the luminance distribution so as to shift the first range 311 toward the Z direction − side by an offset quantity of 2 cm. The displacement quantity thus determined for the first range 311 is stored into the storage unit 205.

The image generation unit 201 calculates a gravitational center position G of the luminance distribution as expressed in (1) below.

$$G = \frac{\sum_{j=1}^{k}\sum_{j=1}^{k}\binom{x_i}{y_j}f(x_i, y_j)}{\sum_{j=1}^{k}\sum_{j=1}^{k}f(x_i, y_j)} \quad (1)$$

(xi, yj) in equation (1) above indicates the coordinates of each display pixel among display pixels disposed in a k (rows)×k (columns) array and f(xi, yj) represents the luminance of the display pixel at the coordinate position (xi, yj).

It is to be noted that the display pixels disposed over k rows×k columns may correspond to the range made up with the entire first range 311 and the entire second range 312 or may correspond to a range that includes the entire first range 311 and part of the second range 312. Furthermore, the display pixels disposed over k rows×k columns may instead correspond to a range that is made up with a range that excludes part of the first range 311 and a range constituting part of the second range 312.

In addition, the present embodiment is not limited to the example in which the image generation unit 201 moves the gravitational center position of the luminance distribution as calculated in (1) above. For instance, the image generation unit 201 may calculate the center of the first range 311 and then calculate a displacement quantity for the center of the first range 311 based upon the offset quantity indicating the extent of offset between the detection reference 40 and the reach position 50.

It is to be noted that the displacement quantity for the first range 311 described above is determined so that it increases/decreases based upon an increase/decrease in the distance between the reach position 50 and the detection reference 40. The displacement quantity for the first range 311 may be determined so as to increase/decrease linearly based upon an increase/decrease in the distance between the reach position 50 and the detection reference 40 or may instead be determined so that they increase/decrease in steps each corresponding to an increase/decrease by a predetermined extent in the distance between the reach position 50 and the detection reference 40. Furthermore, the displacement quantity for the first range 311 may be determined so that it is changed by a predetermined fixed value regardless of the distance between the reach position 50 and the detection reference 40. In such a case, the predetermined value may be selected by the user 12.

The image generation unit 201 moves the projection position of the first range 311 by executing control so as to move the gravitational center position G of the luminance distribution having been calculated by the displacement quantity determined as described above along a direction determined based upon the positional relationship between the position at which an operation has been performed by the user 12 and the detection reference 40. As the projection position at which the first range 311 is projected on the stage 14 is adjusted as shown in FIG. 4(c) and FIG. 4(d) through this process, a perception is created in the user 12 as if the icon 300A has moved toward the Z direction − side, i.e., along a direction running further away from the user 12. In other words, the user 12 experiences a perception as if the midair image 300 and the icon 300A, which actually remain unmoved along the Z direction, have moved to the position indicated by the two-point chain line in FIG. 5(b). The user 12, perceiving as if the icon 300A is now displayed at a position further away from himself, is expected to perform an operation with respect to the icon 300A by positioning his fingertip F further toward the − side along the Z direction. As a result, the reach position 50 of the fingertip F of the user 12 will move further toward the − side along the Z direction relative to the reach position shown in FIG. 5(b), and the reach position 50 will arrive at the detection reference 40 as indicated in FIG. 5(c). Consequently, the operation detector 13 will be able to detect the fingertip F of the user 12 at the detection reference 40.

In the example described above, the reach position 50 of the finger is closer to the user (toward the + side along the Z direction) relative to the detection reference 40 and, as a result, the user operation cannot be detected at the detection reference 40. When the reach position 50 is located further away from the user (toward the − side along the Z direction) relative to the detection reference 40 and the user operation thus cannot be detected at the detection reference 40, too, the detection reference control unit 204 determines the reach position 50 and the image generation unit 201 adjusts the position of the first range 311 based upon the reach position 50 thus determined, in the same way as that described above. The positional relationship between the reach position 50 and the detection reference 40 under such circumstances is illustrated in FIG. 5(d). In this situation, the reach position 50 must move closer to the user 12, i.e., toward the Z direction + side, compared to the position shown in FIG. 5(d), in order for the fingertip F of the user 12 to be detected at the detection reference 40. This means that in order for the user to perceive as if a midair image 300' and an icon 300A' are located at the position indicated with the two-point chain line in FIG. 5(d), the fingertip F of the user 12 is guided further toward the + side along the Z direction relative to the position indicated in the figure by displaying a first range 311' on the stage 14 as indicated with the dotted line. The image generation unit 201 adjusts the projection position at which the first range 311 is projected as shown in FIG. 4(a) to the projection position indicated in FIG. 4(e) by controlling the gravitational center position G of the luminance distribution based upon the positional relationship between the reach position 50 and the detection reference 40. The image generation unit 201 generates auxiliary image data with the position of the first range 311 shifted toward the + side along the Z direction, and the projector 15 casts the projection light based upon the auxiliary image data.

In this case, too, the image generation unit 201 determines a displacement quantity for the first range 311, i.e., the gravitational center position of the luminance distribution, based upon the extent of offset between the detection reference 40 and the reach position 50, that is, based upon the distance between them along the Z direction. If the reach position 50 is offset toward the Z direction − side relative to the detection reference 40 by an offset quantity of 2 cm, the image generation unit 201 will determine a displacement quantity for the gravitational center position of the luminance distribution so that the first range 311 is moved toward the Z direction + side by a displacement quantity of 2 cm, as explained earlier. The displacement quantity determined for the first range 311 is stored into the storage unit 205. By adjusting the projection position of the first range 311 as shown in FIGS. 4(e) and 4(f), the display device 1 creates a perception in the user 12 as if the icon 300A has moved toward the Z direction + side, i.e., along a direction running closer to the user 12. The user 12, perceiving as if the icon 300A is now displayed at a position closer to himself, is expected to perform an operation with respect to the icon 300A by positioning his fingertip F further toward the + side along the Z direction. Consequently, the reach position 50 of the fingertip F of the user 12 will move further toward the + side along the Z direction relative to the reach position shown in FIG. 5(d), and the reach position 50 will arrive at the detection reference 40 as indicated in FIG. 5(c). As a result, the operation detector 13 will be able to detect the fingertip F of the user 12 at the detection reference 40.

The image generation unit 201 adjusts the projection position of the first range 311 so as to create a perception in the user 12 as if the projection position of the icon 300A has moved along a direction opposite from the direction determined based upon the pressing operation performed by the user 12 pressing on the icon 300A. It is to be noted that the user 12 performing a pressing operation does not need to move his finger strictly along the Z direction. Even when the user 12 performs a pressing operation at an angle relative to the Z axis, as long as a Z-direction component is included in the direction of the gesture, the control unit 20 decides that the user has performed a pressing operation. In response, the image generation unit 201 may adjust the projection position of the first range 311 so as to create a perception in the user 12 as if the display position of the icon 300A has been altered along the Z direction, i.e., the direction determined based upon the pressing operation.

It is to be noted that the image generation unit 201 may adjust the projection position of the first range 311, i.e., the gravitational center position G of the luminance distribution, based upon a pressing operation performed by the user 12 so that a user perception is created as if the display position of the icon 300A has been altered along a direction opposite that of the pressing operation performed by the user 12, determined based upon the pressing operation.

It is also to be noted that the image generation unit 201 may adjust the gravitational center position of the luminance distribution in the auxiliary image data by altering the shape of the first range 311 in FIGS. 4(c) and 4(e) from that of the first range 311 in the initial display.

In addition, when the reach position 50 is at the detection reference 40, too, the detection reference control unit 204 determines the reach position 50 in the same way as that described above. However, since the reach position 50 is at the detection reference 40, the image generation unit 201 does not adjust the projection position of the first range 311 to create a perception in the user 12 as if the depthwise position of the icon 300A has changed.

In addition, when the reach position 50 is further away from the user (toward the − side along the Z direction) relative to the detection reference 40, the fingertip F will have passed through the detection reference 40 before the fingertip F reaches the reach position 50. In this situation, the detection reference control unit 204 decides that the finger has reached the detection reference 40 based upon the detection output provided by the operation detector 13. However, the image generation unit 201 does not switch the display at the display unit 11 in the first calibration processing mode. Likewise, when the reach position 50 is aligned with the detection reference 40, the image generation unit 201 does not switch the display at the display unit 11 either. It will be obvious that when the fingertip F has moved to reach the detection reference 40, the image generation unit 201 may notify the user 12 that the fingertip F has reached the detection reference 40 with, for instance, a highlighted display of the icon 300A by flashing the icon 300A.

While the user 12 presses on the icon 300A as an operation performed at the display position of the icon 300A in the example described above, the present embodiment is not limited to this example. Namely, when the operation detector 13 has detected a predetermined non-contact operation performed by the user 12 in relation to the icon 300A, the image generation unit 201 may adjust the position of the first range 311 based upon the location where the predetermined non-contact operation was performed, i.e., based upon the position at which the predetermined non-contact operation has been detected by the operation detector 13. The predetermined non-contact operation may be performed by the user by making a gesture as if to touch the icon 300A. In response, the image generation unit 201 may adjust the position of the first range 311 based upon the position at which the user has made the gesture of touching the icon 300A. The operation performed by the user 12 making a gesture of touching the icon 300A may be, for instance, a gesture of swiping the icon 300A with his hand. In addition, the position at which the user 12 has performed the operation by making a gesture of touching the icon 300A may be determined based upon the position at which the hand of the user 12, having made the swiping gesture, is determined to have become still or based upon the position at which the user 12 has started making the swiping gesture.

Furthermore, the user 12 may perform the predetermined non-contact operation by moving his finger F further away (toward the Z direction − side) by a distance L1, then making a U-turn and moving it back (toward the Z direction + side) by the distance L1. Namely, the predetermined non-contact operation in this instance follows a U-turn trajectory with the traveling distance over which the finger moves away from the user and the traveling distance over which the finger moves back toward the user match each other. Moreover, the predetermined non-contact operation may follow a trajectory in the shape of the letter V instead of a U. Additionally, the predetermined non-contact operation may be performed by first advancing the finger F away from the user by the distance L1 and then bringing it back by the distance L1 along the advancing locus. Alternatively, the traveling distance L1 away and the traveling distance L1 back in the predetermined non-contact operation may be different from each other. Namely, the predetermined non-contact operation simply needs to be performed by moving the finger back toward the user continuously after it has been moved away from the user.

Furthermore, the user 12 may perform the predetermined non-contact operation by first moving the finger F away from himself by the distance L1 and then holding the finger F still over a predetermined length of time, or by first moving the finger F away from himself by the distance L1 and then moving the finger F laterally over at least a predetermined distance L2.

The predetermined non-contact operations that may be performed are not limited to those represented by the various trajectories of the finger F described above and the user may perform a non-contact operation that follows another trajectory as long as the trajectory of movement (the trajectory of the movement of the finger F or a hand) can be detected by the operation detector 13. It is to be noted that an optimal detection position, corresponding to a given predetermined non-contact operation, may be set as the predetermined non-contact operation detection position for the operation detector 13. For instance, when the user 12 performs the predetermined non-contact operation by moving his finger F away from himself by the distance L1 and making a U-turn and moving his finger F back toward himself by the distance L1, the most advanced position (furthest toward in the Z direction − side) at which the U-turn is made may be designated as the non-contact operation detection position. In another example, the predetermined non-contact operation detection position may be set at a point halfway through the distance L1.

It is to be noted that the method through which the reach position 50 is determined by the detection reference control unit 204 is not limited to that described above, in which the reach position 50 is determined based upon the shift from the advancing movement to the retreating movement by the predetermined distance and it may be determined through any of the various other methods to be described below. For instance, the user 12, perceiving that his fingertip F, having reached the display position of the icon 300A, has pressed on the icon 300A, may stop moving his finger toward the Z direction − side, i.e., may stop pressing on the icon 300A. In this case, the detection reference control unit 204 may decide that the finger has stopped pressing on the icon when there is no longer any significant change in the value of the electrostatic capacitance detected by the operation detector 13, and may determine, i.e., decide, the position at which the finger has stopped pressing on the icon as the reach position 50. It is to be noted that it may decide that the movement toward the Z direction − side has stopped when the value of the electrostatic capacitance detected by the operation detector 13 has remained unchanged for a short span of time of, for instance, 0.1 sec through 1 sec. In another method, the detection reference control unit 204 may detect the velocity vector of the movement of the finger of the user 12, i.e., the finger movement velocity and the finger movement direction, based upon a change in the electrostatic capacitance. Based upon the change in the electrostatic capacitance, the detection reference control unit 204 may detect that the direction of the finger velocity vector has changed from the direction running toward the Z direction − side to the direction running toward the Z direction + side, and as the velocity vector along the direction running toward the Z direction + side reaches a predetermined level, the detection reference control unit 204 may designate the position of the finger at the point at which the velocity vector toward the Z direction + side achieves the predetermined level, as the reach position 50. If the predetermined level for the velocity vector is set substantially equal to 0, the position taken by the finger when the direction of the velocity vector shifts from the direction running toward the Z direction − side to the direction running toward the Z direction + side, i.e., the most advanced position taken by the finger, will be determined to be the reach position. If, on the other hand, the predetermined level is set to a value other than 0 in this method, a position taken by the finger, set apart from the most advanced position by a predetermined distance along the reverse direction is designated as the reach position 50. As explained above, the reach position 50 is set at the most advanced position or at a position near the most advanced position taken by the fingertip F as the finger is judged by the detection reference control unit 204 to have performed an operation.

In addition, the detection reference control unit 204 determines the reach position in reference to the part of the finger or the stylus appearing to come in contact with the icon 300A in the midair image 300, i.e., the position of the fingertip or the position of the tip of the stylus, in the example presented above. As an alternative, the detection reference control unit 204 may determine the reach position in reference to the position of the fingernail tip of the finger of the user 12 or in reference to the position of the first joint of the finger. Furthermore, the icon may be operated with the user's foot or elbow instead of the finger of the user 12, and in such a case, the detection reference control unit 204 may determine the reach position in reference to the foot or the elbow. When the icon operation is performed via a stylus, a specific position on the stylus may be marked and the detection reference control unit 204 may determine the reach position in reference to the marked position. It is desirable that when the reach position is determined in reference to the position of the first joint of the finger, the position of a mark on the stylus or the like, the operation detector 13 be configured with an image-capturing device or the like, such as that to be described later in reference to variation 8, instead of the capacitive panel.

Moreover, while the detection reference 40 is a single plane or multiple planes defined in stages in the description provided above, the detection reference 40 may be formed as a zone with a predetermined depth present between a front plane (located toward the + side along the Z direction) and a rear plane (located toward the − side along the Z direction). In such a case, the rear plane of the detection reference 40 may be set closer to the user (toward the + side along the Z direction) relative to the midair image 30, the front plane may be set further away from the user (toward the − side along the Z direction) relative to the midair image 30, or the detection reference 40 may be set so that the midair image 30 is positioned between the front plane and the rear plane. In conjunction with this detection reference, the detection reference control unit 204 is able to make an even more reliable decision regarding the operation performed at the display position. For instance, the finger may move from a position diagonally offset from the icon 30A instead of from a point directly in front of the icon 30A, along the Z axis. In such a case, if the detection reference 40 is a planar reference such as that shown in FIG. 3, the finger may not pass through the detection reference 40 in an area thereof corresponding to the position of the icon 30A and instead may pass through an area beside the detection reference 40. Under such circumstances, the detection reference control unit 204 may not be able to make a decision regarding the operation performed by the finger at the display position of the icon 30A. However, a detection reference 40 having a predetermined thickness enables the detection reference control unit 204 to detect the finger entering the detection reference 40 with high reliability even when the finger moves from a diagonally offset point. In addition, even when the finger moves parallel to the midair image 30 to perform an operation at the display position of the icon 30A, too, the detection reference control unit 204 is able to detect with high reliability that the finger has entered the detection reference 40 since it has a predetermined thickness.

It is to be noted that if the predetermined non-contact operation is not performed within the detection reference 40 having a predetermined thickness, as described above, the detection reference control unit 204 makes a decision that the predetermined non-contact operation has not been performed. For instance, the user 12 may perform the predetermined non-contact operation by first moving his finger F away from himself by a predetermined distance L1, then making a U-turn and moving the finger F back toward himself by the distance L1. However, the user 12 having moved his finger F away from himself by the distance L1 within the detection reference 40 may only move the finger F toward himself over a distance short of the distance L1. In such a case, the detection reference control unit 204 makes a decision that the predetermined non-contact operation has not been performed by the user 12.

Figure 3:
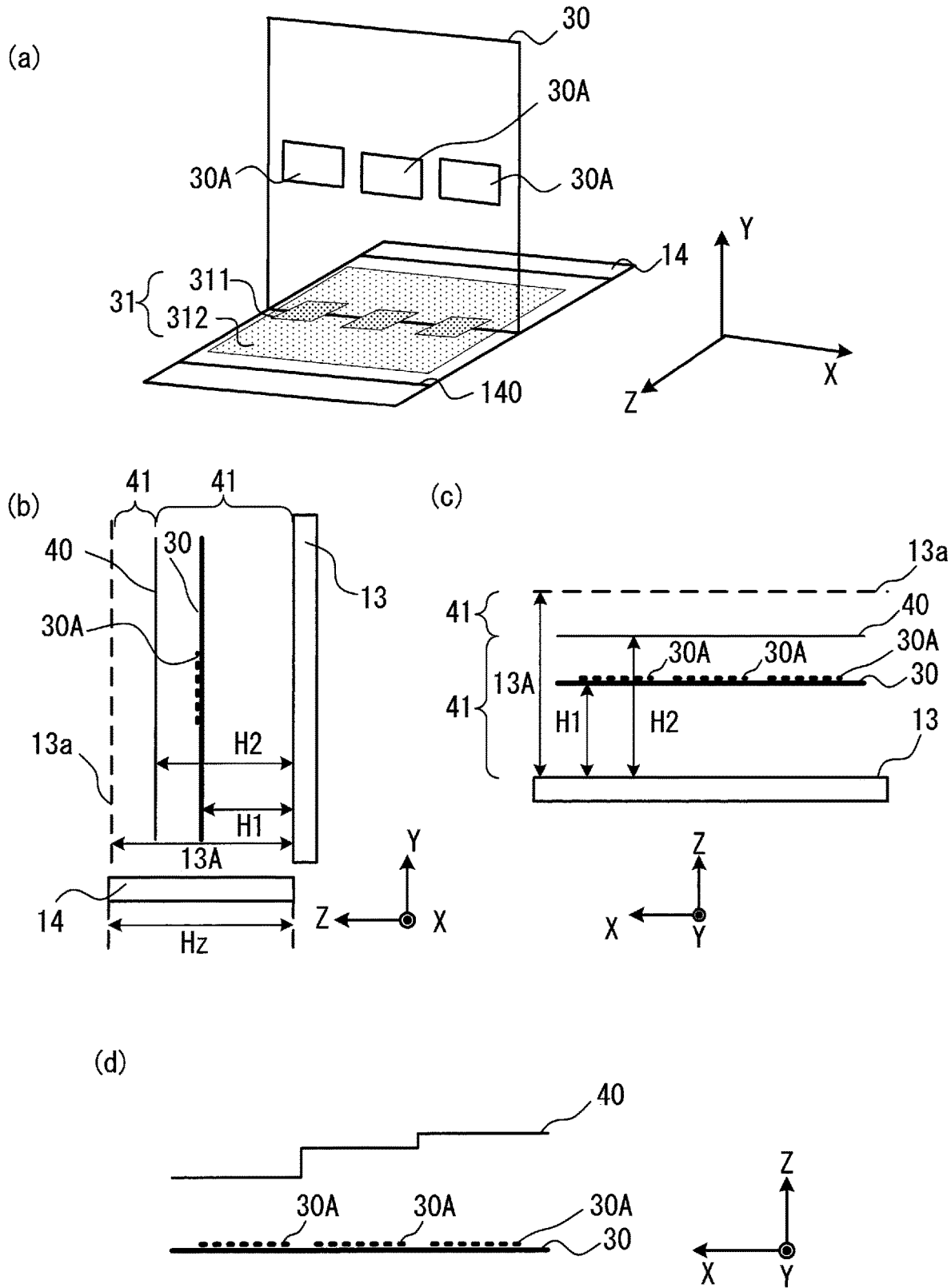

Based upon the results of the calibration processing executed in the first calibration processing mode as described above, the display position of the auxiliary image 31 on display in the midair image operation mode as shown in FIG. 3(*a*) is adjusted.

Figure 6:
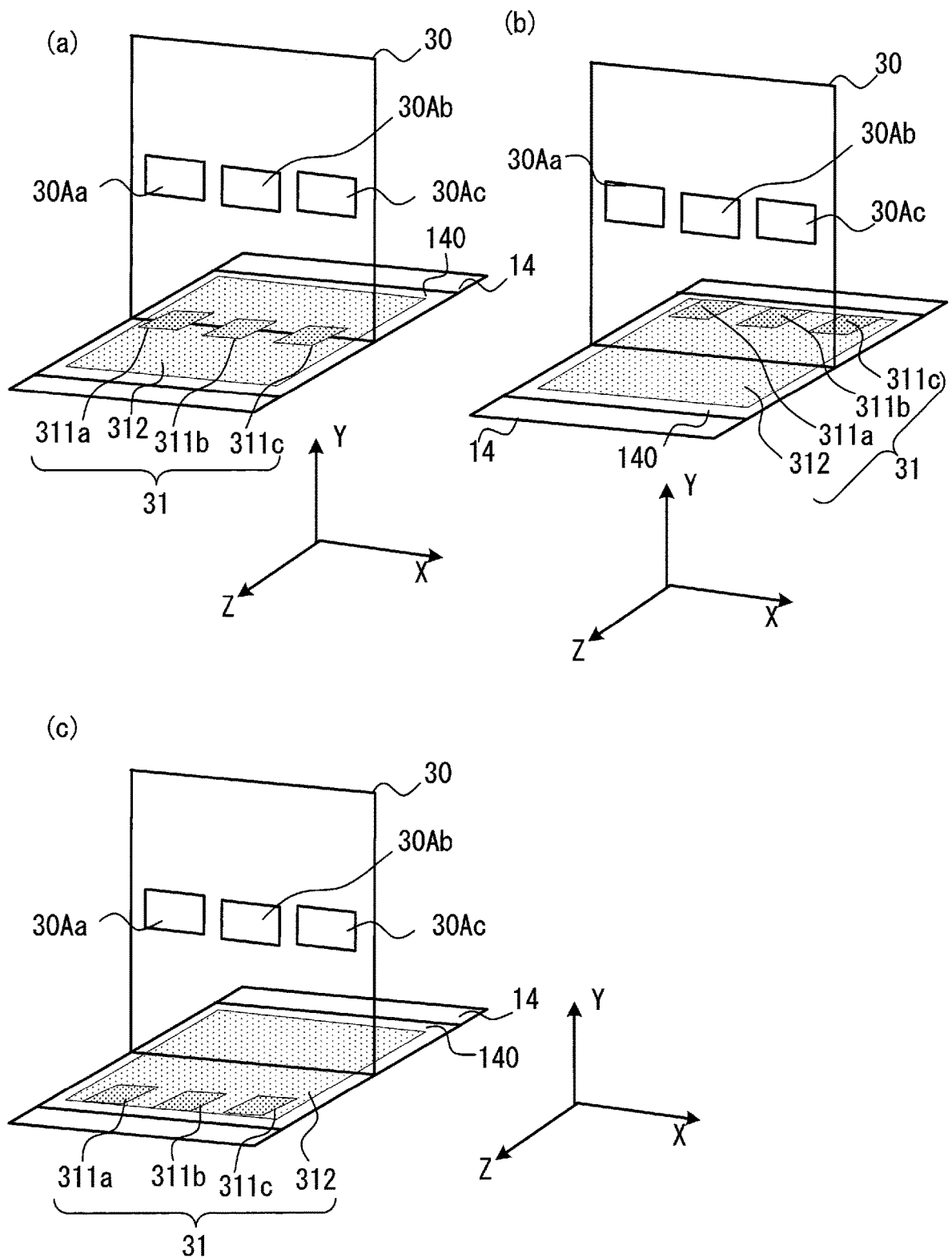
FIG. 6 A schematic presentation of a midair image brought up on display in a midair image operation mode following the calibration processing FIG. 7 A flowchart of the calibration processing executed in a first calibration processing mode in the first embodiment FIG. 8 An illustration indicating a positional relationship among the midair image, the detection reference and the reach position, to which the finger reaches, in a second calibration processing mode in the first embodiment FIG. 9 A flowchart of the calibration processing executed in the second calibration processing mode in the first embodiment FIG. 10 A schematic presentation of a relationship between an icon and the display mode for a first range in variation 1 of the first embodiment FIG. 11 A schematic presentation of a relationship between an icon and the display mode for the first range in another example of variation 1 of the first embodiment FIG. 12 A block diagram showing the essential configuration of the display device in another example of variation 1 of the first embodiment FIG. 13 A schematic presentation of a relationship between an icon and the display mode for the first range in another example of variation 1 of the first embodiment FIG. 14 A sectional view of a display device in another example of variation 1 of the first embodiment presented in (a), and a schematic presentation of another example of a relationship between an icon and the display mode for the first range in variation 1 presented in (b) and (c)

FIG. 6 shows a midair image 30 and auxiliary images 31 on display in the midair image operation mode, which reflect the results of the calibration processing executed in the first calibration processing mode, as described above. FIG. 6(*a*), similar to FIG. 3(*a*), shows a midair image 30 and auxiliary images 31 in the initial display. In FIG. 6(*a*), the icons 30A disposed over one row by three columns are assigned, starting from the left side in the drawing, with reference signs 30Aa, 30Ab and 30Ac. In addition, reference signs 311*a*, 311*b* and 311*c* are assigned to the first ranges 311 respectively corresponding to the icon 30Aa, the icon 30Ab and the icon 30Ac.

Figure 5:
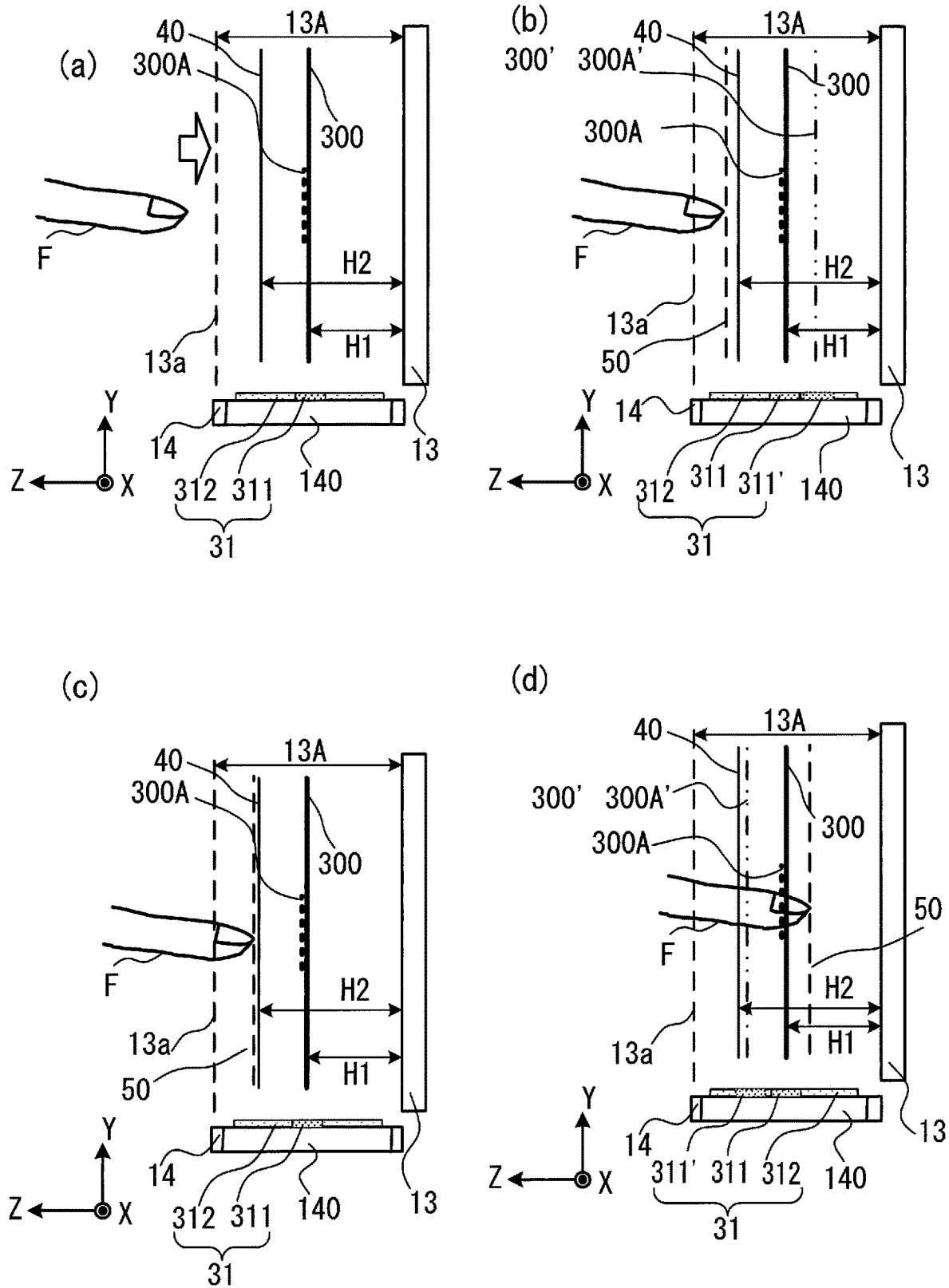

FIG. 6(*b*) shows a midair image 30 and first ranges 311 reflecting the results of calibration processing executed when the reach position 50 is located closer to the user relative to the detection reference 40 (see FIG. 5(*b*)). Namely, the display positions for the first ranges 311*a* through 311*c* have been shifted toward the − side along the Z direction so as to create a perception as if the icons 30A have moved along a direction running away from the user 12. As a result, the user 12 is expected to perform an operation so that the reach position 50 will be located further toward the − side along the Z direction than that in the first calibration processing mode.

FIG. 6(*c*) shows a midair image 30 and first ranges 311 reflecting the results of calibration processing executed when the reach position 50 is located further away from the user than the detection reference 40 (see FIG. 5(*d*)). Namely, FIG. 6(*c*) shows the first ranges 311*a* through 311*c* displayed at display positions adjusted so that a user perception is created as if the icons 30A have moved closer to the user 12. The user 12, experiencing such a perception, is expected to perform an operation with the reach position 50 shifted further toward the + side along the Z direction in comparison to that taken in the first calibration processing mode.

Through the process described above, an auxiliary image 31 that includes the first ranges 311 is projected at an adjusted position under the icons 30A in the midair image operation mode, based upon the distance between the operation position at which the user 12 has performed the operation and the detection reference 40, having been detected in the first calibration processing mode. In other words, the display device 1 alters the display position of the midair image 30, i.e., the positional relationship between the detection reference 40 and the auxiliary image 31, by controlling the display mode for the auxiliary image 31 (the positions of the first ranges 311).

It is to be noted that while the image generation unit 201 adjusts the display positions of the first ranges 311*a*, 311*b* and 311*c* in correspondence to all of the plurality of icons 30Aa, 30Ab and 30Ac based upon the results of the calibration processing in the example presented in FIG. 6, the present embodiment is not limited to this example. The image generation unit 201 may adjust the display position for at least one first range 311 among the first ranges 311*a* through 311*c* corresponding to the plurality of icons 30Aa through 30Ac, or it may individually adjust the display positions of the first ranges 311*a*, 311*b* and 311*c* by reflecting the results of the calibration processing in correspondence to the individual icons 30Aa, 30Ab and 30Ac.

The relationship between the first calibration processing mode described above and the midair image operation mode will be described in reference to the flowchart presented in FIG. 7. After the display device 1 is started up, the processing is executed in the steps in the flowchart presented in FIG. 7 based upon a program by the control unit 20. The program is stored in the storage unit 205.

Figure 4:
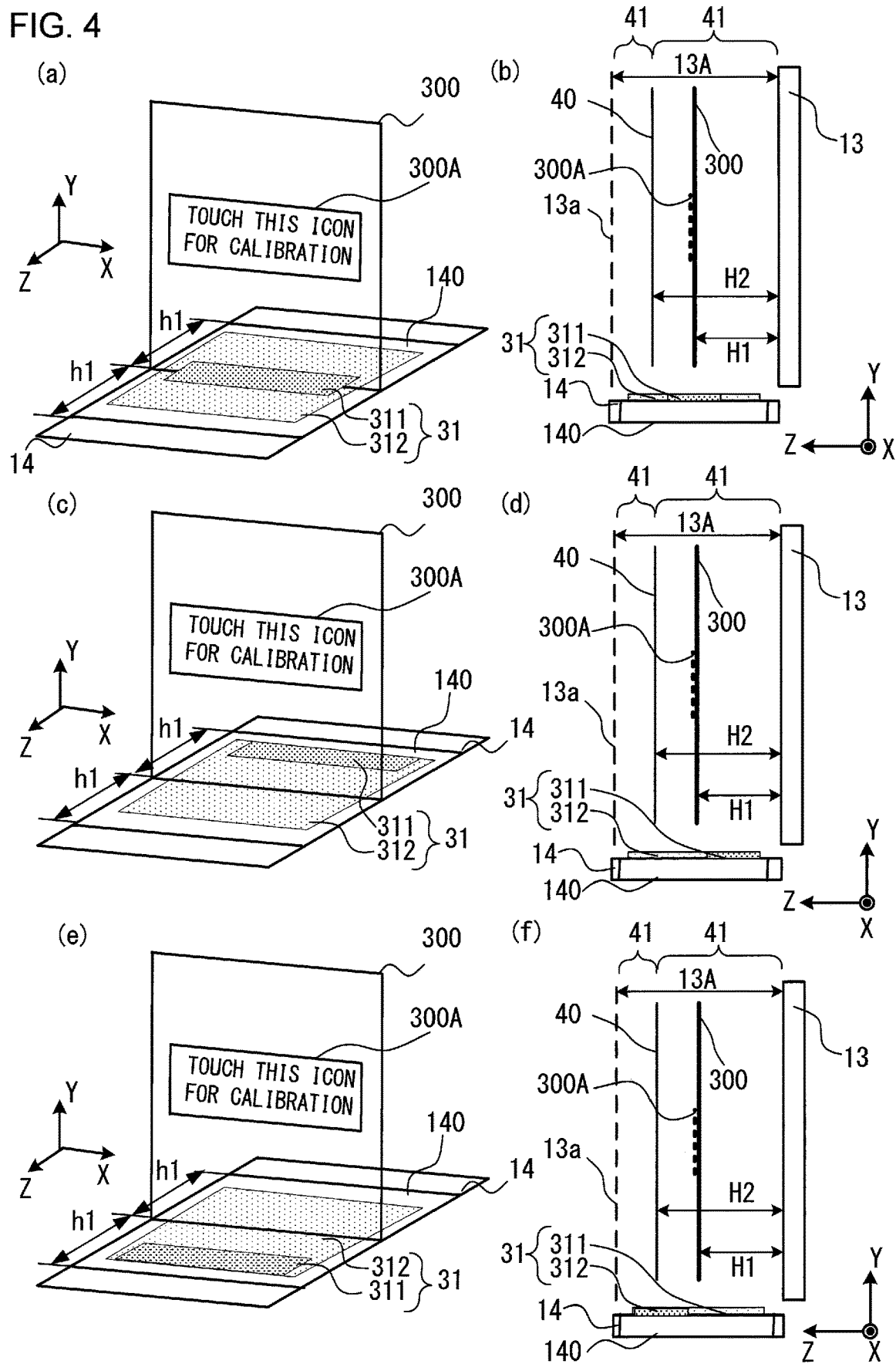
FIG. 4 A schematic presentation of a midair image displayed for purposes of calibration processing in the first embodiment in illustrations indicating the relationship between adjustment for display position of auxiliary image and depth perception FIG. 5 Illustrations of the calibration processing executed in the first embodiment in sectional views, each indicating the relationship among the operation detector, the midair image, the detection reference and the finger position, in (a), (b), (c) and (d)

In step S1, the first calibration processing mode, selected by the user 12 via the calibration processing mode selector operation button, is recognized as the selected mode, and then the operation proceeds to step S2. In step S2, the calibration unit 203 shown in FIG. 2 starts the first calibration processing mode before the operation proceeds to step S3. In step S3, the image generation unit 201 generates display image data for a calibration display image, the display control unit 202 brings up on display at the display unit 11 the calibration image based upon the display image data and the detection reference control unit 204 sets the detection reference 40 at a predetermined initial position. Concurrently, the image generation unit 201 generates image data for an auxiliary image 31 and the projector 15 projects the auxiliary image 31 onto a projection area 140 so that a first range 311 of the auxiliary image 31 is positioned under an icon 300A, as shown in FIG. 4(*a*). The display image brought up at the display unit 11 is the calibration midair image 300 in FIG. 4(*a*) generated via the image-forming optical system 9, and the midair image 300 includes the icon 300A and the message "Touch this icon for calibration". In step S4, the operation detector 13 detects a movement of the fingertip F of the user 12 toward the Z direction − side, and the operation proceeds to step S5.

In step S5, the detection reference control unit 204 shown in FIG. 2 makes a decision, based upon the detection output provided by the operation detector 13, as to whether or not the finger has reached the reach position 50. If an affirmative decision is made in step S5, i.e., if it is decided that the finger has reached the reach position 50, the operation proceeds to step S6. If a negative decision is made in step S5, i.e., if it is decided that the finger has not become still, the operation waits in standby until an affirmative decision is made. In step S6, the image generation unit 201 generates auxiliary image data by adjusting the position of the gravitational center of the luminance distribution based upon the distance between the reach position 50 and the detection reference 40. In addition, the image generation unit 201 stores data indicating the displacement quantity by which the gravitational center position has been adjusted, i.e., the displacement quantity for the first range 311, into the storage unit 205 shown in FIG. 2, before the operation proceeds to step S7.

In step S7, the operation exits the first calibration processing mode and proceeds to step S8. In step S8, the midair image operation mode is started, and the operation then proceeds to step S9. In step S9, the midair image 30 for the midair image operation mode shown in FIG. 8, which includes an icon 30A, is displayed. At this time, the image generation unit 201 reads out the data indicating the displacement quantity for the first range 311, having been stored into the storage unit 205 in step S6, from the storage unit 205. Based upon the data thus read out, the image generation unit 201 generates auxiliary image data for the midair image operation mode and the projector 15 projects an auxiliary image 31 onto the stage 14 based upon the auxiliary image data. Through this process, a midair image 30 is brought up on display in the midair image operation mode with the positional relationship between the icon 30A and the auxiliary image 31 optimized for the operation characteristics of the particular user 12 through the first calibration processing mode.

As the user 12 moves his finger toward the midair image 30 along the Z direction in order to perform an operation at the display position of the icon 30A, the operation detector 13 shown in FIG. 2 detects the movement of the finger away from the user 12 in step S10, and then the operation proceeds to step S11. In step S11, the detection reference control unit 204 makes a decision based upon the detection output provided by the operation detector 13 as to whether or not the finger has reached the detection reference 40. If an affirmative decision is made in step S11, i.e., if it is decided that the finger has reached the detection reference 40, the operation proceeds to step S12. If a negative decision is made in step S11, i.e., if it is decided that the finger has not reached the detection reference 40, the operation waits in standby until an affirmative decision is made. In step S12, the display control unit 202 switches the display image at the display unit 11 to a display image corresponding to the icon 30A having been operated, and then the operation proceeds to step S13. In step S13, a decision is made as to whether or not an operation has been performed to stop the display device 1. If an affirmative decision is made in step S13, i.e., if an operation has been performed to stop the display device 1, the display device 1 stops. If a negative decision is made in step S13, however, the operation returns to step S10.

While the first calibration processing mode is executed immediately after the display device 1 is started up so as to precede the midair image operation mode in the example described above, the first calibration processing mode may instead be executed following the midair image operation mode. For instance, the user 12, having experienced frustration while performing an operation at the display position of an icon 30A in the midair image operation mode, may operate the calibration processing mode selector operation button at the display device 1 in order to select the first calibration processing mode. In this case, the first calibration processing mode is executed by interrupting the midair image operation mode that is underway and the midair image operation mode is then resumed after the first calibration processing mode ends. It is to be noted that while the display device 1 selects the first calibration processing mode in response to an operation of the operation button by the user 12 in the example described above, the calibration unit 203 may instead implement the first calibration processing mode upon detecting signs of annoyance experienced by the user 12, which is likely attributable to difficulty in performing an operation at the display position of the icon 30A. The display device 1 may, for instance, detect the pulse rate of the user 12 (biometric information) and a pulse rate exceeding a predetermined value may be determined to be a sign of user frustration.

Next, the second calibration processing mode will be described in reference to FIG. 8 and FIG. 9. It is to be noted that the processing described earlier in reference to the first calibration processing mode may also be executed, as appropriate, in the second calibration processing mode described below.

Figure 8:
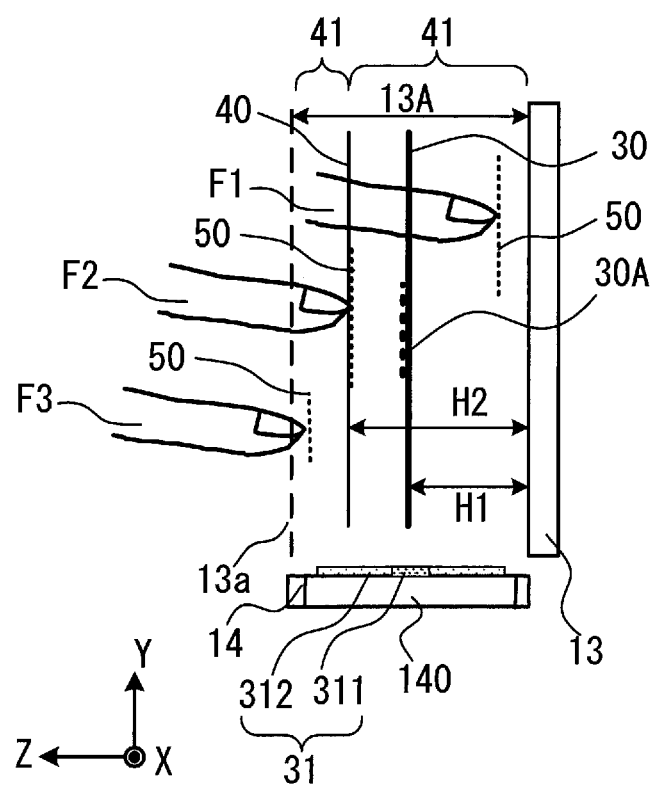
Figure 9:
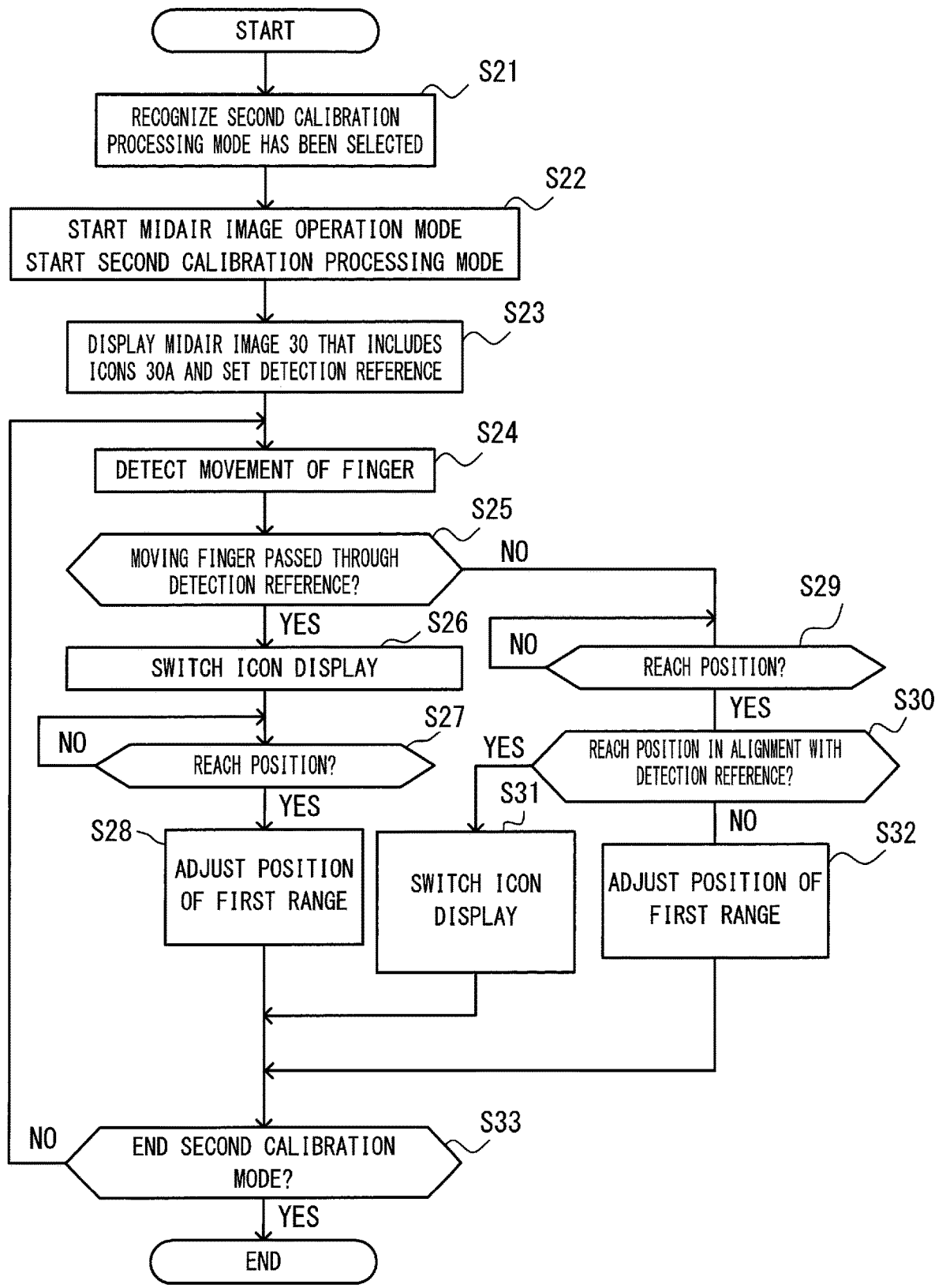

FIG. 8 illustrates a midair image 30 for the midair image operation mode, the detection reference 40 and the reach position 50 to which the fingertip F reaches, whereas FIG. 9 presents a flowchart of the operation executed in the second calibration processing mode. The processing is executed in the steps in the flowchart presented in FIG. 9, by the control unit 20 based upon a program, following startup the display device 1.

In step S21, the second calibration processing mode is recognized as the selected mode, and then the operation proceeds to step S22. In step S22, the midair image operation mode and the second calibration processing mode start concurrently, before the operation proceeds to step S23. In step S23, the midair image 30 shown in FIG. 3, which includes the icons 30A, is displayed and the detection reference control unit 204 in FIG. 2 sets the detection reference 40 at a predetermined initial position, e.g., at the position taken by the midair image 30 or at a position slightly more toward the Z direction + side relative to the position taken by the midair image 30, before the operation proceeds to step S24. At this time, the projector 15 projects auxiliary images 31 at positions corresponding to the initial positions of the icons 30A, i.e., at positions set apart from the operation detector 13 by a distance H1 toward the + side along the Z direction. In addition, a message "Calibration executed during icon operation" is briefly displayed in the midair image 30. However, it is not essential that this message be displayed.

In step S24, as the user 12 moves his finger toward the − side along the Z direction in order to perform an operation at the display position of an icon 30A, the operation detector 13 starts detection of finger movement, and then the operation proceeds to step S25. In step S25, the detection reference control unit 204 makes a decision based upon the detection output provided by the operation detector 13 as to whether or not the finger moving toward the − side along the Z direction has passed through the detection reference 40. If an affirmative decision is made in step S25, i.e., if the finger moving toward the − side along the Z direction has passed through the detection reference 40 and has moved further toward the − side along the Z direction, the operation proceeds to step S26. F1 in FIG. 8 indicates the finger having passed through the detection reference 40 during its movement toward the − side along the Z direction. In step S26, the detection reference control unit 204, having decided that the finger F1 has reached the detection reference 40, i.e., it has passed through the detection reference 40, executes icon display switchover so as to switch the midair image 30 in correspondence to the icon 30A having been operated, and then the operation proceeds to step S27. In step S27, the detection reference control unit 204 makes a decision as to whether or not the finger F1 has reached the reach position 50, and if an affirmative decision is made, the operation proceeds to step S28, whereas if a negative decision is made, the operation is held until an affirmative decision is made. In step S28, the image generation unit 201 adjusts the display position of the first range 311 based upon the distance between the reach position 50 and the detection reference 40, and then the operation proceeds to step S33. In more specific terms, the image generation unit 201 generates auxiliary image data with the gravitational center of the luminance distribution taking an adjusted position so that the first range 311 is positioned further toward the + side along the Z direction (toward the user 12) as illustrated in FIG. 4(d). The projector 15 projects the auxiliary image 31, expressed based upon the auxiliary image data having been generated, onto the stage 14.

It is to be noted that if the detection reference control unit 204 detects in step S28 that the reach position 50 is not located further toward the − side along the Z direction beyond a predetermined range relative to the detection reference 40 by comparing the reach position 50 and the position of the detection reference 40, the image generation unit 201 does not need to adjust the projection position of the auxiliary image 31. As an alternative, the image generation unit 201 may set the extent to which the projection position of the auxiliary image 31 is adjusted (the displacement quantity for the auxiliary image 31) to 0 (in other words, the projection position of the auxiliary image 31 may remain substantially unchanged).

If a negative decision is made in step S25, i.e., if the finger moving toward the − side along the Z direction has not passed through the detection reference 40, the operation proceeds to step S29. In step S29, the detection reference control unit 204 makes a decision based upon the detection output provided by the operation detector 13 as to whether or not the fingertip F has reached the reach position 50, and if an affirmative decision is made, the operation proceeds to step S30. If, on the other hand, a negative decision is made, the operation is held until an affirmative decision is made. A finger F2 in FIG. 8 indicates that the reach position 50 is in alignment with the detection reference 40. In step S30, the detection reference control unit 204 makes a decision based upon the detection output provided by the operation detector 13 as to whether or not the reach position 50 is in alignment with the detection reference 40, and if an affirmative decision is made, the operation proceeds to step S31, whereas if a negative decision is made, the operation proceeds to step S32. In step S31, icon display switchover is executed since the reach position 50 is in alignment with the detection reference 40 without moving the first range 311, before the operation proceeds to step S33.

It is to be noted that the detection reference control unit 204 may decide that the reach position 50 is at the detection reference 40 even when the reach position 50 is not exactly in alignment with the detection reference 40, e.g., when the reach position 50 is detected within the predetermined range from the detection reference 40. In such a case, the detection reference control unit 204 may make a decision in step S25 in FIG. 9 as to whether or not the reach position 50 is located further downward relative to the predetermined range from the detection reference 40. Then, if the reach position 50 is located further downward beyond the predetermined range from the detection reference 40, an affirmative decision will be made in step S25 and the operation will proceed to step S26. In addition, the detection reference control unit 204 may make a decision in step S30 as to whether or not the reach position 50 is located within the predetermined range relative to the detection reference 40. In this case, if the reach position 50 is located within the predetermined range from the detection reference 40, an affirmative decision will be made in step S30 and the operation will proceed to step S31.

In step S32, with the reach position 50 located toward the + side along the Z direction relative to the detection reference 40 as indicated by a finger F3 in FIG. 8, the image generation unit 201 adjusts the position of the first range 311 based upon the distance between the reach position 50 and the detection reference 40. More specifically, the image generation unit 201 generates auxiliary image data with the gravitational center G of the luminance distribution taking an adjusted position so that the first range 311 is positioned toward the − side along the Z direction (toward the side opposite from the user 12) as illustrated in FIG. 4(c). The projector 15 projects the auxiliary image 31 corresponding to the auxiliary image data having been generated onto the stage 14. In step S33, a decision is made as to whether or not an end operation has been performed in order to exit the second calibration processing mode, and if an affirmative decision is made, the second calibration processing mode is terminated, whereas if a negative decision is made, the operation returns to step S24.

In the second calibration processing mode described above, which is executed concurrently while the midair image operation mode is underway, the user 12 is able to perform an operation at the display position of the midair image 30 by using the detection reference 40 optimized for the user 12 without having to be aware that calibration processing is also in progress. It is to be noted that the first/second calibration processing mode selection does not necessarily need to be made by the user 12 and instead, the display device 1 may automatically select either the first calibration processing mode or the second calibration processing mode. In addition, it is not essential that both the first calibration processing mode and the second calibration processing mode be made available and only one of these calibration processing modes may be available.

In addition, while the image generation unit 201 in the first embodiment adjusts the display mode for the auxiliary image 31 so as to create a user perception as if the display position of the icon 30A has changed along the Z axis, the present embodiment is not limited to this example. For instance, the image generation unit 201 may adjust the display mode for the auxiliary image 31 so as to create a perception as if the display position of an icon 30A has moved along the optical axis of the image-forming optical system 9 instead. Namely, the image generation unit 201 in the embodiment may adjust the display mode for the auxiliary image 31 so as to create a perception in the user 12 as if the display position of the icon 30A has moved along a direction other than the direction running perpendicular to the optical axis of the image-forming optical system 9. Accordingly, the image generation unit 201 may move the first range 311 along a direction that contains a component extending along the optical axis of the image-forming optical system 9.

In addition, while an example in which, the auxiliary image 31 is projected over a fixed area constituting part of the projection area 140 and located within the projection area 140, has been explained in reference to the first embodiment, the area over which the auxiliary image 31 is projected does not need to be fixed. The position at which the auxiliary image 31 is projected may move within the projection area 140 and the auxiliary image 31 may be projected by altering the size of an area over which it is projected.

It is to be noted that the projector control unit 200 in the display device 1 in the first embodiment as described above may control the luminance of an auxiliary image 31 projected via the projector 15 based upon the light in the environment surrounding the display device 1. In such a case, an illuminance sensor or the like, capable of detecting the brightness in the surrounding environment, will be installed in the body 10 of the display device 1. It is to be noted that the role of the illuminance sensor may be filled by the photo metering function of a camera. If the environment surrounding the display device 1 is brightly lit with sunlight, artificial lighting or the like, the first range 311 of the auxiliary image 31 projected by the projector 15 will not be readily visible to the user 12. Accordingly, if the environment surrounding the display device 1 is bright, the luminance of the second range 312 of the image projected by the projector 15 will be raised so as to render the darker first range 311 readily visible to the user 12.

In this situation, the projector control unit 200 increases/decreases the luminance of the projection light for the range corresponding to the second range 312 based upon an increase/decrease in the ambient light detected via the illuminance sensor. The projector control unit 200 may control the projection light so that its luminance increases/decreases linearly based upon an increase/decrease in the ambient light or may control the projection light so that its luminance increases/decreases in steps, each corresponding to an increase/decrease in the ambient light by a predetermined extent. In addition, the projector control unit 200 may control the luminance of the projection light over the range corresponding to the second range 312 when the level of the ambient light exceeds a predetermined value.

It is to be noted that the present embodiment is not limited to an example in which the luminance of the light projected by the projector 15 is controlled based upon the ambient light. For instance, the luminance for the light projected by the projector 15 may be set based upon an operation performed by the user 12 and the projector control unit 200 may control the luminance of the projection light based upon the setting selected through the operation performed by the user 12. In such a case, the user 12 is able to set a luminance level for light projected by the projector 15 by operating an operation button disposed at the body 10 of the display device 1. It is to be noted that the display device 1 may display this operation button as a midair image.

Furthermore, when the projector 15 projects projection light with high luminance, the bright projection light may make it more difficult for the user 12 to view a midair image 30 or 300. Under such circumstances, the display control unit 202 will increase/decrease the luminance of the display image brought up on display at the display unit 11 based upon an increase/decrease in the luminance of the light projected by the projector 15. The display control unit 202 may control the luminance of the display image so that it increases/decreases linearly based upon an increase/decrease in the projection light or it may control the luminance of the display image so that it increases/decreases in steps, each corresponding to an increase/decrease in the luminance of the projection light by a predetermined extent. In addition, the display control unit 202 may control the luminance of the display image displayed at the display unit 11 when the luminance of the projection light exceeds a predetermined value.

It is to be noted that when a luminance level for light projected by the projector 15 is set based upon an operation performed by the user 12 as explained above, the display control unit 202 will be able to control the luminance of the display image at the display unit 11 based upon the selected luminance setting.

It is to be noted that the display control unit 202 may control the luminance of the display image based upon the light in the environment surrounding the display device 1 instead of based upon the luminance of the projection light. Namely, the display control unit 202 may control the luminance of the display image at the display unit 11 based upon an increase/decrease in the light in the surrounding environment.

It is also to be noted that while an image equivalent to a shadow is used as an auxiliary image 31 in the example explained in reference to the first embodiment, an image other than an image corresponding to a shadow may be used as an auxiliary image 31. For instance, an image of a stage, a table, a desk or the like, upon which an object may be placed, can be displayed as an auxiliary image 31 to be used as a cue indicating the position of the midair image 30. When such an auxiliary image 31 is displayed under the midair image 30, the user 12 may experience a perception as if the midair image 30 is placed upon the auxiliary image 31.

It is to be noted that, as will be explained later in reference to variation 2 of the third embodiment, the user 12 is more likely to perceive as if a midair image 30 is displayed at the position of the first range 311 in the auxiliary image 31 if the auxiliary image 31 expresses an object closely related to the midair image 30. As will be explained in detail later, an auxiliary image 31 and a midair image 30 closely related to each other are an auxiliary image 31 and a midair image 30 of objects typically located close to each other, installed adjacent to each other, configured as one with each other or the like in the real world.

The image generation unit 201 in the first embodiment controls the auxiliary image 31 based upon the positional relationship between the detection reference 40 used to detect an operation performed by the user 12 and the position at which an operation performed by the user 12 has been detected. As a result, the user 12 is able to perform an operation at the detection reference 40 based upon the auxiliary image 31. In more specific terms, the image generation unit 201 adjusts the display mode for a second image (second display image) with higher display luminance based upon the operation detected by the operation detector 13. The user, recognizing that the position of the first range 311 with lower luminance, which is part of the auxiliary image 31, has changed, is able to perform an operation at the detection reference 40 by using the first range 311 as a cue.

Furthermore, the image generation unit 201 in the first embodiment controls the auxiliary image 31 if an operation performed by the user 12 is not detected at the detection reference 40. As a result, the user 12, perceiving the position of the detection reference 40 based upon the auxiliary image 31, is able to perform an operation at the detection reference 40.

In addition, the image generation unit 201 in the first embodiment controls the first range 311 constituting part of the auxiliary image 31 within a second display area. Thus, the user 12 is able to perceive the position of the detection reference 40 based upon an image equivalent to a shadow of the icon 30A.

The image generation unit 201 in the first embodiment controls the display mode for an auxiliary image 31 provided as the second display. The user 12 is thus able to perceive the position of the detection reference 40 with better ease by recognizing the display mode for the auxiliary image 31.

Furthermore, the image generation unit 201 in the first embodiment controls the first range 311 constituting part of the auxiliary image 31 within the second display area. Thus, the user 12 is able to perceive the position of the detection reference 40 with better ease by visually checking the display mode for an image equivalent to a shadow of the icon 30A.

The image generation unit 201 in the first embodiment adjusts the display mode for the auxiliary image 31 so as to create a perception in the user 12 as if the position of the midair image 30 has moved toward the user 12 or toward the side opposite from the side where the user 12 is located. Thus, the user 12 is led to adjust the position at which he performs an operation along the Z direction so as to make it possible to detect the user operation at the detection reference 40.

The image generation unit 201 in the first embodiment determines the direction along which the position of the first range 311 in the auxiliary image 31 is to be changed based upon the position at which an operation performed by the user 12 has been detected with respect to the detection reference 40. Through these measures, it is ensured through the calibration processing that the reach position 50 of the operation performed by the user 12 arrives at the detection reference 40.

Furthermore, the image generation unit 201 in the first embodiment moves the first range 311 in the auxiliary image 31 along a direction determined based upon an operation performed by the user 12 or along a direction opposite from the direction determined based upon the operation performed by the user 12. Thus, it becomes possible to detect the user operation at the detection reference 40 by leading the user 12 to adjust the position at which he performs an operation along the Z direction.

It is to be noted that when the user 12 performs a pressing operation, the image generation unit 201 moves the first range 311 in the auxiliary image 31 along a direction determined based upon the pressing operation performed by the user 12 or along the direction opposite from the direction determined based upon the pressing operation. Through these measures, it is ensured that the user operation can be detected at the detection reference 40 by leading the user 12 to adjust the position at which he performs the pressing operation.

Moreover, the image generation unit 201 in the first embodiment moves the display position of the first range 311 in the auxiliary image 31 along a direction determined based upon an operation performed by the user 12 when the operation performed by the user 12 does not reach the detection reference 40 (see FIG. 5(b)). Namely, a perception is created in the user 12 as if the position of the icon 30A has been adjusted to move further away from the user 12. Since this leads the user 12 to perform an operation at a position further toward the − side along the Z direction, it is ensured that the operation performed by the user 12 reaches the detection reference 40.

In addition, the image generation unit 201 in the first embodiment moves the display position of the first range 311 in the auxiliary image 31 along the direction opposite from the direction determined based upon an operation performed by the user 12 when the user operation has reached the detection reference (see FIG. 5(d)). Namely, a perception is created in the user 12 as if the position of the icon 30A has been adjusted to move closer to the user 12. Since this leads the user 12 to perform an operation at a position closer to the user 12, it is ensured that the user 12 performs the operation at the detection reference 40.

Moreover, the image generation unit 201 in the first embodiment controls the distribution of luminance in the auxiliary image 31. Thus, the user 12 is able to perceive a first range 311 appearing to be a shadow of an icon 30A, located at a position under the icon 30A.

The image generation unit 201 in the first embodiment controls the position of the luminance gravitational center of the luminance distribution in the auxiliary image 31. As a result, the user 12 is able to perceive as if the first range 311 in the auxiliary image 31 has moved.

In addition, the image generation unit 201 in the first embodiment controls the position of the luminance gravitational center of the luminance distribution in the auxiliary image 31 based upon an operation performed by the user 12. Thus, the first range 311 in the auxiliary image 31 is moved based upon the operation performed by the user 12, which leads the user 12 to be able to perceive the position of the detection reference 40.

The image generation unit 201 in the first embodiment determines the direction along which the position of the luminance gravitational center of the luminance distribution in the auxiliary image 31 is to move based upon whether or not the reach position 50 with respect to an operation performed by the user 12 has reached the detection reference 40. Through these measures, it is ensured through the calibration processing that the reach position 50 of the operation performed by the user 12 arrives at the detection reference 40.

Furthermore, the image generation unit 201 in the first embodiment moves the position of the luminance gravitational center of the luminance distribution in the auxiliary image 31 along a direction determined based upon an operation performed by the user 12 or along a direction opposite from the direction determined based upon the operation performed by the user 12. Thus, it becomes possible to detect the user operation at the detection reference 40 by leading the user 12 to adjust the position at which he performs an operation along the Z direction.

It is to be noted that when the user 12 performs a pressing operation, the image generation unit 201 moves the position of the luminance gravitational center of the luminance distribution in the auxiliary image 31 along a direction determined based upon the pressing operation performed by the user 12 or along the direction opposite from the direction determined based upon the pressing operation. Through these measures, it is ensured that the user operation can be detected at the detection reference 40 by leading the user 12 to adjust the position at which he performs the pressing operation.

Moreover, the image generation unit 201 in the first embodiment moves the position of the luminance gravitational center of the luminance distribution in the auxiliary image 31 in the auxiliary image 31 along a direction determined based upon an operation performed by the user 12 when the operation performed by the user 12 does not reach the detection reference 40 (see FIG. 5(b)). Namely, a perception is created in the user 12 as if the position of the icon 30A has been adjusted to move further away from the user 12. Since this leads the user 12 to perform an operation at a position further toward the − side along the Z direction, it is ensured that the operation performed by the user 12 reaches the detection reference 40.

In addition, the image generation unit 201 in the first embodiment moves the position of the luminance gravitational center of the luminance distribution in the auxiliary image 31 along the direction opposite from the direction determined based upon an operation performed by the user 12 when the user operation has reached the detection reference (see FIG. 5(d)). Namely, a perception is created in the user 12 as if the position of the icon 30A has been adjusted to move closer to the user 12. Since this leads the user 12 to perform an operation at a position closer to the user 12, it is ensured that the user 12 performs the operation at the detection reference 40.

(Variation 1 of the First Embodiment)

An example in which the position of the first range 311 projected onto the stage 14 is adjusted based upon the results of calibration processing has been explained in reference to the first embodiment. In reference to variation 1, examples of display modes that can be adjusted for an auxiliary image 31 will be described.

<1. Adjustment of the Size of the First Range 311>

Figure 10:
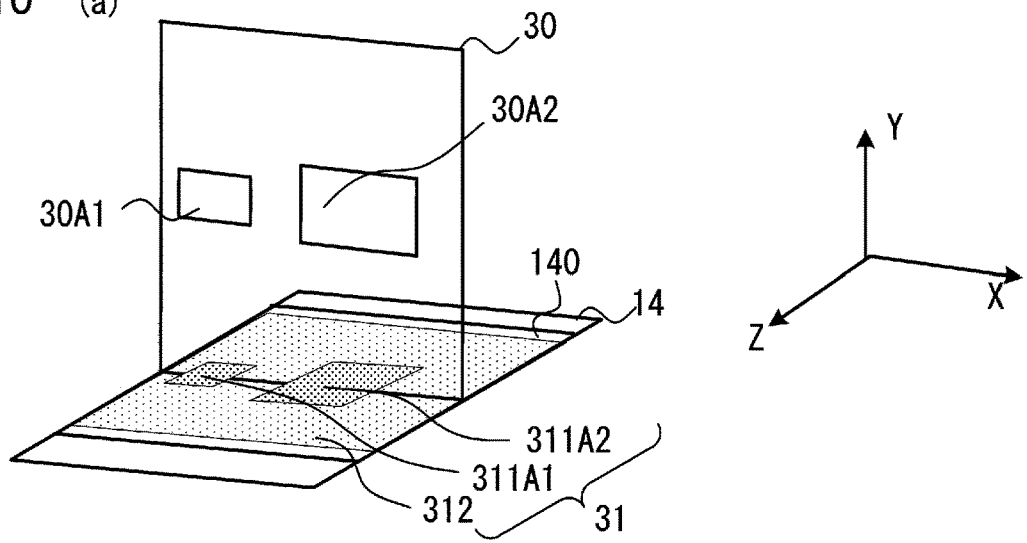
Figure 10:
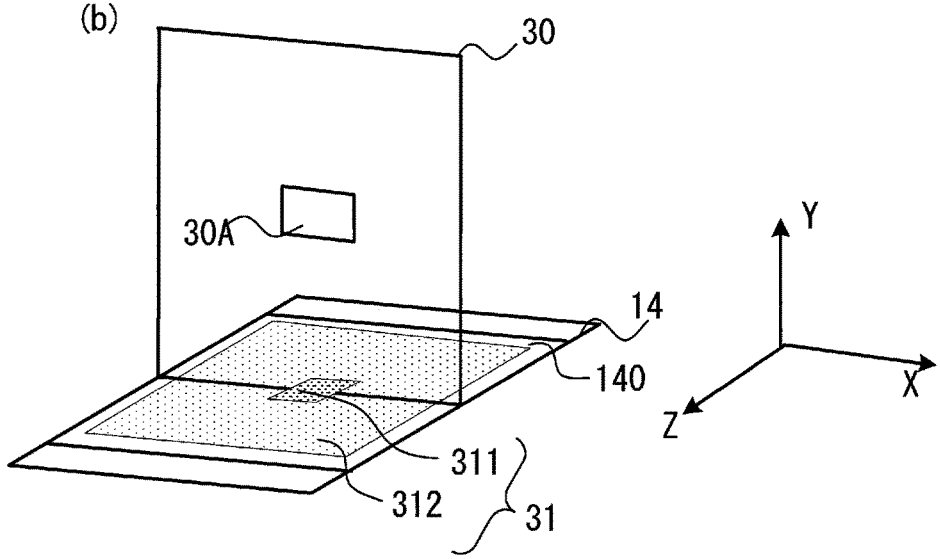
Figure 10:
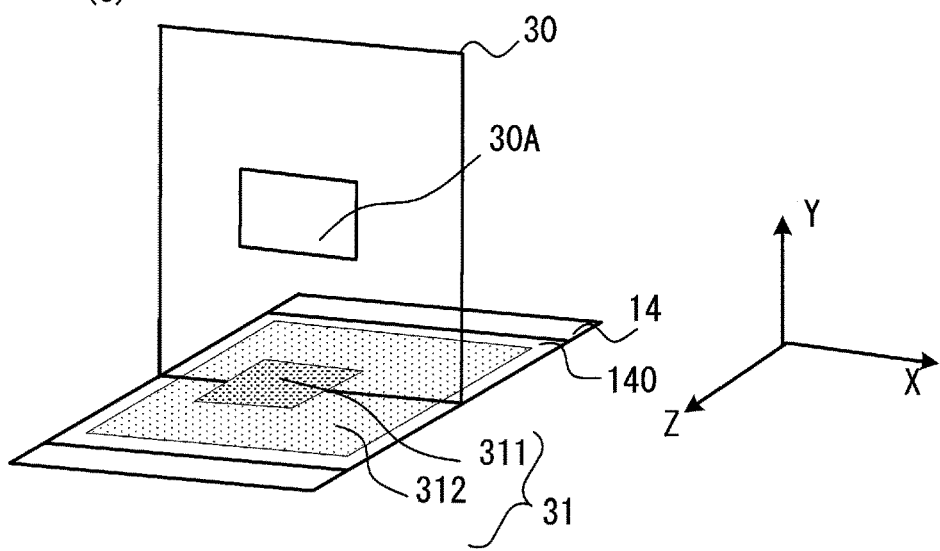

The image generation unit 201 may adjust the size of a first range 311, based upon the size of an icon 30A. For instance, a midair image 30 corresponding to the midair image operation mode may include two icons 30A1 and 30A2, as illustrated in FIG. 10(a). The icon A2 is larger than the icon 30A1 in FIG. 10(a). In this situation, the image generation unit 201 generates auxiliary image data by setting the luminance distribution so that a first range 311A2 corresponding to the icon 30A2 is greater, i.e., has a greater area than a first range 311A1 corresponding to the icon 30A1.

In addition, when an initial display of an icon 30A and a first range 311 in FIG. 10(b) is switched to a display with the icon 30A taking a different size, the image generation unit 201 may adjust the size of the first range 311 based upon the change in the size of the icon 30A. For instance, if the size of the icon 30A is increased, the image generation unit 201 generates auxiliary image data by setting the luminance distribution so as to increase the size of the first range 311 based upon the rate of increase in the size of the icon 30A, as illustrated in FIG. 10(c). As the projector 15 projects an auxiliary image 31 corresponding to the auxiliary image data, the first range 311 with a greater area in comparison to that of the first range 311 in the initial display is projected at a position under the icon 30A, as shown in FIG. 10(c).

It is to be noted that the image generation unit 201 may generate display image data for a first range 311 by adjusting its size as described above and also by moving its display position as has been described in reference to the first embodiment in combination.

The image generation unit 201 in variation 1 of the first embodiment adjusts the size of the first range 311 in the auxiliary image 31 based upon the size of the icon 30A. As a result, the user 12, recognizing that the icon 30A is related to the first range 311, is able to perceive the position of the icon 30A by using the auxiliary image 31 as a cue.

<2. Adjustment of the Luminance of the First Range 311>

The image generation unit 201 may generate auxiliary image data expressing a first range 311 with altered luminance based upon the display position at which an icon 30A is displayed along the Y direction. Generally speaking, the shadow of a physical object is lighter when the distance between the physical object and the surface on which the shadow is formed, measured along the vertical direction, is greater, and the shadow is darker when the distance is smaller. The image generation unit 201 simulates this phenomenon in the relationship between the midair image 30 and the first range 311 by controlling the density, i.e., the lightness, of the first range 311. In this simulation, the image generation unit 210 controls the average of the luminance values representing the luminance distribution over the entire area of the auxiliary image data. The average value Av of the luminance distribution may be expressed as in (2) below.

$$Av = \frac{\sum_{j=1}^{k}\sum_{j=1}^{k} f(x_i, y_j)}{k \times k} \quad (2)$$

It is to be noted that $(x_i, y_j)$ in equation (2) above indicates the coordinates of each display pixel among display pixels disposed in a k (rows)×k (columns) array and $f(x_i, y_j)$ represents the luminance of the display pixel at the coordinate position $(x_i, y_j)$, as has been explained in reference to equation (1). The explanation will be given by assuming that the k (rows)×k (columns) range is made up with the entire first range 311 and the entire second range 312.

In addition, the display pixels disposed over k rows×k columns do not need to correspond to the range made up with the entire first range 311 and the entire second range 312 and may instead correspond to a range that includes the entire first range 311 and part of the second range 312. Furthermore, the display pixels disposed over k rows×k columns may correspond to a range that is made up with a range that excludes part of the first range 311 and a range that is part of the second range 312.

Figure 11:
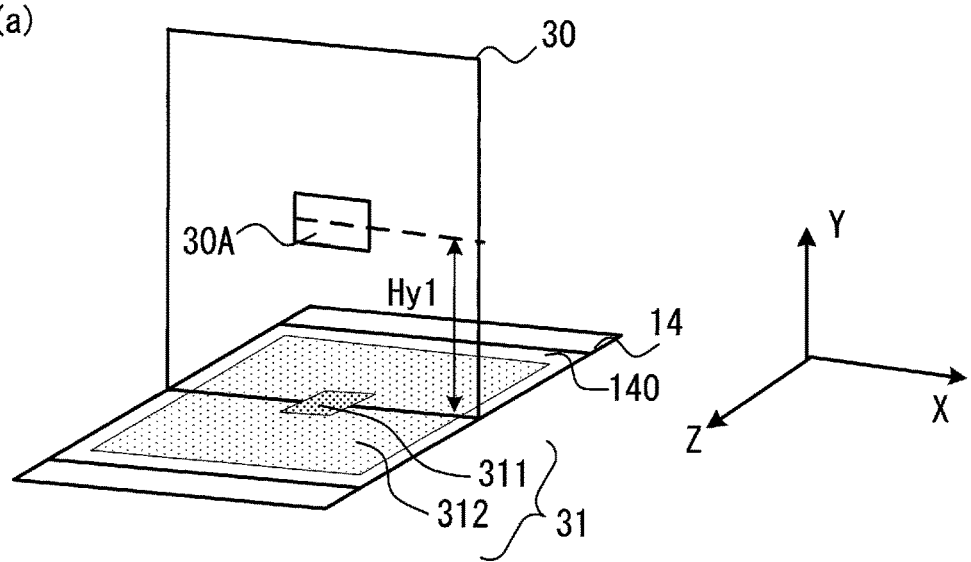
Figure 11:
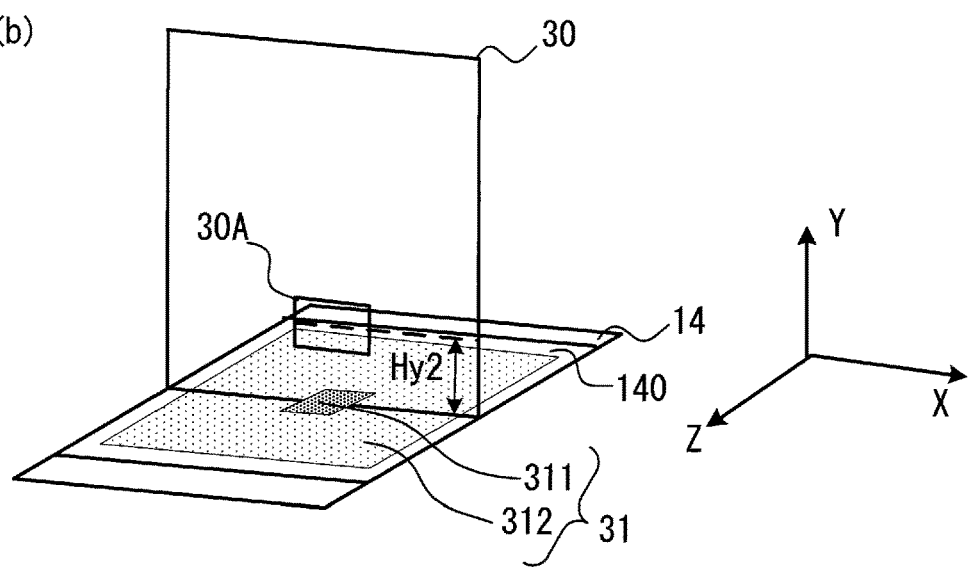
Figure 11:
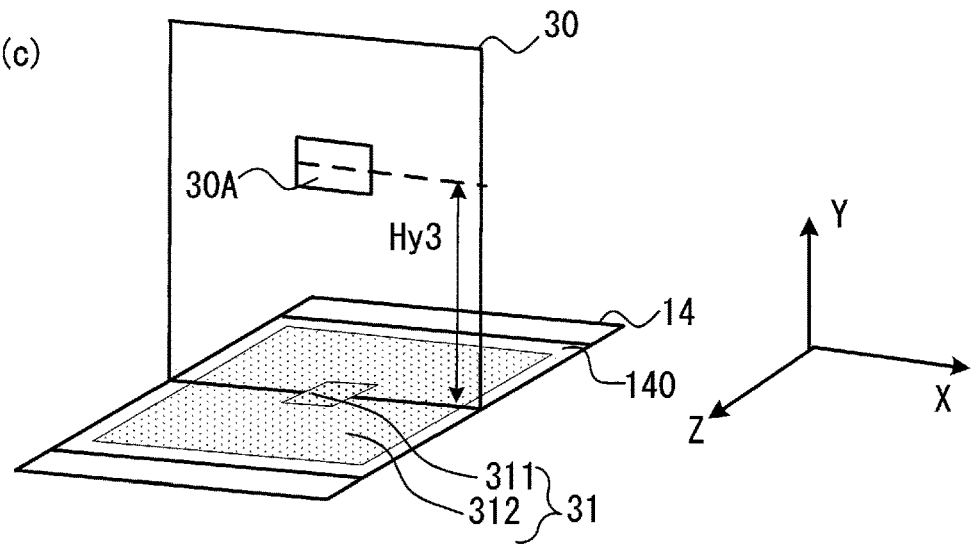

FIG. 11(a) shows an icon 30A and an auxiliary image 31 in an initial display. The distance between the icon 30A and the stage 14, measured along the Y direction, is Hy1. In this situation, the image generation unit 201 generates auxiliary image data by setting an average value of the luminance distribution so that the level of the luminance of the first range 311 is, for instance, 50% of the luminance of the second range 312. FIG. 11(b) shows the icon 30A displayed at a position shifted further toward the Y direction − side compared to the display position taken in the initial display. The distance between the icon 30A and the stage 14, measured along the Y direction in this condition, is Hy2 (<Hy1). The image generation unit 201 generates auxiliary image data by setting a smaller average value for the luminance distribution over the range made up with the entire first range 311 and the entire second range 312 in FIG. 11(b), in comparison to the average value corresponding to FIG. 11(a), based upon the difference (Hy1−Hy2) from the distance Hy1 between the icon 30A and the stage 14 corresponding to the initial display. In this situation, the image generation unit 201 generates auxiliary image data with a higher level of sharpness for the first range 311 in comparison to that in the initial display. As a result, a first range 311 that is darker than that in the initial display is projected by the projector 15 at a position below the icon 30A. Since the area where the display pixels to be used in the calculation executed as expressed in (2) are arrayed over k rows×k columns is fixed, the image generation unit 201 is able to compare the luminance of the first range 311 in relation to the luminance of the first range 311 in the initial display. However, provided that the auxiliary image 31 is projected over the entire range of the projection area 140, it may still be possible to compare the luminance of the first range 311 in relation to the luminance of the first range 311 in the initial display even if the k rows×k columns display pixel area is moved or its size is altered. It is to be noted that the dots in the first range 311 in FIG. 11(b) are distributed at a higher density than the density of dots in the first range in FIG. 11(a) to indicate that the luminance of the first range 311 has been lowered.

FIG. 11(c) shows the icon 30A displayed at a position shifted further toward the Y direction + side compared to the display position taken in the initial display. The distance between the icon 30A and the stage 14, measured along the Y direction in this condition, is Hy3 (>Hy1). The image generation unit 201 generates auxiliary image data by setting a larger average value for the luminance over the range made up with the entire first range 311 and the entire second range 312 in FIG. 11(c), compared to the average value corresponding to FIG. 11(a), based upon the difference (Hy3−Hy1) from the distance Hy1 between the icon 30A and the stage 14 corresponding to the initial display. In this case, the image generation unit 201 generates the auxiliary image data so that the level of sharpness with which the first range 311 is displayed is lowered relative to that in the initial display. As a result, a first range 311 that is lighter than that in the initial display is projected by the projector 15 at a position below the icon 30A. The dots in the first range 311 in FIG. 11(b) are distributed with a lower density than the density of dots in the auxiliary image in FIG. 11(a) to indicate that the luminance of the first range 311 has been lowered.

It is to be noted that the image generation unit 201 adjusts the luminance of the first range 311 in the example described above. The image generation unit 201 may instead generate display image data by adjusting the luminance of the first range 311, by adjusting the size of the first range 311, as explained earlier, and by moving the display position of the first range 311, as has been explained in reference to the first embodiment in an optimal combination.

In variation 1 of the first embodiment, the level of sharpness for the first range 311 is adjusted. As a result, a perception is created in the user 12 as if the position at which the icon 30A is displayed in midair has moved, thereby leading the user 12 to adjust the position at which he performs an operation.

<3. The First Range 311 Tracks the Movement of the Midair Image 30>

Figure 12:
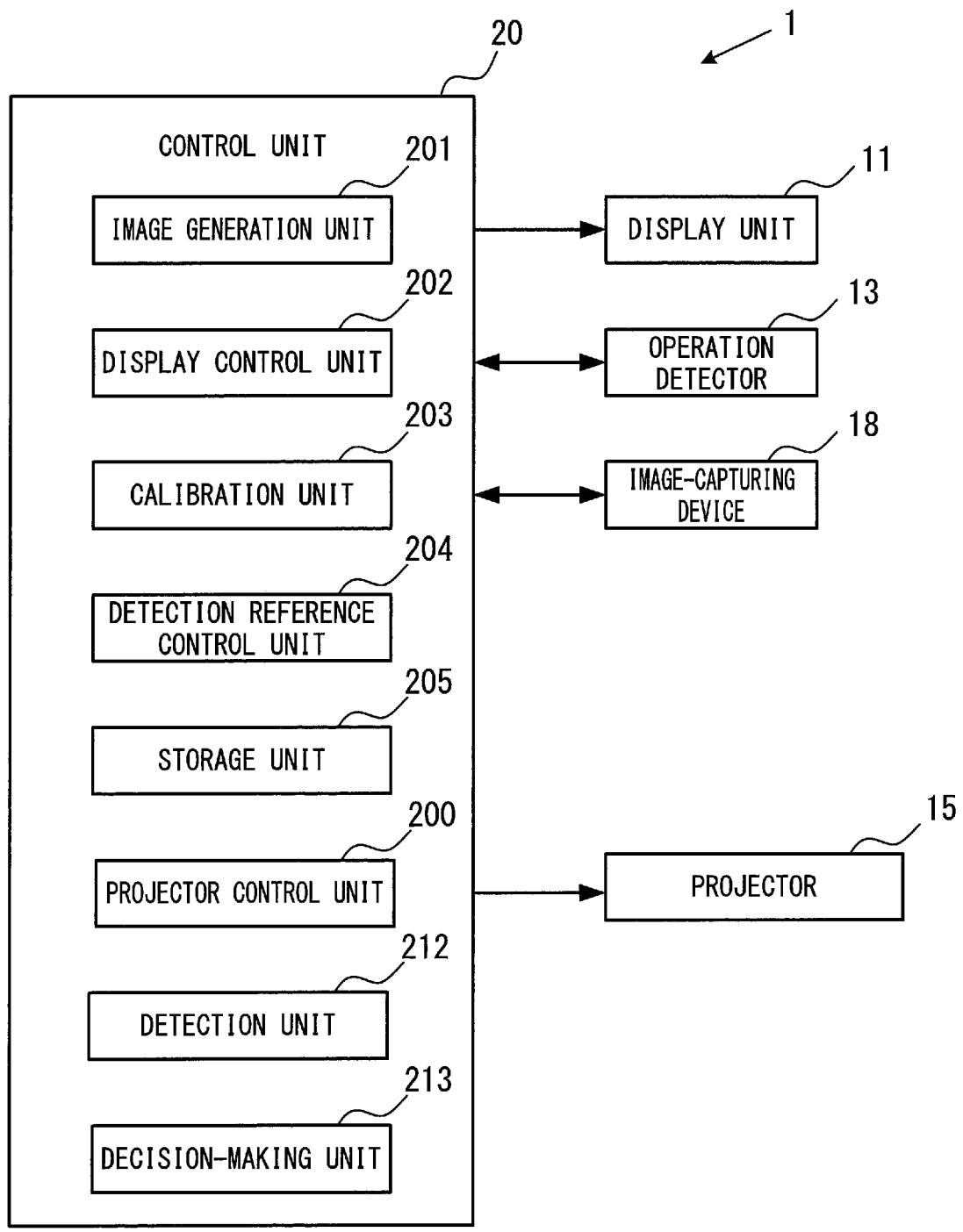

When the display position of an icon 30A changes, the image generation unit 201 may generate auxiliary image data expressing a first range 311 moving over the stage 14 by tracking the movement of the icon 30A. In this case, in response to a specific gesture made by the user 12, the display device 1 moves the midair image 30 in line with the gesture. Such a display device 1 adopts an essential configuration shown in the block diagram in FIG. 12. Namely, the display device 1 comprises a control unit 20, and an image-capturing device 18, a display unit 11, an image-forming optical system 9, an operation detector 13 and a projector 15, which are controlled by the control unit 20. The image-capturing device 18 may adopt a structure similar to that of the image-capturing device included in the display device 1 in variation 8, which will be described in detail later. The control unit 20 includes a detection unit 212 and a decision-making unit 213 in addition to the structural components of the control unit 20 in the display device 1 in the first embodiment shown in FIG. 2. The detection unit 212 detects a gesture made by the user 12 by using a plurality of sets of image capturing data generated by the image-capturing device 18. The decision-making unit 213 determines a direction along which and an extent by which the midair image 30 is to move based upon the detected gesture.

A user 12, looking at a midair image 30 formed by the display device 1 and wishing to move the position of the midair image 30, makes a predetermined specific gesture. The user 12, making the predetermined specific gesture may, for instance, wave his hand or arm to the right (e.g., toward the X direction + side), may flick his finger or his hand by first moving it toward the display device 1 and then flicking it along a specific direction (toward the X direction + side) or may perform a swipe gesture by moving his finger or hand so as to run it along a specific direction (toward the X direction + side) if he wishes to move the position of the midair image 30 to the right (e.g., toward the X direction + side). Furthermore, the user 12, looking at the midair image 30 and wishing to move it closer to himself (e.g., toward the + side along the Y direction) may pull his arm, having been extended forward, back toward himself or may make a hand gesture toward himself as if to beckon the midair image 30.

The detection unit 212 determines through detection as to whether or not the user 12 recorded in image capturing data has made the gesture described above based upon the image capturing data generated through an image capturing operation at the image-capturing device 18. Once it is determined through detection at the detection unit 212 that the gesture has been made, the decision-making unit 213 determines the direction along which and the extent by which the midair image 30 is to move. In this situation, if the user 12 has made the gesture by waving his hand or arm to the right (toward the X direction + side), the decision-making unit 213 decides that the midair image 30 is to move toward the X direction + side, toward which the hand or arm of the user 12 has moved. The decision-making unit 213 determines a displacement quantity, i.e., the extent by which the midair image 30 is to move, in correspondence to the extent by which the hand or arm has moved during the gesture. Namely, if the user 12 has waived his hand or arm by a small extent, the decision-making unit 213 sets a small displacement quantity for the midair image 30, whereas if the user 12 has waived his hand or arm by a great extent, it sets a great displacement quantity for the midair image 30. Alternatively, the decision-making unit 213 may move the midair image 30 from the current position to a position set apart by a predetermined displacement quantity. This means that the midair image 30 will move by a fixed displacement quantity regardless of the magnitude of the gesture made by the user 12. In this situation, if the midair image 30 does not move to the position desired by the user 12, the user 12 will repeatedly make similar gestures until the midair image 30 moves to the desired position.

The image generation unit 201 generates display image data based upon the direction along which and the extent by which the midair image 30 is to move, having been determined by the decision-making unit 213, and also generates auxiliary image data by adjusting the position of the first range 311, i.e., the position of the gravitational center of the luminance distribution, based upon the direction of movement and the displacement quantity described above. As a result, the midair image 30 moves over the XY plane based upon the gesture made by the user 12 and the first range 311 is projected by the projector 15 so as to move over the stage 14, located under the midair image 30, by tracking the movement of the midair image 30. Namely, the first range 311 moves over the stage 14 under the midair image 30 by tracking the movement of the midair image 30.

It is to be noted that the image generation unit 201 moves the first range 311 by tracking the movement of the midair image 30 in the example described above. As an alternative, the image generation unit 201 may generate display image data by adjusting the luminance of the first range 311 as described earlier, by adjusting the size of the first range 311 as described earlier and by moving the display position of the first range 311 as has been explained in reference to the first embodiment, as well as by moving the first range 311, in an optimal combination.

When the position of the icon 30A is changed, the image generation unit 201 in variation 1 of the first embodiment adjusts the position of the first range 311 in the auxiliary image 31 so as to track the position of the icon 30A. As a result, the user 12 is able to perceive the position of the icon 30A along the Z direction even when the icon 30A has moved.

<4. The Shape of the First Range 311 Altered Based Upon the Movement of the Midair Image 30 Along the Y Direction>

The image generation unit 201 may generate auxiliary image data based upon the display position of an icon 30A along the Y direction so that the size or the shape of a first range 311 is altered. Generally speaking, a shadow of a physical object becomes larger and its edges become more blurred as the distance between the object and the surface on which the shadow is cast, measured along the vertical direction, increases, whereas the shadow becomes smaller and its edges become sharper as the distance decreases. The image generation unit 201 simulates this phenomenon in the relationship between the midair image 30 and the first range 311 by controlling the size and the extent of blur at the edges of the first range 311.

Figure 13:
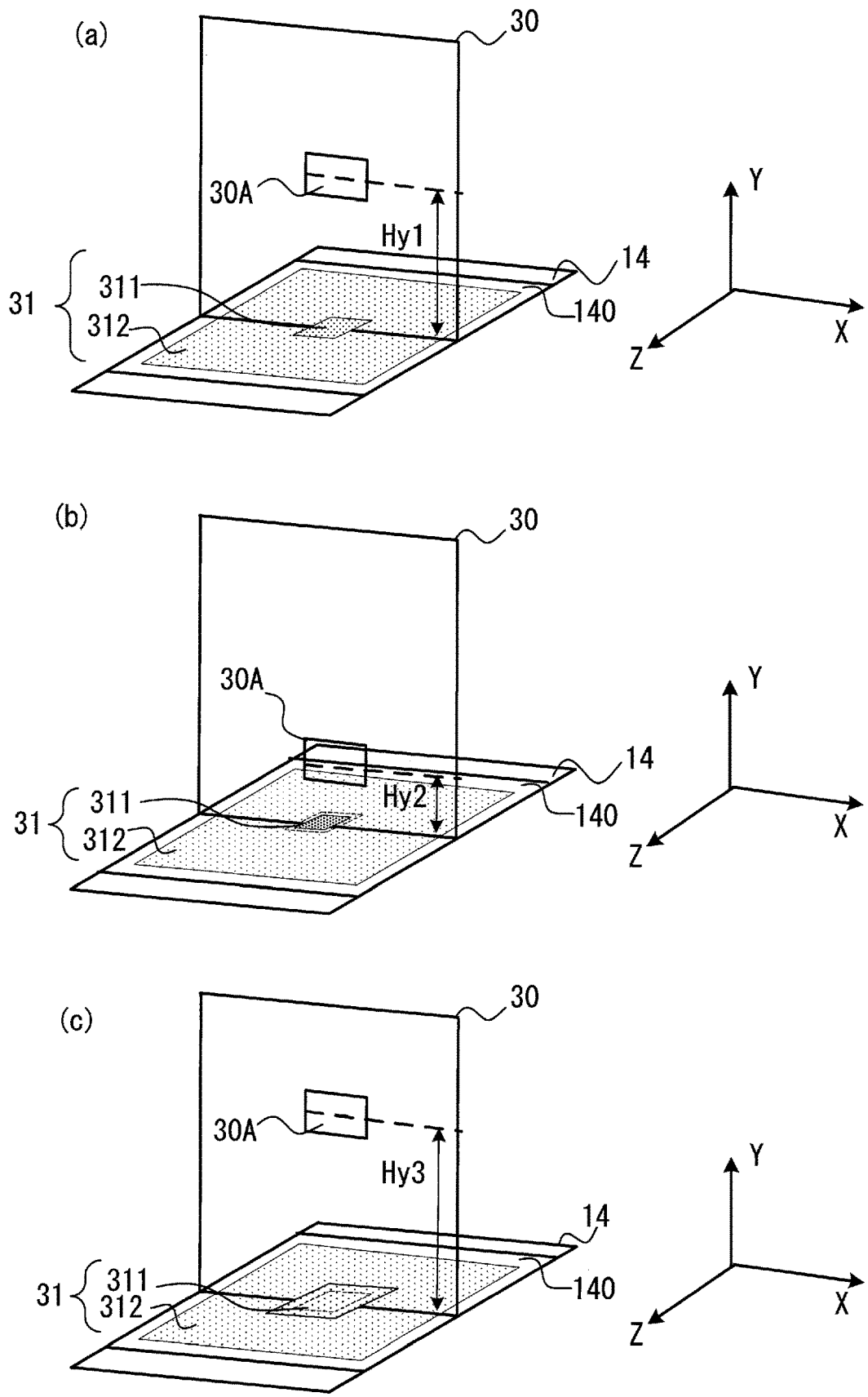

FIG. 13(a), similar to FIG. 11(a) in reference to which an explanation has been provided earlier, shows an icon 30A and an auxiliary image 31 brought up in an initial display, with the icon 30A and the stage 14 set apart from each other along the Y direction by a distance Hy1. In this situation, the image generation unit 201 generates auxiliary image data by setting an average value for the luminance distribution based upon the distance Hy1 so that the size of the first range 311 is increased relative to the size of the first icon 30A and that the first range 311 becomes blurred to a predetermined initial extent.

FIG. 13(b) shows the icon 30A displayed at a position shifted further toward the Y direction − side compared to the display position taken in the initial display. The distance between the icon 30A and the stage 14 measured along the Y direction in this condition is Hy2 (<Hy1). The image generation unit 201 generates auxiliary image data by setting the average value for the luminance distribution calculated as expressed in (2) to a small value so as to reduce the size of the first range 311 compared to that in the initial display and reduce the extent of blurring for better clarity compared to that in the initial state, based upon the difference (Hy1−Hy2) from the distance Hy1 between the icon 30A and the stage 14 corresponding to the initial display. As a result, a darker first range 311, which is smaller than that in the initial display and has sharper edges, is projected at a position below the icon 30A by the projector 15. It is to be noted that while the first range 311 in the initial display is indicated with dotted lines in FIG. 13(b), the first range 311 in the initial display does not need to be projected or it may be projected with lower luminance.

FIG. 13(c) shows the icon 30A displayed at a position shifted further toward the Y direction + side compared to the display position taken in the initial display. The distance between the icon 30A and the stage 14 measured along the Y direction in this condition is Hy3 (>Hy1). The image generation unit 201 increases the size of the first range 311 compared to that in the initial display and increases the extent of blurring for the first range 311 based upon the difference (Hy3−Hy1) from the distance Hy1 between the icon 30A and the stage 14 corresponding to the initial display. In other words, the image generation unit 201 generates auxiliary image data by setting the average value for the luminance distribution, calculated as expressed in (2), to a value greater than the value corresponding to the initial state. As a result, a brighter first range 311, which is larger than that in the initial display and has blurred edges, is projected at a position below the icon 30A by the projector 15.

It is to be noted that while the image generation unit 201 adjusts the size of the first range 311 and the extent of blurring based upon the position of the icon 30A along the Y direction in the example explained above, it may instead adjust only either the size of the first range 311 or the extent of blurring at the first range 311.

Furthermore, the image generation unit 201 may generate display image data by moving the first range 311 as explained earlier, by adjusting the luminance of the first range 311 as explained earlier, by adjusting the size of the first range 311 as explained earlier and by moving the display position of the first range 311 as has been explained in reference to the first embodiment in an optimal combination, in addition to adjusting the size of the shadow area and the extent of blurring along the edges.

The image generation unit 201 in variation 1 of the first embodiment controls the average value for the luminance distribution in the auxiliary image 31. Since the size of the first range 311 can be adjusted through these measures, the user 12 will be able to ascertain the relationship between the icon 30A and the auxiliary image 31 with better ease.

In addition, the image generation unit 201 in variation 1 of the first embodiment increases the size of the shadow of the icon 30A, by reducing the average value for the luminance distribution in the auxiliary image 31. As a result, the relationship between an actual physical object and its shadow is simulated through the use of the auxiliary image 31, which allows the user 12 to clearly perceive the relationship between the icon 30A and the auxiliary image 31.

Figure 29:
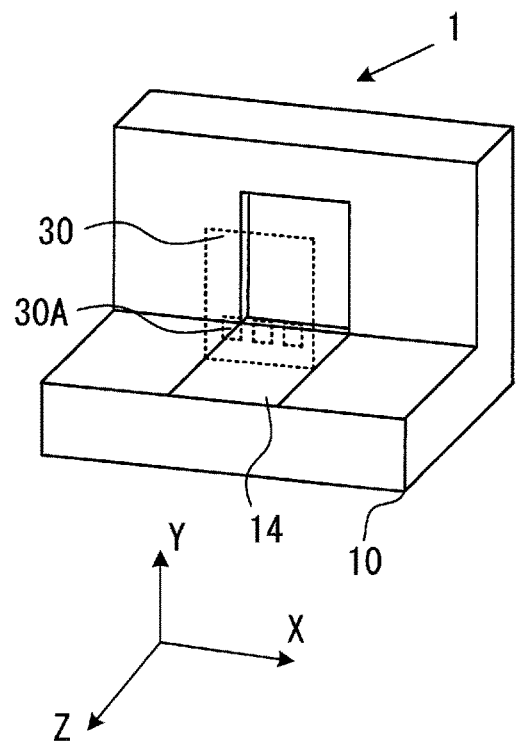
Figure 29:
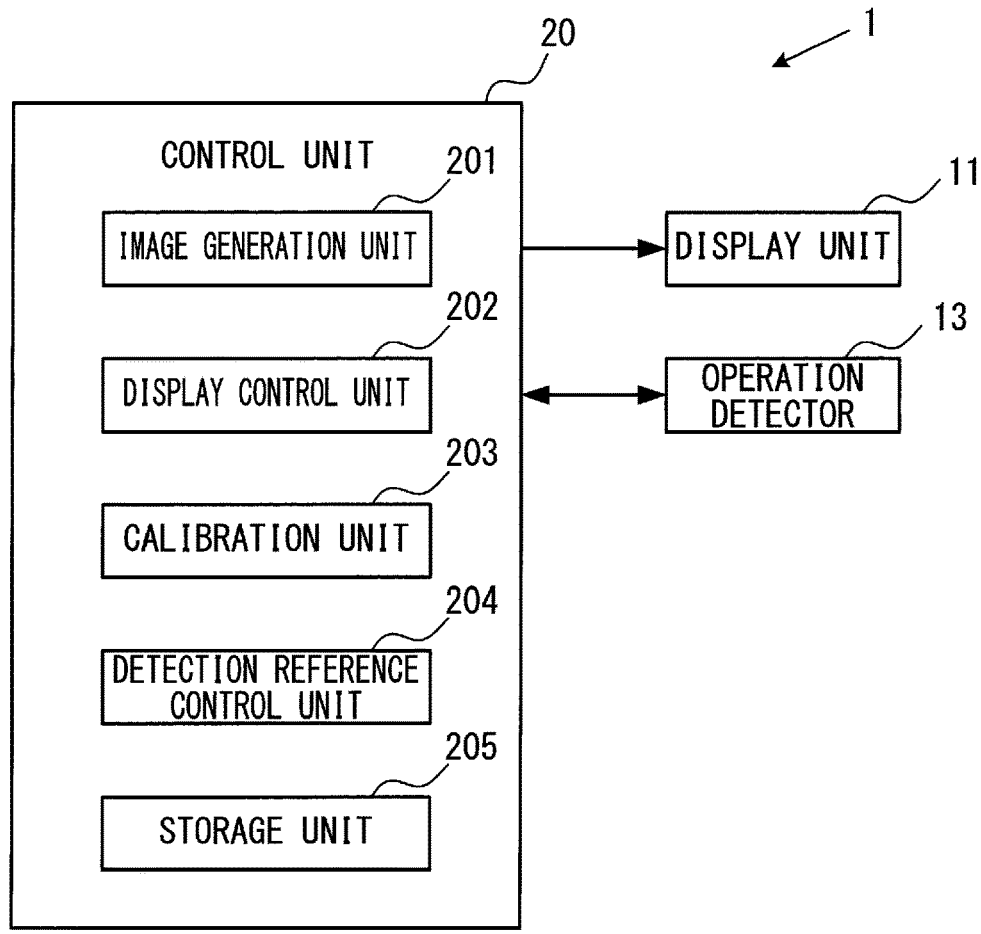

It is to be noted that the image generation unit 201 is able to display an auxiliary image 31 and an icon 30A such as those described in reference to example 2 through example 4 in variation 1 above via, for instance, a display unit 11 and an image forming optical system 9 in a third embodiment (see FIG. 29) as will be explained later. Namely, a perception may be created in the user 12 as if the position of an icon 30A in a midair image 30 has moved based upon the positional relationship between an operation performed by the user 12 with respect to the icon 30A and the detection reference 40 by controlling the average value for the luminance distribution in the auxiliary image 31.

The detection reference control unit 204 sets the detection reference 40 so that it ranges parallel to the ZX plane within the detection range 13A of the operation detector 13 located above the stage 14 (toward the Y direction + side). In this condition, the user 12 performs a press-down operation by moving his finger from the Y direction + side toward the Y direction − side and then moves his finger back toward the Y direction + side. Namely, the operation detector 13 detects the reach position along the optical axis of the image-forming optical system 9 with respect to the press-down operation performed by the user 12 for the midair image 30.

The projector 15 projects an auxiliary image 31 in the same way as in the first embodiment onto the stage 14 disposed at a position further downward (toward the Y direction − side) relative to the icon in the midair image 30. It is to be noted that the projection direction is adjusted so as to ensure that the projection light from the projector 15 does not cast a shadow of the finger or the like of the user 12 performing the operation onto the stage 14.

Figure 14:
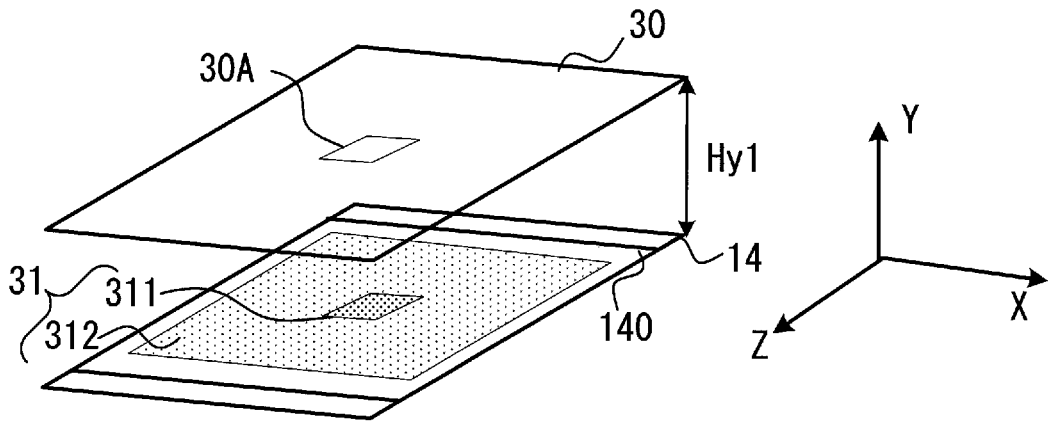
Figure 14:
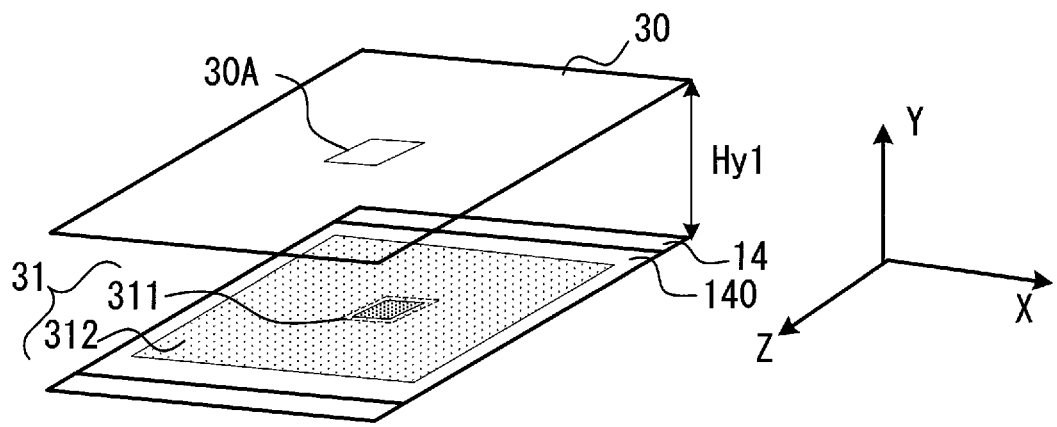
Figure 14:
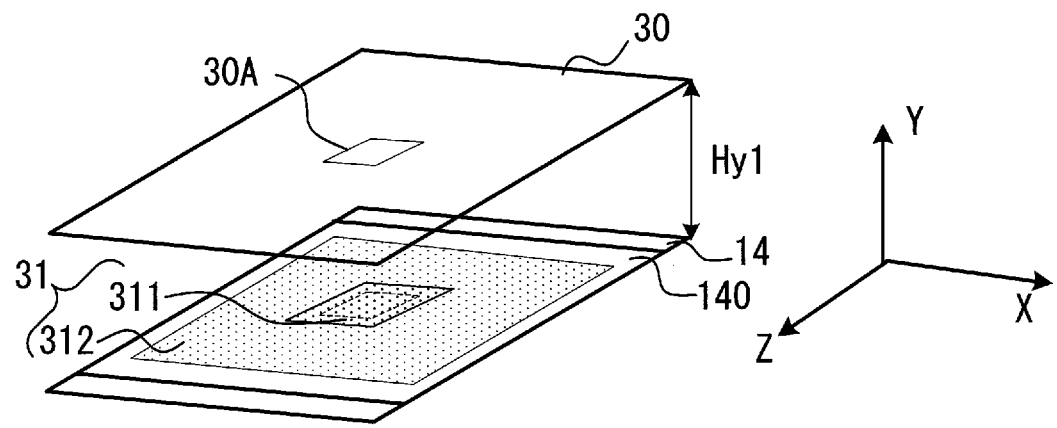

FIGS. 14(a) through 14(c) schematically illustrate a midair image 30 and an auxiliary image 31 that may be brought up on display under these circumstances. FIG. 14(a) shows the icon 30A and the auxiliary image 31 in an initial display. In this situation, the image generation unit 201 generates auxiliary image data by setting an average value for the luminance distribution so as to increase the size of the first range 311 relative to the size of the icon 30A based upon the distance Hy1, and have a predetermined initial extent of blurring for the first range 311.

The processing executed to create a perception as if the icon 30A in the initial display state shown in FIG. 14(a) has moved along a direction running away from the user 12 along the optical axis of the image-forming optical system 9 will be explained. If the reach position of the press-down operation performed by the user 12 with his finger is above the detection reference 40 (further toward the Y direction + side), the image generation unit 201 adjusts the display mode for the first range 311. The image generation unit 201 sets an average value for the luminance distribution so as to provide an image with the first range 311 taking a smaller size compared to that of the first range 311 in the initial display indicated with the dotted lines, which is equivalent to a darker shadow, as shown in FIG. 14(b). Namely, the image generation unit 201 generates auxiliary image data by setting a smaller average value for the luminance distribution in the auxiliary image 31 when the reach position does not arrive at the detection reference 40. The user 12, looking at the first range 311 in this display mode, perceives as if the icon 30A has moved toward the Y direction − side. The user 12 is thus expected to adjust the reach position or a specified position to a point further toward the Y direction − side.

The processing executed to create a perception as if the icon 30A in the initial display state shown in FIG. 14(a) has moved closer to the user 12 along the optical axis of the image-forming optical system 9 will be explained next. If the reach position of the press-down operation performed by the user 12 with his finger is below the detection reference 40 (further toward the Y direction − side), the image generation unit 201 adjusts the display mode for the first range 311. The image generation unit 201 sets an average value for the luminance distribution so as to provide an image with the first range 311 taking a greater size compared to that of the first range 311 in the initial display indicated with the dotted lines, which is equivalent to a lighter shadow, as shown in FIG. 14(c). Namely, the image generation unit 201 generates auxiliary image data by selecting a greater average value for the luminance distribution in the auxiliary image 31 if the reach position arrives at the section reference 40. The user 12, looking at the first range 311 in this display mode, perceives as if the icon 30A has moved toward the Y direction + side. The user 12 is thus expected to adjust the reach position or the specified position to a point further toward the Y direction + side.

<5. Adjustment Made in Correspondence to the Movement of the Midair Image 30 Along a Pitching Direction>

An auxiliary image 31 for an icon 30A, generated when a midair image 30 is not displayed within a plane parallel to the XY plane, i.e., when a midair image 30 is displayed with a tilt relative to the ZX plane forming a specific angle of inclination θ0 (<90°) leaning away from the vertical direction (the Y direction), will be explained next.

Figure 15:
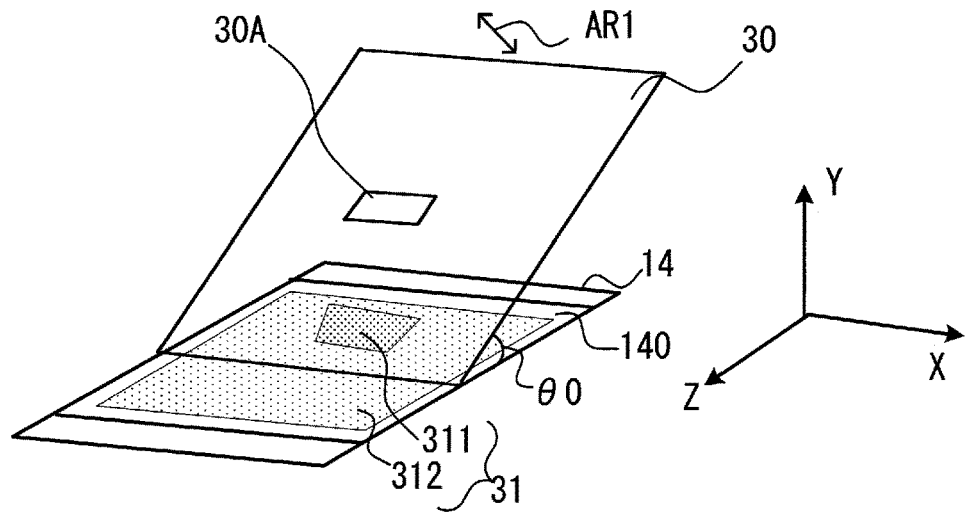
FIG. 15 A schematic presentation of a relationship between an icon and the display mode for the first range in another example of variation 1 of the first embodiment FIG. 16 A schematic presentation of a relationship between an icon and the display mode for the first range in another example of variation 1 of the first embodiment FIG. 17 A block diagram showing the essential configuration of the display device in variation 2 of the first embodiment FIG. 18 Illustrations of the calibration processing executed in variation 2 of the first embodiment in sectional views, each indicating the relationship among the operation detector, the midair image, the detection reference and the finger position, in (a) and (b)
Figure 15:
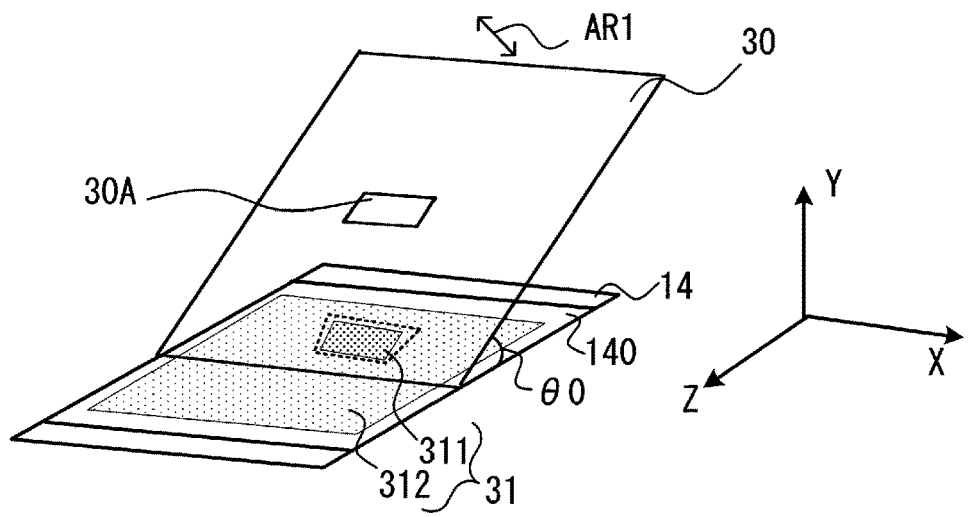
Figure 15:
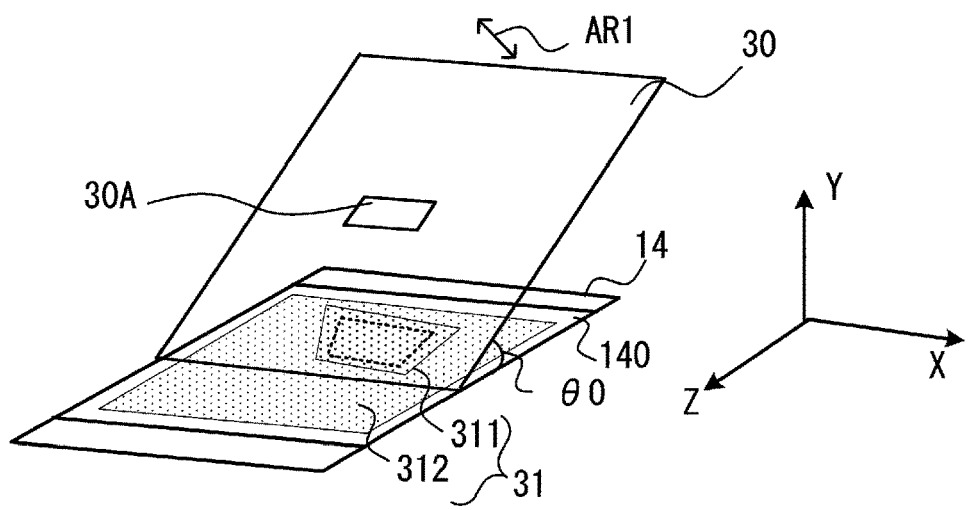

FIG. 15 schematically illustrates an icon 30A and an auxiliary image 31 that may be brought up on display in this situation. FIG. 15(a) shows them in an initial display, FIG. 15(b) shows the icon 30A displayed so as to appear to have moved along a direction running away from the user 12 and FIG. 15(c) shows the icon 30A displayed so as to appear to have moved closer to the user 12.

In conjunction with such a midair image 30, the image generation unit 201 generates auxiliary image data that creates a perception in the user 12 as if the icon 30A moves along a direction perpendicular to the plane with the specific tilt relative to the ZX plane, i.e., along the direction indicated by an arrow AR1. It is to be noted that the direction indicated by the arrow AR1 is not limited to that running perpendicular to the plane with the specific tilt relative to the ZX plane and may be any direction that intersects the plane with the specific tilt relative to the ZX plane.

As explained earlier, under normal circumstances, when the distance between a physical object and the surface on which its shadow is cast, measured along the vertical direction, is greater, the shadow will be larger with its edges blurred to a greater extent, whereas when the distance is smaller, the shadow is smaller and its edges are sharper. In addition, if the physical object moves along a direction other than the vertical direction, the shape of the shadow is distorted and as the distance measured along the vertical direction becomes greater, the extent of the distortion increases.

In the example presented in FIG. 15, the image generation unit 201 expresses the phenomenon described above through the auxiliary image 31. In the example presented in FIG. 15, the distance from the lower side of the icon 30A (the side located toward the Y direction − side) to the stage 14 is smaller than the distance from the upper side of the icon 30A (the side located toward the Y direction + side) to the stage 14. In other words, the shadow of the lower side of the icon 30A is shorter than the shadow of the upper side of the icon 30A. For this reason, the shadow that would be formed by the icon 30A on the stage 14, i.e., the first range 311 generated by the image generation unit 201, takes a trapezoidal shape with its lower base having a smaller length than its upper base in the example presented in FIG. 15.

The processing executed to create a perception in the user 12 as if the icon 30A in the initial display shown in FIG. 15(a) has moved further away from the user 12 along the direction indicated by the arrow AR1 will be explained. In this situation, the image generation unit 201 generates auxiliary image data by setting a gravitational center position for the luminance distribution so that the size of the first range 311 is reduced in comparison to that of the first range 311 in the initial display indicated by the dotted lines and its shape becomes distorted relative to the trapezoidal shape in the initial display, as illustrated in FIG. 15(b). The processing executed to create a user perception as if the icon 30A in the initial display state shown in FIG. 15(a) has moved closer to the user 12 will be explained next. In this case, the image generation unit 201 generates auxiliary image data by setting a gravitational center position for the luminance distribution so that the size of the first range 311 increases in comparison to that in the auxiliary image in the initial display indicated by the dotted lines and the shape of the first range 311 is distorted relative to the trapezoidal shape in the initial display, as illustrated in FIG. 15(c).

In addition, the image generation unit 201 may adjust the average value for the luminance distribution, i.e., may adjust the level of brightness, while distorting the shape of the first range 311. In this situation, the image generation unit 201 will lower the luminance of the first range 311 by reducing the average value of the luminance distribution in order to project the first range 311 shown in FIG. 15(*b*). The image generation unit 201 will raise the luminance of the first range 311 by increasing the average value of the luminance distribution in order to project the first range 311 shown in FIG. 15(*c*).

Furthermore, the image generation unit 201 may generate display image data by moving the first range 311 to track the midair image 30 as explained above, by adjusting the luminance of the first range 311 as explained earlier, by adjusting the size of the first range 311 as explained earlier and by moving the display position of the first range 311 as has been explained in reference to the first embodiment in an optimal combination, in addition to distorting the shape of the shadow area.

The image generation unit 201 in variation 1 of the first embodiment controls the shape of the auxiliary image 31 and the average luminance value when the icon 30A is displayed with a tilt relative to the vertical direction (Y direction). As a result, the relationship between an actual physical object and its shadow is simulated through the use of the auxiliary image 31, by adjusting the density and the shape of the first range 311, which allows the user 12 to clearly perceive the relationship between the icon 30A and the auxiliary image 31.

It is to be noted that while the auxiliary image 31 in the first embodiment and the various examples in the variation thereof having been described above is an image corresponding to a shadow, an image other than an image equivalent to a shadow may be used as the auxiliary image 31. For instance, the image generation unit 201 may generate auxiliary image data that render the first range 311, located under the icon 30A brighter, and render the second range 312 darker, as shown in FIG. 16(*a*).

In this situation, the image generation unit 201 may generate display image data expressing an icon 30A appearing as if it is illuminated from below. For instance, the image generation unit 201 may simulate the phenomenon whereby directional light illuminating a dark area is observed as a beam of light (shaft of light).

Figure 16:
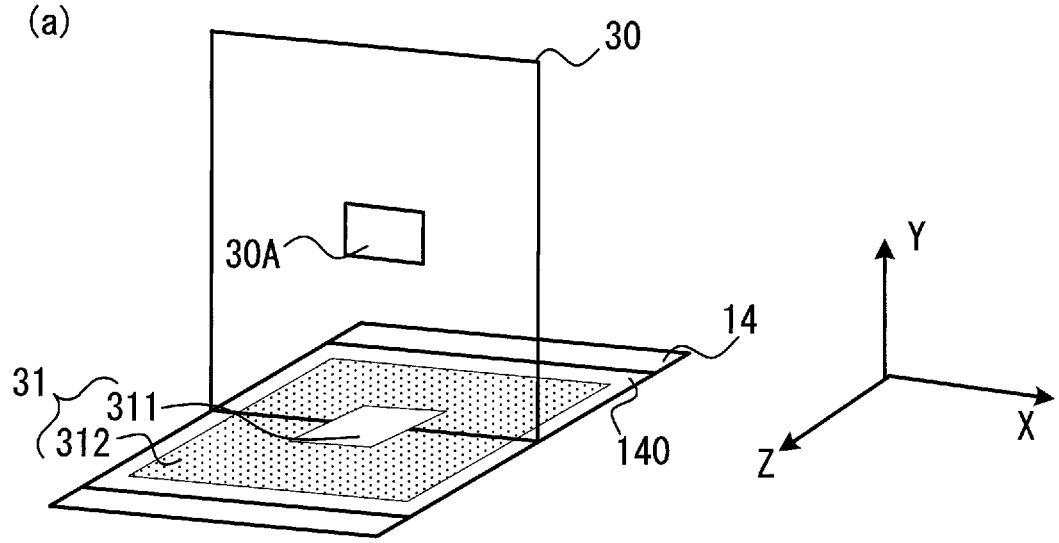
Figure 16:
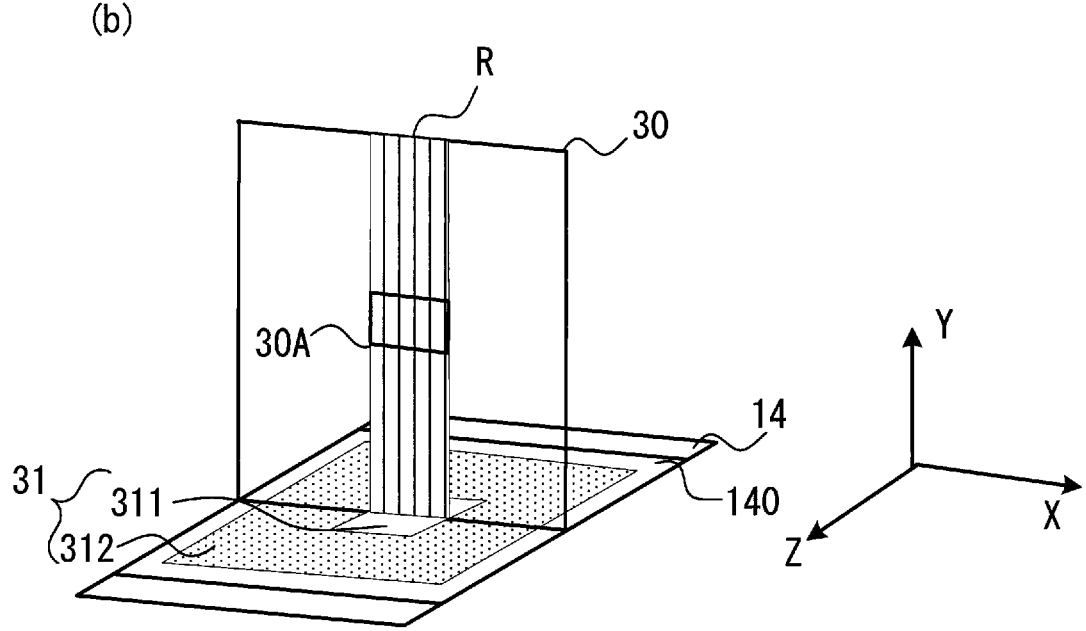

FIG. 16(*b*) schematically illustrates a midair image 30 and an auxiliary image 31 that may be displayed for such an effect. The image generation unit 201 generates display image data by superimposing white color or the like over an area R containing the icon 30A and ranging along the Y direction. The user 12, looking at the midair image 30, experiences a visual perception as if light from the stage 14, illuminating the icon 30A, is a shaft of light advancing towards Y direction + side.

It is to be noted that in the example presented in FIG. 16, the projector 15 may be disposed further downward relative to the stage 14 (toward the Y direction − side) so as to project projection light toward the Y direction + side. In such a case, it is desirable that the stage 14 be made of a transparent material.

(Variation 2 of the First Embodiment)

Figure 17:
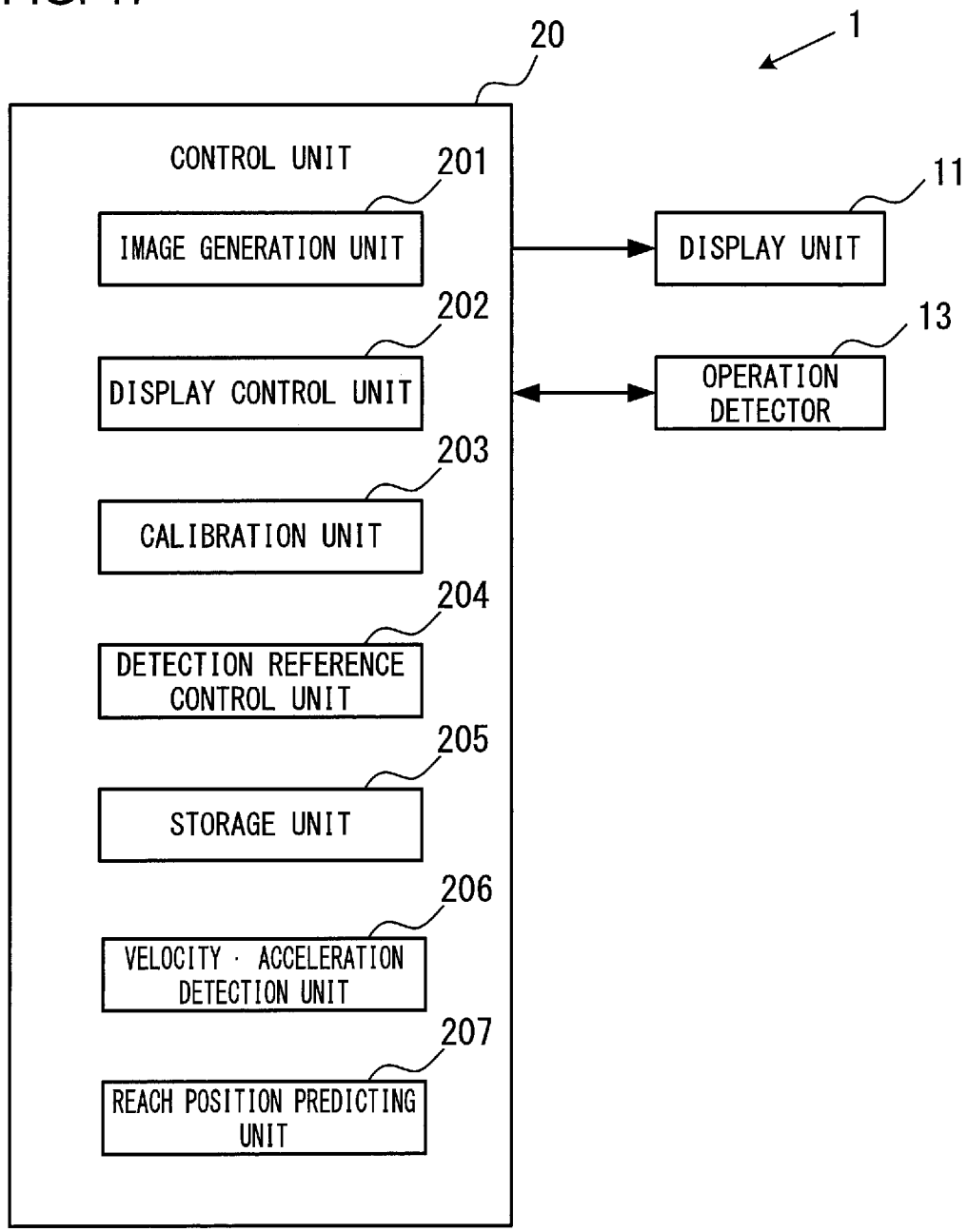

The display device 1 in the first embodiment or variation 1 thereof described above designates the furthest point to, which the user's fingertip reaches, as it first moves away from the user 12 (toward the Z direction − side) in order to perform an operation at an icon display position and then moves toward the user 12 (toward the + side along the Z direction) over a specific distance, as the reach position. The display device 1 then adjusts the display position of the first range based upon the distance between the reach position and the detection reference. The display device 1 may instead calculate the velocity or the acceleration of the fingertip F of the user 12 based upon the detection output provided by the operation detector 13, and predict a reach position of the fingertip F of the user 12 based upon the velocity or the acceleration having been calculated, as in variation 2. The display device 1 may then adjust the display position of the first range 311 based upon the distance between the predicted reach position and the detection reference. FIG. 17 is a block diagram showing the control unit 20 as well as the display unit 11 and the operation detector 13 controlled by the control unit 20, among the structural components in the display device 1 in variation 2.

The display device 1 in variation 2 will be described by focusing on its structural features different from those in the display device in the first embodiment. A velocity•acceleration detection unit 206 in FIG. 17 reads out the electrostatic capacitance value detected by the operation detector 13 after predetermined time intervals, calculates the velocity of the finger movement based upon a change occurring in the electrostatic capacitance value over each predetermined time interval and also calculates the acceleration of the finger movement based upon the velocity having been calculated. A reach position predicting unit 207 predicts the reach position for the finger based upon the finger movement velocity or acceleration output by the velocity•acceleration detection unit 206. The reach position predicting unit 207 is able to estimate the reach position for the finger by, for instance, detecting that the moving finger, having been accelerating or moving at a substantially constant speed, has shifted into a decelerating state and ascertaining the rate of deceleration. The image generation unit 201 adjusts the display position of the auxiliary image 31 based upon the reach position predicted by the reach position predicting unit 207.

Figure 18:
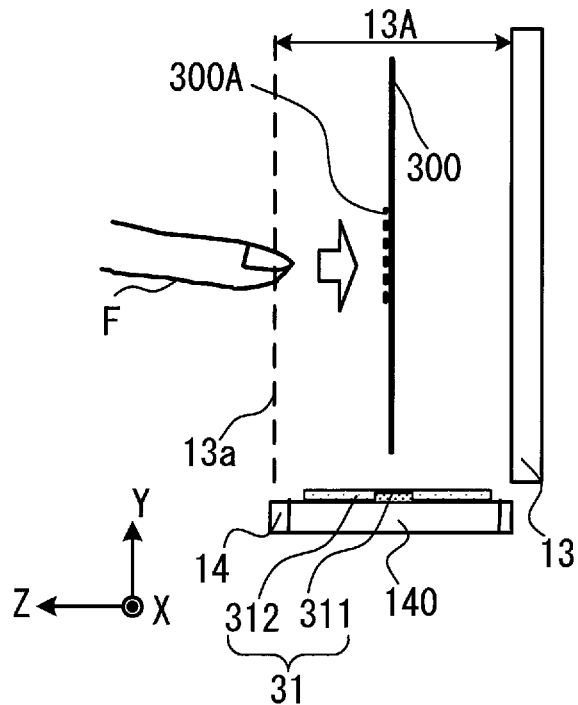
Figure 18:
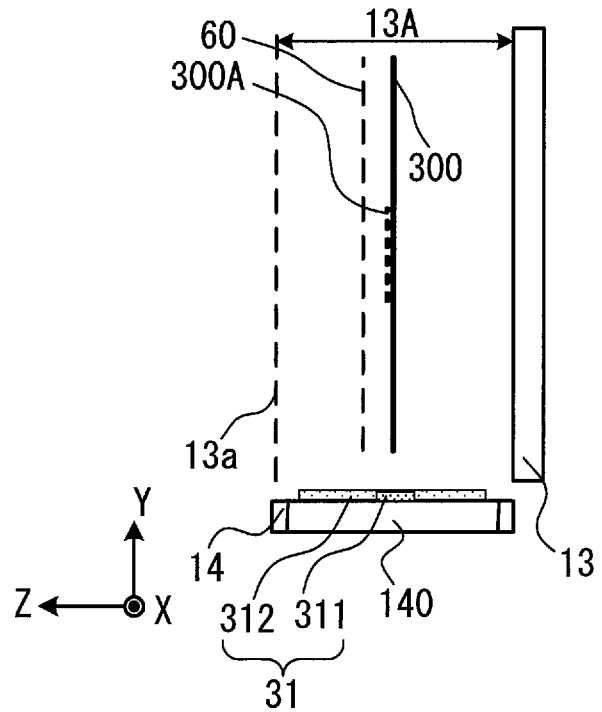
Figure 19:
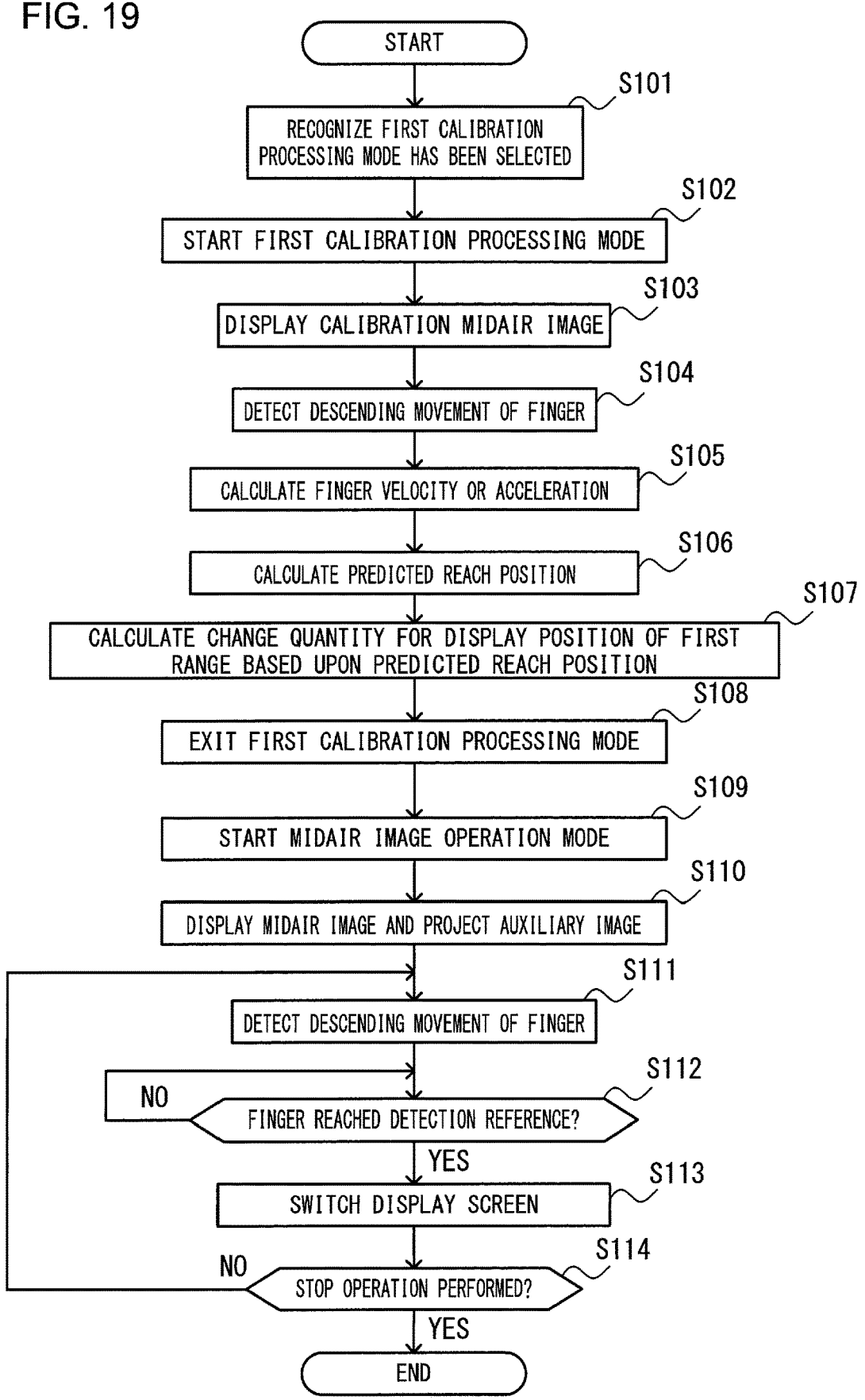
FIG. 19 A flowchart of the calibration processing executed in the first calibration processing mode in variation 2 of the first embodiment FIG. 20 A schematic illustration of a midair image brought up on display in the first calibration processing mode in variation 4 of the first embodiment FIG. 21 Illustrations of the calibration processing executed in variation 4 of the first embodiment in sectional views, each indicating the relationship among the operation detector, the midair image, the detection reference and the finger position, in (a) and (b)

Next, the processing executed in the first calibration processing mode in the display device 1 in variation 2 will be explained in reference to FIG. 18 and FIG. 19. The processing executed in steps other than step S104 through step S107 in the flowchart presented in FIG. 19 is identical to that in the flowchart presented in FIG. 7, and accordingly, a repeated explanation is not provided. As the fingertip F moves into the predetermined detection range 13A of the operation detector 13 as shown in FIG. 18(*a*), the operation detector 13 detects the movement of the fingertip F as a change in the electrostatic capacitance value in step S104. In step S105, the velocity•acceleration detection unit 206 calculates the velocity or the acceleration of the movement of the fingertip F based upon the detection output provided by the operation detector 13. In step S106, the reach position predicting unit 207 calculates the reach position for the fingertip F based upon the velocity or the acceleration of the movement having been calculated by the velocity•acceleration detection unit 206. The reach position for the finger calculated by the reach position predicting unit 207, i.e., predicted by the reach predicting unit 207, is indicated by a dotted line 60 in FIG. 18(*b*). Once the image generation unit 201 adjusts the display position of the first range 311 based upon the predicted reach position 60, as indicated in FIG. 18(*b*) in step S107, the image generation unit 201 stores data indicating the displacement quantity with respect to the display position of the first range 311 into the storage unit 205. In a subsequent step S110, the image generation unit 201 generates, based upon the stored data, display image data with adjustment made with respect to the display position of the first range 311 and the projector 15 projects the image data as a first range 311 for the midair image operation mode. It is to be noted that the reach position for the finger may be predicted based upon both the velocity and the acceleration of the finger movement or based upon either one of them.

It is to be noted that the velocity•acceleration detection unit 206 reads out the electrostatic capacitance value detected by the operation detector 13 after predetermined time intervals, calculates the velocity of the finger movement based upon a change occurring in the electrostatic capacitance value over each predetermined time interval and calculates the acceleration of the finger movement based upon the velocity thus calculated in the description provided above. However, the present variation is not limited to this method and it may be adopted in conjunction with a velocity•acceleration detection unit 206 configured with an image-capturing device. In addition, while the velocity•acceleration detection unit 206 calculates the velocity or the acceleration of the movement of the finger of the user 12 in the example described above, the velocity or the acceleration of the movement of the foot or elbow of the user 12 or the movement of a stylus pen held by the user may be calculated instead.

It is to be also noted that the reach position predicting unit 207 calculates a predicted reach position 60 for the finger of the user 12 based upon the velocity or the acceleration of the movement of the finger of the user 12 having been calculated and the image generation unit 201 adjusts the display position of the first range 311 based upon the predicted reach position 60 calculated for the finger of the user 12. However, the reach position predicting unit 207 does not need to determine the predicted reach position 60 for the finger of the user 12 for each operation. If the reach position predicting unit 207 calculates a predicted reach position 60 based upon an unintended movement of the finger of the user 12 occurring prior to a user operation, the display position of the first range 311 may be adjusted too frequently and it may become difficult to guide the fingertip F of the user 12 to the optimal position. Such an undesirable result can be prevented by engaging the reach position predicting unit 207 in calculation of a predicted reach position 60 and the image generation unit 201 in adjustment of the display mode for the first range 311 based upon the predicted reach position 60 only when the velocity•acceleration detection unit 206 has detected a velocity and an acceleration of the finger of the user 12 movement each represented by a value equal to or greater than a predetermined threshold value.

In variation 3, in which the reach position 50 for the finger is predicted based upon the velocity or the acceleration of finger movement, calibration processing can be executed promptly.

While the calibration processing in this variation is adopted in the first calibration processing mode in the first embodiment in the example described above, the calibration processing may also be adopted in the second calibration processing mode. In the latter case, the processing in step S105 and step S106 in the flowchart presented in FIG. 19 will be executed after step S24 in the flowchart presented in FIG. 9 in reference to which the first embodiment has been described. Subsequently, the display position of the auxiliary image 31 will be adjusted based upon the predicted reach position 60 calculated in step S28 and step S32 without executing the processing in step S27 and step S29 in FIG. 9.

By adopting variation 2 in the second calibration processing mode, it becomes possible to estimate in advance the reach position for the fingertip F of the user 12 performing a midair image operation before the fingertip F reaches the detection reference 40 and the display mode for the midair image 30 can be adjusted based upon the predicted reach position. This means that even when the fingertip F of the user 12 does not reach the detection reference 40, the user 12 is comfortably able to perform an operation since an error such as a failure to execute icon display switchover can be prevented.

(Variation 3 of the First Embodiment)

The display device 1 in variations 1 and 2 of the first embodiment detects or predicts the reach position and the image generation unit 201 adjusts the display position of the first range 311 based upon the distance between the reach position 50 and the detection reference 40 through a single session of calibration processing. As an alternative, the image generation unit 201 adjusts the display position of a first range 311 in the midair image operation mode based upon the distances between the reach positions detected through a plurality of sessions of calibration processing and the detection reference in the display device 1 in variation 3.

In a first calibration processing session, the detection reference control unit 204 determines the reach position 50 of the finger based upon the detection output provided from the operation detector 13. The image generation unit 201 calculates a displacement quantity with respect to the display position of the first range 311 based upon the reach position 50. The image generation unit 201 stores data indicating the calculated displacement quantity into the storage unit 205. A second calibration processing session is executed in succession and data indicating a displacement quantity are stored into the storage unit 205 in a similar manner. A third calibration processing session may be executed in succession following this session. Based upon the data indicating a plurality of displacement quantities stored in the storage unit 205 through the plurality of sessions of calibration processing having been executed successively as described above, the image generation unit 201 selects a single displacement quantity for the first range 311 displayed for the midair image operation mode.

The display position of a given first range 311 may be determined by using the data indicating the plurality of displacement quantities through any of various procedures. For instance, the image generation unit 201 may calculate a single displacement quantity for the first range 311 as the arithmetic mean of the plurality of displacement quantities or as the geometric mean of the plurality of displacement quantities. As an alternative, the image generation unit 201 may determine a new displacement quantity by applying optimal weight to each of the plurality of displacement quantities. For instance, the image generation unit 201 may calculate a displacement quantity for a first range 311 by weighting the displacement quantity $H_N$ determined through an Nth session and the displacement quantity $H_{N+1}$ determined through an N+1th session at a ratio of 3:7. In more specific terms, using $H_N$ and $H_{N+1}$, the image generation unit 201 calculates a displacement quantity for the first range 311 based upon the results of calculation executed as expressed as; $(H_N \times 3 + H_{N+1} \times 7)/10$. The weighting ratio used in this calculation is not limited to 3:7 and the number of sessions is not limited to 2, either. It will be obvious that instead of individually calculating a displacement quantity for the first range 311 based upon the reach position of the finger and storing it into the storage unit 205 in correspondence to each of the plurality of calibration processing sessions, reach positions of the finger, each detected in correspondence to a plurality of calibration processing sessions, may be stored into the storage unit 205 and a single displacement quantity for the first range 311 may be calculated based upon the plurality of reach positions thus stored.

In addition, the image generation unit 201 does not need to adjust the display position of the first range 311 if the distance between the reach position 50 and the detection reference 40 is equal to or less than a predetermined value, i.e., if the reach position 50 is close to the detection reference 40.

Furthermore, the image generation unit 201 does not need to adjust the display position of the first range 311 through each calibration processing session. Instead, the control unit 20 may calculate the number of times an operation at the icon display position has failed based upon the number of times that the reach position 50 has been determined and the number of times the reach position 50 has been judged to actually reach the detection reference 40 through a plurality of calibration processing sessions. The image generation unit 201 may adjust the display position of the first range 311 only if the number of times a failure has occurred is judged to be equal to or greater than a predetermined value.

While the calibration processing in this variation is executed in the first calibration processing mode in the first embodiment in the example described above, it may be executed in the second calibration processing mode or in variations 1 through 3 explained earlier.

In the calibration processing executed in variation 3 described above, the control unit 20 determines the reach position 50 by detecting a natural operating motion that the user 12 would normally make when performing an operation at the display position of an icon 30A in a midair image 30. Namely, the control unit 20 determines the reach position 50 by detecting an advancing movement of the finger intended to press on the icon, which then shifts to a retreating movement, or detecting a movement of the finger intended to come into contact with the icon, and then hold down the icon briefly. Thus, the calibration processing can be executed without the user 12 being aware of the reach position 50 being detected or determined through the calibration processing, i.e., without the user 12 being aware that calibration processing is in progress.

(Variation 4 of the First Embodiment)

In the first embodiment, the operation detector 13 determines the reach position 50 by detecting an operation the user 12 performs with his finger at the display position of the midair image 30 and the image generation unit 201 adjusts the display position of the first range 311 based upon the reach position 50. As an alternative, the user 12 may be allowed to specify the finger position at which he has experienced a perception of performing an operation at the display position of an icon in a midair image, and in such a case, the detection reference control unit 204 may recognize the specified position and the image generation unit 201 may adjust the display position of the first range 311 based upon the specified position. The following is a description of a variation in which the user 12 indicates the position at which he has had a perception of performing an operation at the display position of the midair image 30 as a specified position. It is to be noted that while an example in which variation 4 is adopted in the first calibration processing mode in the first embodiment is described below, it may also be adopted in the second calibration processing mode and in variations 1 through 4 described earlier.

Figure 20:
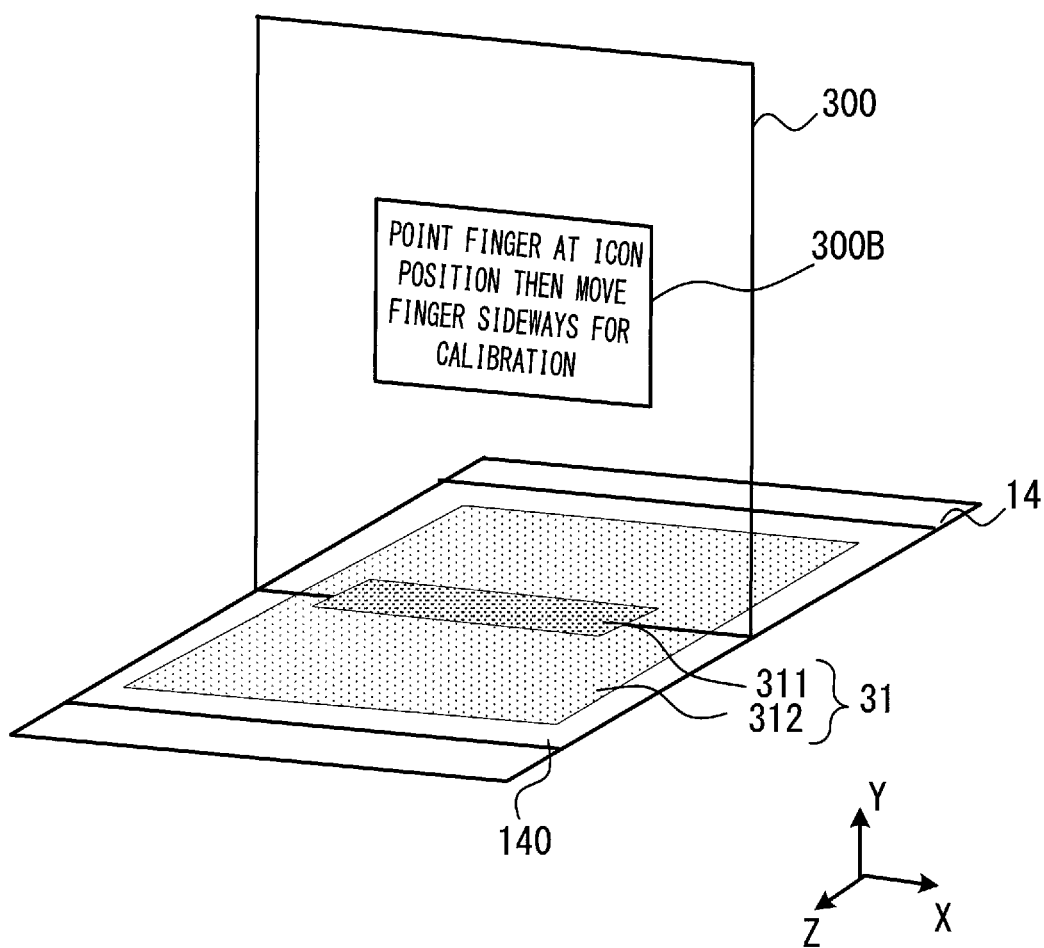

The following is a description of the display device in variation 4. As the display device 1 is started up and the user 12 operates the calibration processing mode selector operation button to select the first calibration processing mode, the calibration unit 203 in FIG. 2 starts the first calibration processing mode. The image generation unit 201 generates display image data, and the display unit 11 brings up a display image to be used in the calibration processing based upon the display image data. FIG. 20 shows the display image generated for the calibration processing brought up as a midair image 300. The midair image 300 includes an icon 300B for calibration, and a message "Point at this icon with finger and move the finger sideways for calibration" is superimposed on the calibration icon 300B. In addition, the detection reference control unit 204 sets the detection reference 40 to an initial position near the midair image 300, as indicated in FIG. 21(a).

Figure 21:
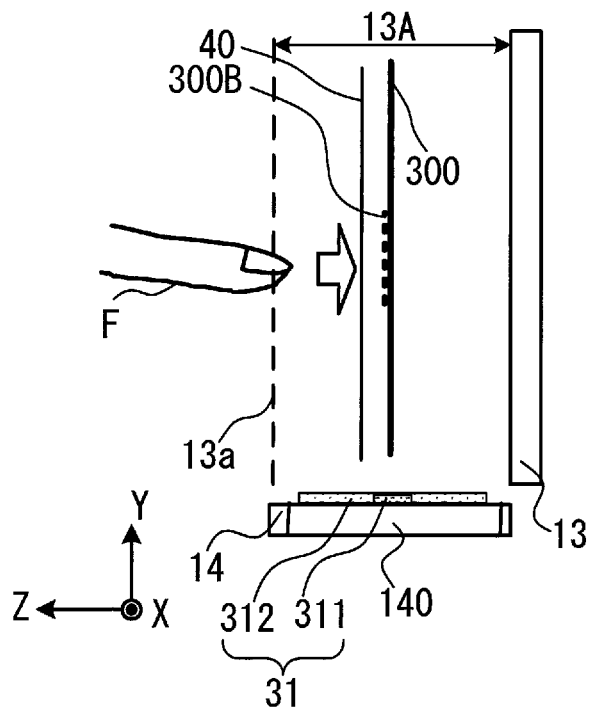
Figure 21:
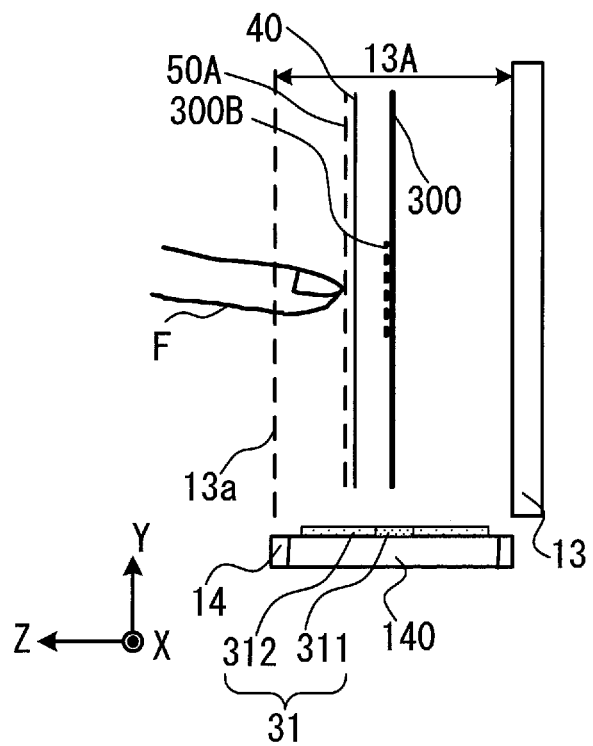

The user 12, following the instructions in the message superimposed on the icon 300B in the midair image 300, moves his fingertip F toward the icon 300B, i.e., toward the Z direction – side, as shown in FIG. 21(a), in order to perform an operation at the display position of the icon 300B. As the fingertip F reaches the electrostatic capacitance detection range 13A of the operation detector 13 shown in FIG. 2, the operation detector 13 detects the approaching movement of the fingertip F of the user 12 toward the icon 300B, i.e., toward the – side along the Z direction, as a change in the electrostatic capacitance.

The user 12 moves his finger further away from himself, toward the Z direction – side, and upon feeling that the fingertip F has reached the display position of the icon 300B in the midair image 300, he moves the finger F sideways along the display plane in which the midair image 30 is displayed, i.e., over the XY plane. The operation detector 13 detects the advancing movement and the lateral movement of the finger F. The detection reference control unit 204 designates the position of the finger F along the Z direction at the time point at which it determines that the advancing movement has switched to a lateral movement as the operation detector 13, having detected an advancing movement of the finger F thus far, detects a lateral movement of the finger F, as a specified position 50A. The image generation unit 201 adjusts the display position of the first range 311, i.e., calculates a displacement quantity with respect to the display position of the first range 311, based upon the specified position 50A. Data indicating the displacement quantity for adjustment are stored into the storage unit 205. It is to be noted that while the specified position 50A is located along the Z direction relative to the midair image 300 in the example presented in FIG. 21(b), the specified position 50A, i.e., the position at which the user 12 experiences a perception that his fingertip F has reached the icon 300B in the midair image 300, may be in alignment with the midair image 300 or may be further toward the – side along the Z direction relative to the midair image 300.

It is to be noted that the detection reference control unit 204 designates the position taken by the finger along the Z direction when the movement of the finger F along the advancing direction has shifted to the lateral movement as the specified position 50A in the description provided above, the present variation is not limited to this example. The detection reference control unit 204 may instead designate the position of the finger F along the Z direction at the end of the lateral movement following the advancing movement as the specified position 50A. As a further alternative, the detection reference control unit 204 may designate the average or the median of values indicating the positions of the finger F along the Z direction during the period of time elapsing between the start of the lateral movement of the finger F and the end of the lateral finger movement as the specified position 50A. As described above, the specified position 50A, at which the operation has been detected, is detected by the detection reference control unit 204.

Figure 22:
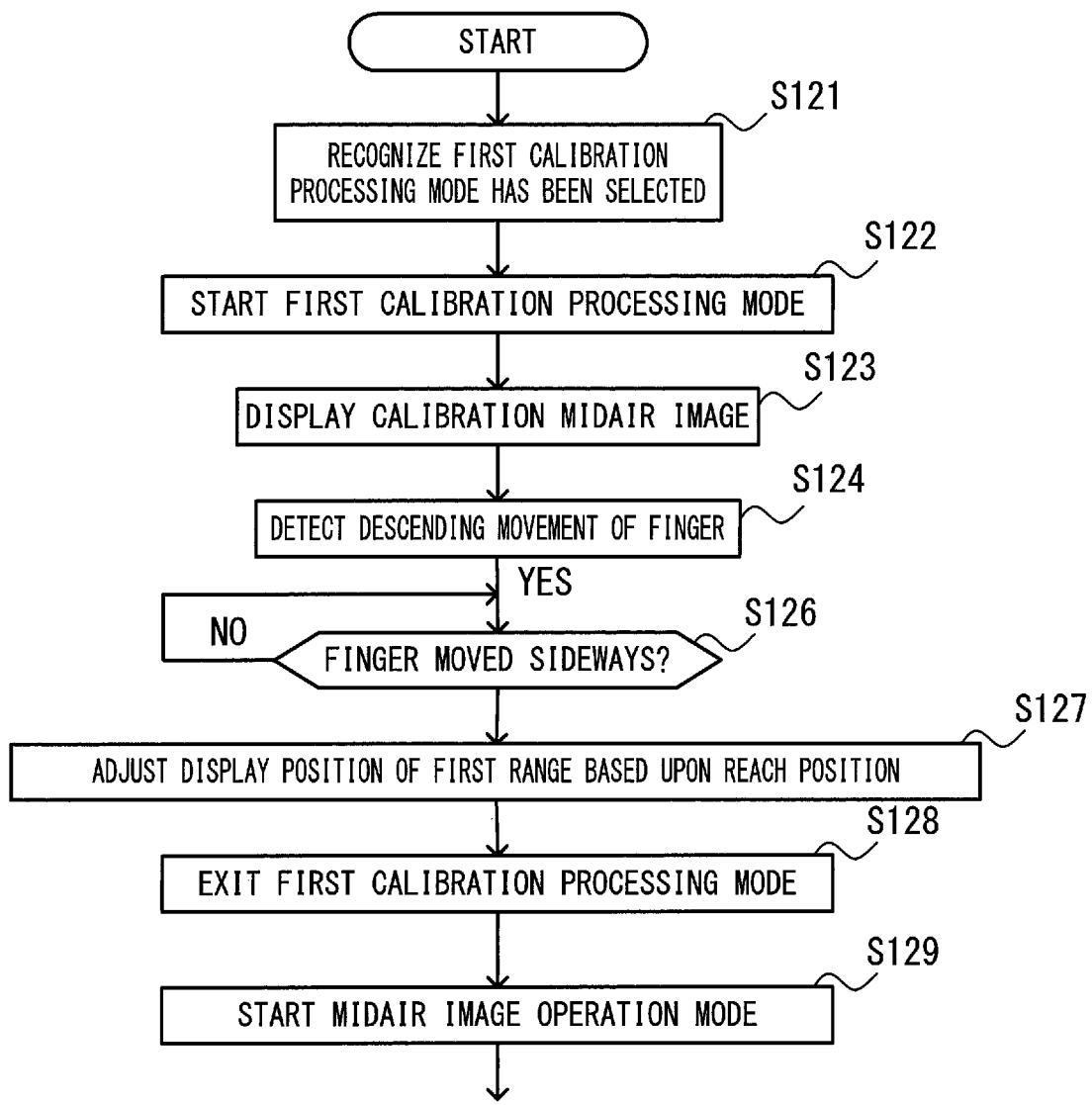
FIG. 22 A flowchart of the calibration processing executed in the first calibration processing mode in variation 4 of the first embodiment FIG. 23 A block diagram showing the essential configuration of the display device achieved in variation 7 of the first embodiment FIG. 24 Illustrations of the display device in variation 8 of the first embodiment, in a perspective showing the external appearance of the display device in (a) and in a block diagram showing the essential configuration of the display device in (b)

In reference to the flowchart presented in FIG. 22, the calibration processing executed in variation 4 will be described. It is to be noted that the flowchart in FIG. 22 only shows the processing executed in step S121 through step S129 and does not show the processing executed in subsequent steps. The processing executed in step S129 and subsequent steps is similar to the processing executed in step S109 and subsequent steps in the flowchart presented in FIG. 19.

Figure 7:
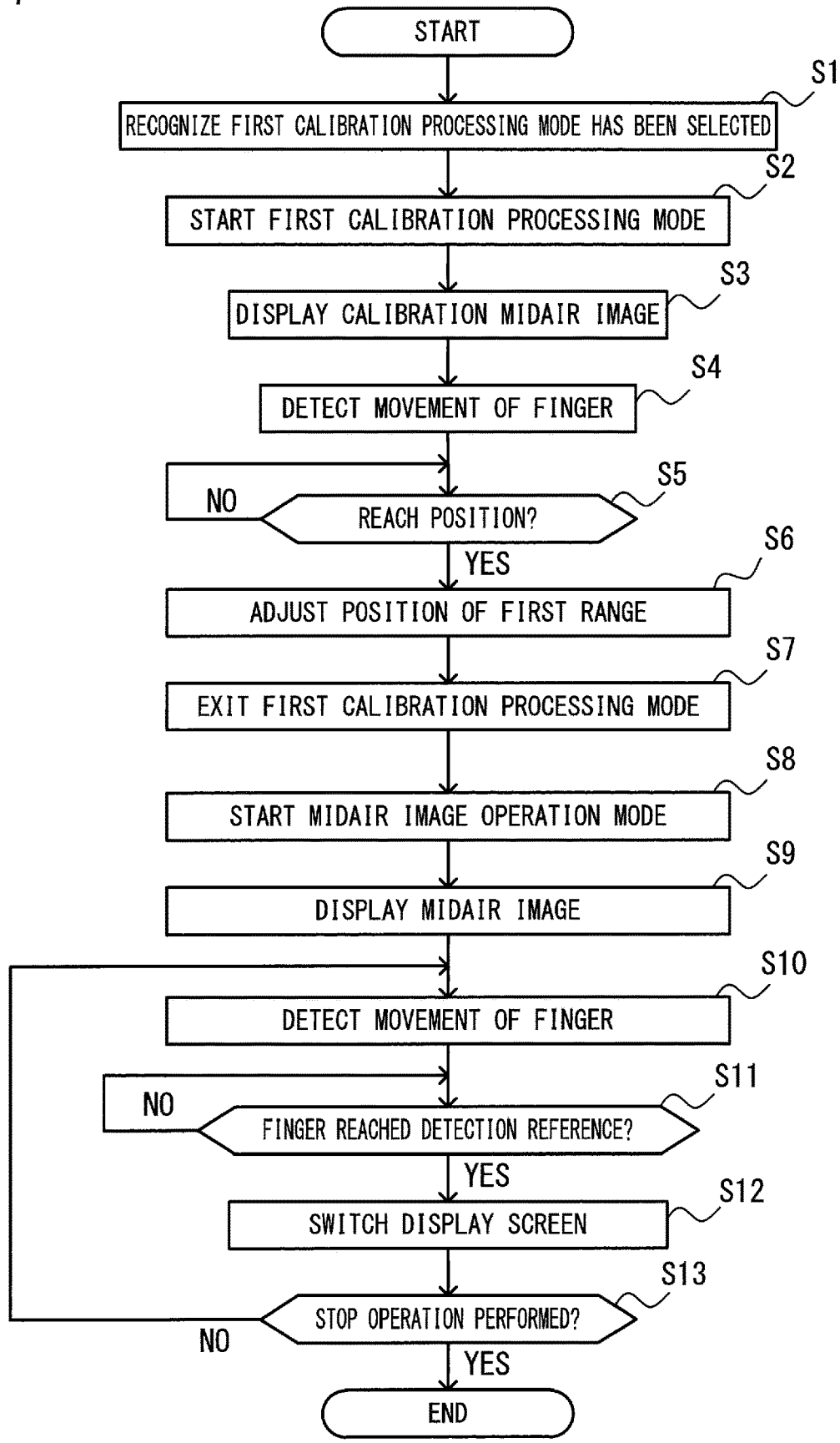

The processing executed in step S121 through step S124 is similar to that executed in step S1 through step S4 in the flowchart presented in FIG. 7. In step S126, the operation detector 13 detects the lateral movement of the finger of the user 12. In step S127, the detection reference control unit 204 decides, based upon the detection output from the operation detector 13, that a shift has occurred in the movement of the finger F from the advancing movement to the lateral movement, and designates the position taken by the finger F at the time of the shift as the specified position 50A. The image generation unit 201 adjusts the display position of the auxiliary image 31 based upon the specified position 50A and stores data indicating the displacement quantity for the display position into the storage unit 205 before the operation proceeds to step S128. In step S128, the first calibration processing mode ends and the operation proceeds to step S129. In step S129, the midair image operation mode starts. In the midair image operation mode, the image generation unit 201 adjusts the display position of the first range 311 based upon the data indicating the displacement quantity read out from the storage unit 205.

It is to be noted that while the processing executed in the first calibration processing mode is explained above, processing will be executed in the second calibration processing mode as shown in the flowchart presented in FIG. 9, in reference to which the first embodiment has been described. However, if the detection reference control unit 204 detects that the finger F, having been moving away from the user, has switched to a lateral movement through detection of an operation performed by the user 12 with respect to the icon 30A in step S24 in the flowchart presented in FIG. 9, the specified position 50A is determined instead of the reach position in step S27 and step S29. If the specified position 50A is determined in step S29, the detection reference control unit 204 makes a decision in step S29 as to whether or not the specified position 50A is in alignment with the position of the detection reference 40.

While the calibration processing in variation 4 is in progress, the user 12 specifies a position at which he experiences a perception of having performed an operation at the display position of the midair image 300 with his finger F by switching the movement of his finger F from an advancing movement to a lateral movement. In other words, the calibration processing is executed by the display device 1 by allowing the user 12 to specify an operation position perceived as the display position with respect to the icon 300B and thus, accurate calibration processing is enabled. In addition, indicating the specified position by switching the movement of the finger F from an advancing movement to a lateral movement assures good operability and the calibration processing can be executed quickly.

(Variation 5 of the First Embodiment)

The user 12 operating the display device 1 in variation 4 indicates the position at which he experiences a perception of performing an operation at the icon display position with his finger as a specified position by switching his finger movement from an advancing movement toward the Z direction − side to a lateral movement. The user 12 of the display device 1 in variation 5 indicates the position at which he experiences a perception of performing an operation at the icon display position with his finger by operating another icon. The calibration processing executed in this variation will be described next. It is to be noted that while an example in which variation 5 is adopted in the first calibration processing mode in the first embodiment is described below, it may also be adopted in the second calibration processing mode and in variations 1 through 4 described earlier.

As the display device 1 is started up and the user 12 operates the calibration processing mode selector operation button to select the first calibration processing mode, the calibration unit 203 in FIG. 2 starts the first calibration processing mode. The image generation unit 201 generates display image data, and the display unit 11 brings up a display image to be used in the calibration processing based upon the display image data. A midair image 300 brought up on display in this situation includes the icon 300B for calibration, shown in FIG. 20 in reference to which variation 4 of the first embodiment has been described, and another icon displayed near the icon 300B (e.g., toward the X direction − side). A message "Touch the icon on the left side with a finger of your left hand while pointing to this icon with a finger of your right hand for calibration", instead of the message shown FIG. 20, is superimposed on the calibration icon 300B.

The user 12, following the instructions in the message superimposed on the icon 300B, moves a fingertip F of his right hand toward the icon 300B in order to perform an operation at the display position of the icon 300B. As the fingertip of the user 12 reaches the electrostatic capacitance detection range 13A of the operation detector 13, the operation detector 13 detects the movement of the finger of the user 12 moving closer to the display position of the icon 300B, i.e., toward the − side along the Z direction, as a change in the electrostatic capacitance. The user 12 moves his finger further toward the − side along the Z direction and as soon as he experiences a perception of the fingertip F performing an operation at the display position of the icon 300B in the midair image 300, he moves a fingertip of his left hand toward the other icon in order to perform an operation at the display position of the other icon with the fingertip F of his left hand as directed in the message. The operation detector 13 detects the movement of the fingertip F toward the other icon. The detection reference control unit 204 designates the position taken by the fingertip F in the user's right hand at the time point at which the operation detector 13 detects that the finger of the user 12 is positioned on the other icon as a specified position 50A. The image generation unit 201 calculates, based upon the specified position 50A, a displacement quantity by which the display position of the first range 311 is to move as it does in the first embodiment. The image generation unit 201 then stores data indicating the displacement quantity for the display position of the first range 311 having been calculated into the storage unit 205.

It is to be noted that since the position taken by the right-hand finger when the user 12 experiences a perception of performing an operation at the display position of the icon 300B is designated as the specified position, the right-hand finger needs to move toward the midair image 300, i.e., toward the Z direction − side. However, the left-hand finger only needs to be positioned either toward the + side along the Z direction or the Z direction − side relative to the other icon to perform an operation at the display position of the other icon on the left hand side and thus, it is not strictly necessary for the user 12 to move the left-hand finger toward the Z direction − side. The left-hand finger may move along, for instance, a direction parallel to the plane of the midair image 300, i.e., along a lateral direction, until it reaches a point toward the + side along the Z direction or the Z direction − side relative to the other icon.

Furthermore, it is not essential that the user 12 uses a left hand finger and a right hand finger, as long as the operations described above can be detected both on the icon 300B and on the other icon in the calibration midair image 300. For instance, the user 12 may perform these operations by using two fingers of one hand on either side. In addition, instead of performing an operation at the display position of the other icon, the user may press an OK button (not shown) at the display device 1 in variation 5.

Figure 24:
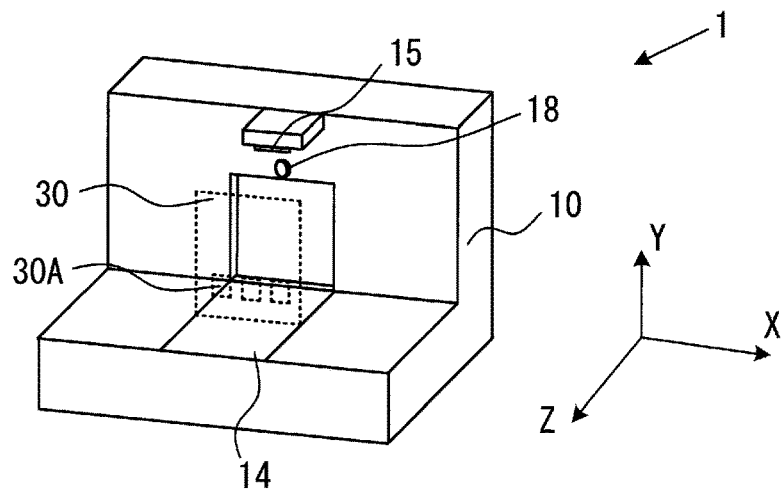
Figure 24:
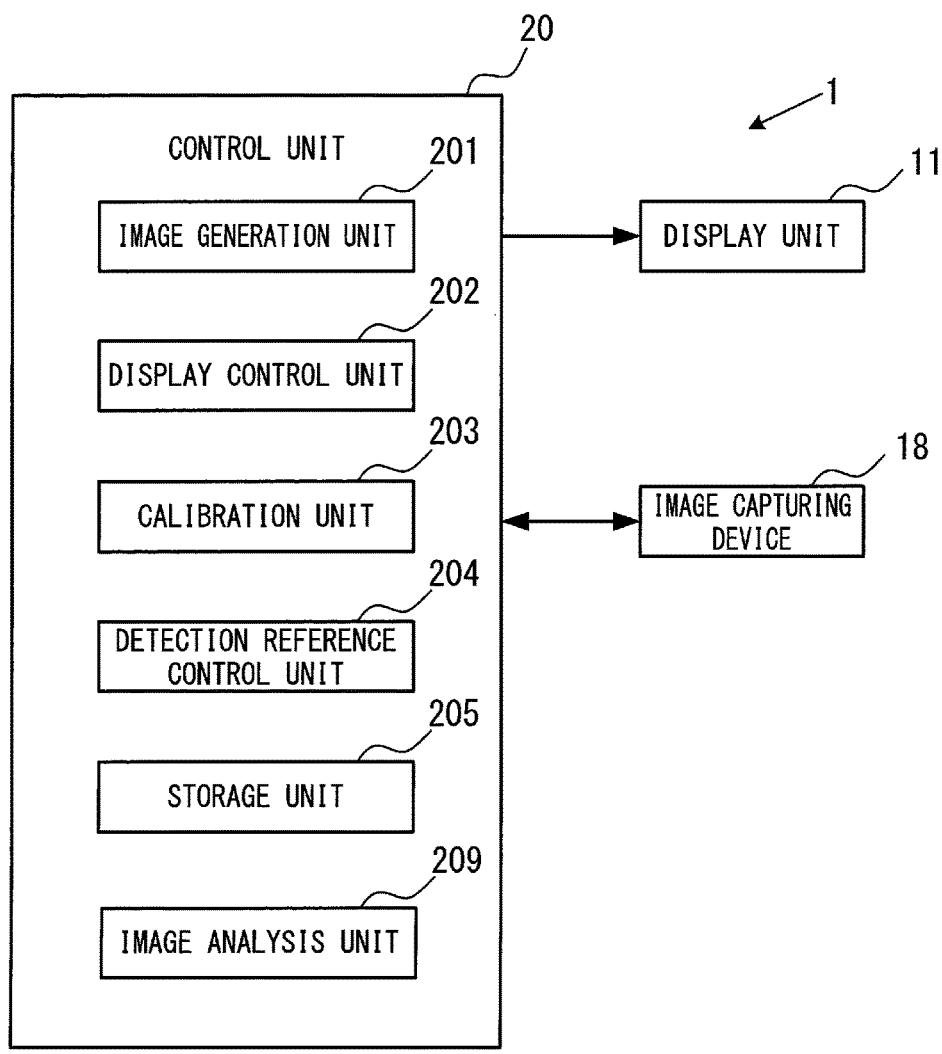

Moreover, instead of designating the position taken by the right hand fingertip when the user 12 performs an operation at the display position of the other icon or when the user 12 presses the OK button (not shown) as the specified position, the position of the right hand fingertip when the user 12 makes a predetermined gesture with his left hand may be designated as the specified position. In such a case, the display device 1 will include an image-capturing device 18 in variation 8 to be described later (see FIGS. 24 and 25) so that a gesture of the user 12 (e.g., the hand switching from the sign "stone" to the sign "paper") is detected by using images obtained via the image-capturing device 18.

In reference to the flowchart presented in FIG. 22 pertaining to variation 4 of the first embodiment, the calibration processing executed in this variation will be described. The following explanation will focus on the primary differences from the processing having been described and an explanation of steps in which similar processing is executed is not provided. In step S123 in FIG. 22, the icon 300B and the other icon are brought up on display. In step S124, the operation detector 13 starts detection of a movement of the fingertip in the user's right hand toward the Z direction − side. The user 12 moves his finger further toward the Z direction − side and then performs an operation at the display position of the other icon with his left-hand fingertip at the time point at which he experiences a perception of the right-hand fingertip performing an operation at the display position of the icon 300B in the midair image 300. In step S127, the position taken by the right-hand fingertip at the time point at which the user 12 has performed the operation at the display position of the other icon with his left hand is designated as the specified position 50A, and the image generation unit 201 adjusts the display position of the first range 311 based upon the specified position 50A and stores data indicating the displacement quantity for the first range 311 representing the adjustment into the storage unit 205.

It is to be noted that while the processing executed in the first calibration processing mode has been explained above, processing will be executed in the second calibration processing mode as shown in the flowchart presented in FIG. 9, in reference to which the first embodiment has been described. However, while detecting an operation performed by the user 12 with his right hand for the icon 30A, the detection reference control unit 204 may detect an operation performed by the user 12 using his left hand at the display position of the other icon in step S24 in the flowchart presented in FIG. 9. In such a case, the detection reference control unit 204 will determine that the position of the fingertip of the user's right hand is the specified position 50A, instead of determining the reach position, in step S27 and step S29. In step S30, a decision is made as to whether or not the specified position 50A determined in step S29 is in alignment with the detection reference 40.

In variation 5, the user 12 indicates a specified position at which the finger operates the icon during the calibration processing by operating another icon or by operating the OK button at the display device 1. The calibration processing allowing the user 12 to specify the position at which he perceives the icon 300B can be executed with high accuracy in the display device 1. In addition, by allowing the user to indicate the specified position through an operation at another icon or at a button at the display device, the calibration processing can be executed promptly.

(Variation 6 of the First Embodiment)

The user 12 of the display device in variation 6, perceiving that he has performed an operation at the display position of an icon with his fingertip, indicates a specified position by holding the finger still for a predetermined length of time. It is to be noted that while an example in which variation 6 is adopted in the first calibration processing mode in the first embodiment is described below, it may also be adopted in the second calibration processing mode and in variations 1 through 5 described earlier.

In this variation, a message "Point at this icon and hold the finger still for a moment for calibration" is brought up in a superimposed display in an icon included in the calibration midair image. The user 12, perceiving that he has performed an operation at the icon display position, briefly holds the finger still and, in response, the operation detector 13 detects cessation of the downward movement of the finger over a predetermined length of time. The detection reference control unit 204 designates the position at which the finger is held still as the specified position based upon the detection output provided by the operation detector 13 at this time.

The specified position is determined as described below. Namely, it is decided that an operation has been performed at the display position of an icon 300A when the fingertip F, having been moving toward the − side along the Z direction, comes to a stop and is held still within a relatively small predetermined holding range taken along the Z direction over a length of time equal to or greater than a predetermined time length. It is decided that an operation has been performed at the display position of the icon 300A with the fingertip F when the fingertip F stays within the specific holding range over the predetermined time length or longer, as described above, based upon the following rationale. Namely, the operation performed by user 12 at the display position of the icon 300A in the midair image 300 is different from an operation performed at a touch panel and the fingertip F may not become completely still at the display position of the icon 300A. It is to be noted that the predetermined holding range in reference to which the specified position is determined will be set to a value sufficiently small relative to the electrostatic capacitance detection range 13A of the operation detector 13, e.g., 5 mm, and the predetermined time length will be set to, for instance, 2 sec.

In variation 6, the user 12 specifies a position at which he performs an icon operation with his finger by holding the fingertip F still during the calibration processing. Since the user 12 is able to specify the position at which he perceives the icon 300A to be located, the display device 1 is able to execute accurate calibration processing.

(Variation 7 of the First Embodiment)

The user 12 of the display device in variation 7 indicates with his voice the specified position at which he experiences a perception of performing an operation with his fingertip at an icon display position. It is to be noted that while an example in which variation 7 is adopted in the first calibration processing mode in the first embodiment is described below, it may also be adopted in the second calibration processing mode and in variations 1 through 6 described earlier.

Figure 23:
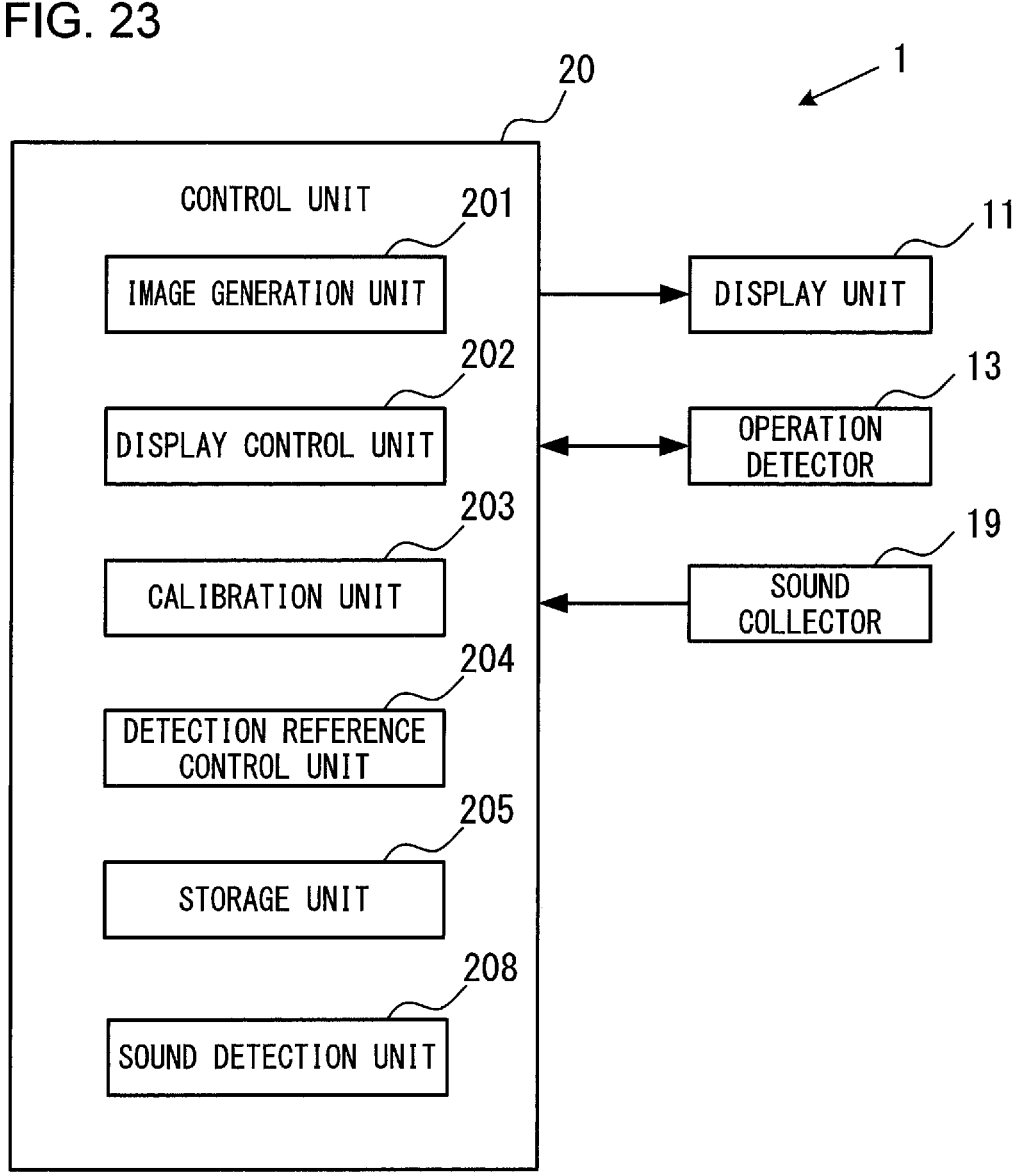

FIG. 23 is a block diagram showing the control unit 20, and the display unit 11 and an operation detector 13 controlled by the control unit 20, among the structural components in the display device 1 in this variation. The display device 1 includes a sound collector 19, with a sound detection unit 208 installed in the control unit 20. The sound collector 19 collects sound around the display device 1 and outputs the collected sound as audio data to the sound detection unit 208. The sound collector 19 may be a commonly available microphone. The sound detection unit 208 designates the audio data provided from the sound collector 19 and makes a decision as to whether or not the audio data express the word "yes".

After the calibration unit 203 in FIG. 23 starts up the first calibration processing mode, the image generation unit 201 generates display image data, and the display unit 11 brings up a display image to be used in the calibration processing based upon the display image data. A midair image 300 brought up on display in this situation includes the calibration icon 300B shown in FIG. 20 in reference to which variation 4 of the first embodiment has been described, and a message "Touch this icon and say yes for calibration", instead of the message in FIG. 20, is superimposed on the calibration icon 300B.

The user 12, following the instructions in the message brought up in the superimposed display at the icon 300B, moves his fingertip toward the icon 300B in order to perform an operation at the display position of the icon 300B. The user 12 says "yes" as directed in the message when he perceives that his fingertip has touched the icon 300B. The operation detector 13 detects the movement of the fingertip toward the – side along the Z direction. The sound collector 19 picks up the user's voice and outputs it as audio data to the sound detection unit 208. As the sound detection unit 208 decides that the audio data correspond to "yes", the detection reference control unit 204 designates the position taken by the fingertip, detected by the operation detector 13 at the exact time point, as a specified position 50A. The image generation unit 201 adjusts the display position of the first range 311 by calculating a displacement quantity by which the display position of the first range 311 is to move as it does in the first embodiment. The image generation unit 201 then stores data indicating the displacement quantity having been calculated into the storage unit 205.

The calibration processing described above will be explained in reference to the flowchart presented in FIG. 22 pertaining to variation 4 of the first embodiment. Since only the calibration processing executed in step S126 in FIG. 22 is distinguishable from that executed variation 4, the explanation will focus on step S126 in FIG. 22 and a repeated execution of the processing executed in other steps will not be provided. In step S126 in FIG. 22, the sound detection unit 208 makes a decision as to whether or not the user 12 has said "yes" based upon the output from the sound collector 19. If an affirmative decision is made in step S126, i.e., if it is decided that the user 12, perceiving that he has touched the icon 300B, has said "yes", the detection reference control unit 204 designates the position of the fingertip at the time point at which the sound detection unit 208 recognizes the word "yes" as the specified position 50A, i.e., determines or decides it to be the specified position 50A.

It is to be noted that while the processing executed in the first calibration processing mode is explained above, processing will be executed in the second calibration processing mode as shown in the flowchart presented in FIG. 9, in reference to which the first embodiment has been described. However, if an operation performed by the user 12 with respect to the icon 30A is detected in step S24 in the flowchart presented in FIG. 9 and the sound detection unit 208 recognizes the word "yes", the detection reference control unit 204 designates the specified position 50A instead of determining the reach position in step S27 and step S29. In step S30, a decision is made as to whether or not the specified position 50A designated in step S29 is in alignment with the detection reference 40.

In variation 7, the user 12 vocally indicates the specified position taken by his finger when he perceives that an operation has been performed at the display position of the icon. By allowing the user 12 to indicate the reach position with his voice, the display device 1 is able to execute the calibration processing quickly.

It is to be noted that the display device 1 does not need to include the sound collector 19 and the sound detection unit 208 in such a configuration may execute sound detection by using audio data obtained at an external sound collecting device and input thereto from the external sound collecting device via either a wireless means or a wired means.

(Variation 8 of the First Embodiment)

While the downward movement of the fingertip of the user 12 is detected by the operation detector 13 configured with a capacitive panel in the description provided above, the position of the fingertip of the user 12 may be detected by an image-capturing device, instead. The display device 1 in variation 8 includes an image-capturing device (e.g., a digital camera) 18 to function as an operation detector, disposed at the upper surface of the display device 1, as shown in FIG. 24(a). A block diagram pertaining to such a display device 1 is provided in FIG. 24(b).

The control unit 20 of the display device 1 in the block diagram presented in FIG. 24(b) includes an image analysis unit 209. The image-capturing device 18 captures an image of an object located above the display unit 11, i.e., the finger of the user 12, and the captured image is input to the image analysis unit 209. The image analysis unit 209 determines the position of the fingertip of the user 12 by analyzing the captured image input from the image-capturing device 18. Namely, the image analysis unit 209 makes a decision based upon the position of the image of the finger within the captured image, with respect to a specific icon, among the plurality of icons, being operated with the fingertip of the user 12. In addition, the image analysis unit 209 compares the size of the finger image within the captured image with a standard finger size, and more specifically, with the size of a finger at a predetermined heightwise position, an image of which has been captured in advance, so as to determine the heightwise position of the finger, i.e., the position taken by the descending finger. Through this process, the position of the fingertip of the user 12 within the three-dimensional space can be determined. The display device 1 in variation 8 structured as described above is capable of obtaining, through analysis of the captured image provided via the image-capturing device 18, information similar to the information pertaining to the fingertip position obtained via the operation detector 13 configured with a capacitive panel. Thus, the display device in variation 8 is able to execute processing similar to that executed in the embodiment and the variations thereof described earlier, by using the image-capturing device 18 instead of the capacitive panel having been described in reference to the embodiment and the variations 1 through 7 thereof.

While the image analysis unit 209 in the display device 1 in variation 8 calculates the heightwise position of the finger based upon the size of the finger in the captured image, the image-capturing device 18 may instead detect the heightwise position of the finger via a phase focus detection device and an image recognition device mounted in the digital camera. In more specific terms, the image recognition device may recognize a finger, the phase focus detection device may detect a defocus quantity with respect to the finger recognized by the image recognition device and the heightwise position of the finger may be calculated based upon the defocus quantity. Furthermore, the heightwise position of the finger may be likewise detected via a contrast focus detection device that may be mounted in the digital camera instead of the phase focus detection device.

It may be ideal to configure the image-capturing device 18 with a camera having installed therein a TOF (time of flight) device instead of a phase focus detection device or a contrast focus detection device. A TOF camera emits infrared radiation from the camera body, receives infrared light that is reflected off a target object and then enters the TOF camera, and calculates the distance from the TOF camera to the target object based upon a phase change having occurred in the received light relative to the emitted light. Accordingly, by designating the fingertip of the user 12 as the measurement target object, emitting infrared light from the TOF camera toward the fingertip of the user 12 and receiving light reflected from the fingertip, the distance from the TOF camera to the fingertip of the user 12 can be determined. It is desirable that the image-capturing device 18 include an image-capturing lens constituted with a wide-angle lens so as to cover the entire midair image 30 and such an image-capturing lens may be a fisheye lens. In addition, the display device may include a plurality of image-capturing devices (e.g., two image-capturing devices) and the position of the fingertip of the user 12 may be detected based upon captured images provided from the plurality of image-capturing devices.

Figure 25:
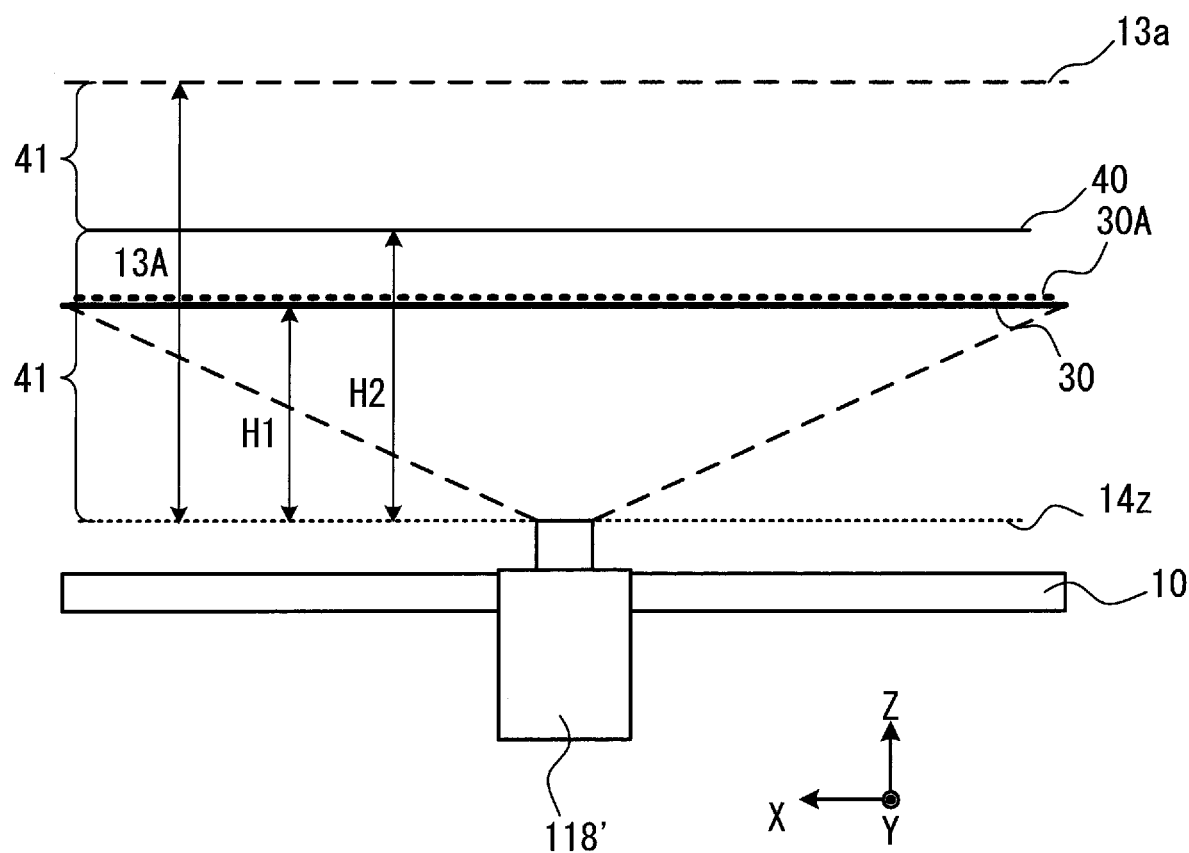
FIG. 25 A sectional view of the internal structure in the display device in variation 8 of the first embodiment FIG. 26 Illustrations of the structure of the display device in a second embodiment, in a sectional view of the display device in (a), in a sectional view of the display unit and the image forming optical system in (b) and in a block diagram showing the essential configuration of the display device in (c)

FIG. 25 presents an example of a display device 1 equipped with a TOF camera. FIG. 25 simply shows the internal structure of the display device 1 and does not provide an illustration of the display device body. As FIG. 25 shows, an installation space for a TOF camera 118' is formed at the surface of the body 10 and the TOF camera 118' is disposed in this installation space. The TOF camera 118' radiates infrared light onto the fingertip of the user 12 by scanning infrared light over a predetermined range and measures the distance from the TOF camera 118' to the fingertip of the user 12 based upon a change in the phase of the reflected light. Based upon the distance and the infrared emission direction, the position of the fingertip of the user 12 in the three-dimensional space relative to the TOF camera 118' can be determined. In other words, the specific position within the midair image plane corresponding to the fingertip position and the distance that sets the fingertip position apart from the surface of the display device 1 can be determined. Information similar to detection information indicating the fingertip position obtained in conjunction with a capacitive panel can thus be obtained based upon the range-finding results provided by the TOF camera 118'. It is to be noted that while an installation space for the TOF camera 118' is formed at the surface of the display device 1 and the TOF camera 118' is disposed in this space in the description provided above, the present variation is not limited to this example and it may be adopted in a configuration that includes a TOF camera 118' installed outside the display unit 11.

At the display device 1 in variation 8, too, a midair image 30 is formed at a position set apart by a distance H1 from an end portion 14z of the stage 14 located toward the − side along the Z direction in the display device 1, and the detection reference 40 is set at a position set apart by a distance H2 (H1<H2) from the end portion 14z of the stage 14 located toward the − side along the Z direction, as illustrated in FIG. 25. The TOF camera 118' assumes a detection range 13A set further upward relative to the stage 14 (toward the Y direction + side) for detection of the position of the fingertip of the user 12 along the Z direction. In FIG. 25, the limit to the range over which images can be captured is indicated by a dotted line 13a toward the + side along the Z direction relative to the TOF camera 118' and the detection range 13A is defined as the space between detection limit 13a and the end portion 14z of the stage 14. In variation 8, too, the midair image 30 and the detection reference 40 are set inside the detection range 13A, as in the first embodiment and variations 1 through 7 described earlier. It is to be noted that while the detection reference 40 in FIG. 25 is set further toward the + side along the Z direction relative to the midair image 30, it may instead be set further toward the − side along the Z direction relative to the midair image 30 or in alignment with the position of the midair image 30, as long as it is set within the detection range 13A. In addition, a range other than the zone set as the detection reference 40 within the detection range 13A is referred to as a detection reference outside range 41 in the description of variation 9. It is to be noted that instead of setting the detection range 13A by defining the limit to the range over which an image can be captured with the TOF camera 118', the detection range 13A may be set as a range made up with part of the range over which an image can be captured by taking off part of the image-capturing enabled range (e.g., predetermined ranges at the left and the right ends in FIG. 25).

The display device 1 in variation 8 described above includes an image-capturing device 18 instead of a capacitive panel functioning as an operation detector 13. However, the display device 1 may include both an operation detector 13 and an image-capturing device 18. In such a case, the detection range 13A of the operation detector 13 shown in FIG. 3(c) may be divided into, for instance, two parts, i.e., a Z direction + side range and a Z direction − side range, so as to form a detection range on the Z direction − side (a detection range closer to the end portion 14z of the stage 14) and a detection range on the Z direction + side (a detection range further away from the end portion 14z of the stage 14). The Z direction − side detection range and the Z direction + side detection range may be respectively designated as the detection range for the capacitive panel and as the detection range for the image-capturing device 18. In this configuration, as the user 12 moves his finger from the + side along the Z direction in order to perform an operation at the display position, the image-capturing device 18 detects the first half of the movement of the finger and the capacitive panel detects the second half of the movement of the finger. Generally speaking, highly accurate detection is enabled via the capacitive panel over a range set in close proximity to the end portion 14z of the stage 14, whereas it may not always be possible to capture an image with the image-capturing device 18 over a range set in close proximity to the end portion 14z of the stage 14. For this reason, it is desirable to assign different detection ranges to the capacitive panel and the image-capturing device 18 as described above. It is to be noted that the detection range 13A does not need to be divided into two equal parts along the Z direction and instead, it may be divided into parts that are not equal. In addition, an operation detector 13 configured with another device, such as a proximity sensor, instead of the capacitive panel or the image-capturing device 18, may be used. This means that detection ranges formed by dividing the detection range 13A may be assigned to various operation detectors 13.

The velocity•acceleration detection unit 206 shown in FIG. 17 is also capable of calculating the velocity and the acceleration with which the finger moves based upon a captured image provided by the TOF camera 118' in FIG. 25. Accordingly, in correspondence to each of the upper and lower detection ranges formed by dividing the detection range 13A, the finger movement velocity or the finger movement acceleration may be calculated so as to enable the reach position predicting unit 207 to predict the reach position of the finger.

In addition, instead of the image-forming optical system 9, having been explained in reference to the first embodiment and variations 1 through 8 thereof, an image-forming optical system 9 configured with a half mirror and a retro-reflective member may be used. A retro-reflective member may be constituted with a reflecting member that includes, for instance, a plurality of three-dimensional prisms with a form of right angle triangular pyramid and reflects light having entered therein back along the same optical path. In a structure that includes such a component, light having departed the display unit 11 is reflected at the half mirror (or transmitted through the half mirror), enters the retro-reflective member and is then reflected along the same optical path. The light reflected at the retro-reflective member forms an image as it advances through the same optical path. The light having departed the retro-reflective member re-enters the half mirror, is transmitted through the half mirror (or is reflected at the half mirror) and forms a midair image by forming an image at a position conjugate with the display unit 11.

It is to be noted that while the display device 1 in the first embodiment and its variations 1 through 8 described above includes at least the control unit 20, the display unit 11 and the operation detector 13, the present embodiment and variations may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described above may be added as needed in order to realize the various advantages described in reference to the first embodiment or any of variations 1 through 8. In addition, the control device described above may be built into any of various types of electronic devices adopting the first embodiment and the variations thereof.

Furthermore, the present embodiment and variations may be adopted in a detection device configured with the control unit 20 alone or a detection device configured with the control unit 20 and the operation detector 13. Moreover, the control unit 20 only needs to include at least the calibration unit 203 and the image generation unit 201. In order to enable such a detection device to achieve the various advantages described in reference to the first embodiment or variations 1 through 8, a structural element among the structural elements described earlier may be added into the detection device as deemed necessary.

Second Embodiment

In reference to drawings, a display device 1 in the second embodiment will be described. The second embodiment will be described in reference to an example in which the display device 1 in the embodiment is mounted in an operation panel. It is to be noted that the display device 1 in the embodiment does not need to be mounted in an operation panel and may be mounted in any type of electronic apparatus as has been explained in reference to the first embodiment and the variations thereof.

While the display device in the second embodiment displays an image equivalent to a shadow under a midair image of an icon, as does the display device 1 in the first embodiment, it adopts a configuration different from that of the display device 1 in the first embodiment. Accordingly, the first embodiment may be achieved in conjunction with the display device 1 in the second embodiment instead of the display device 1 described in reference to the first embodiment. The following is a detailed explanation.

Figure 26:
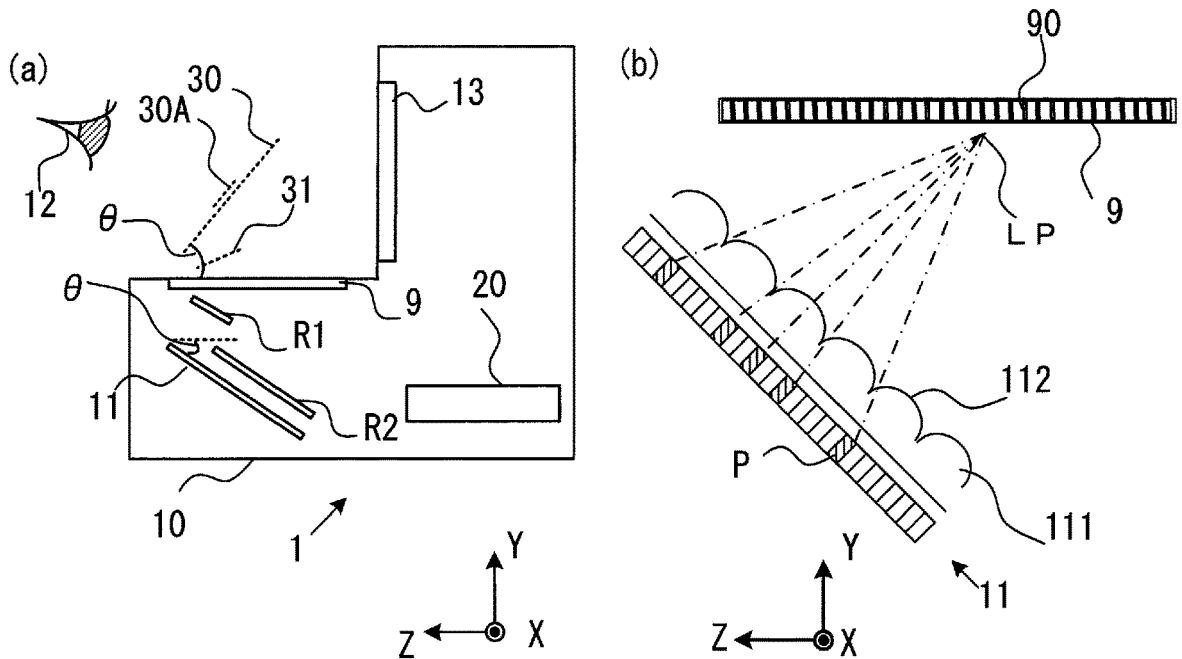
Figure 26:
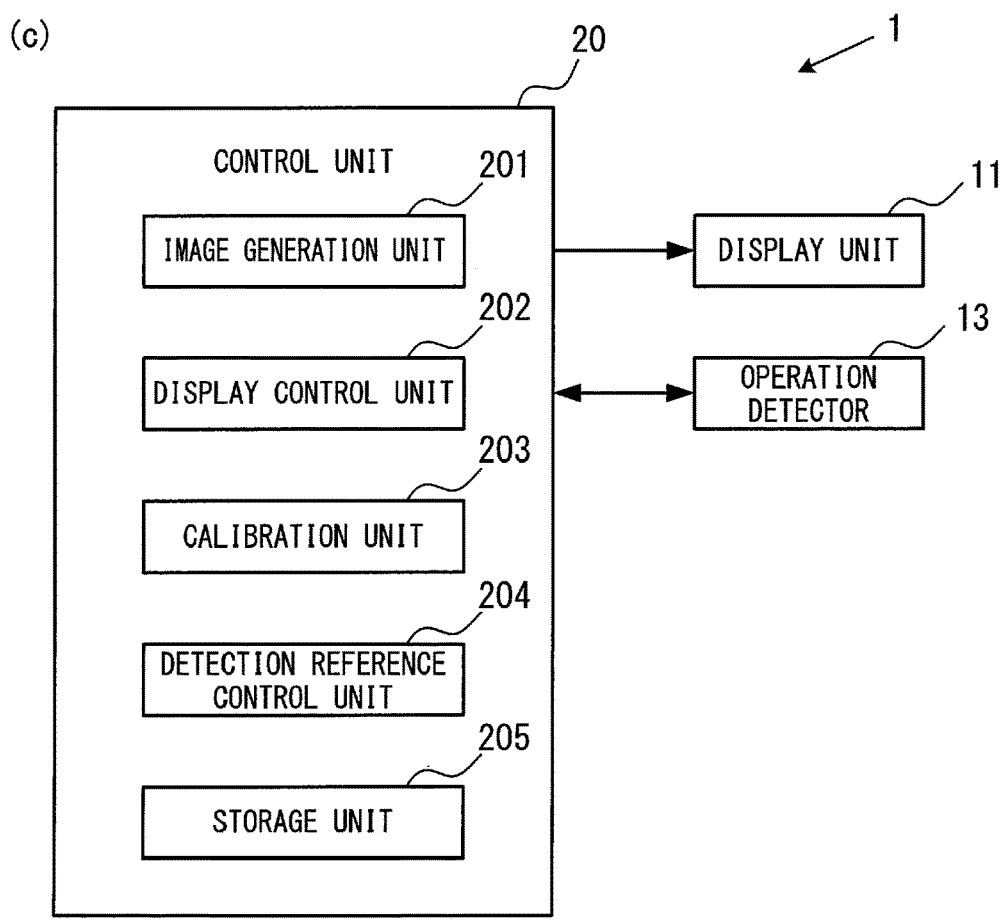

FIG. 26(*a*) is a schematic sectional view, taken over the YZ plane, of the display device 1 in the second embodiment. The display device 1 includes an image-forming optical system 9, a display unit 11, an operation detector 13 and a control unit 20, disposed inside a body 10 thereof. The display device 1 in the second embodiment may adopt the technology taught in International Publication No. 2011/158911. Namely, the display unit 11 may adopt a structure that enables light field display of a three-dimensional stereoscopic image and a midair image 30 may be formed at various positions along the Z direction by bringing up on display an image for two-dimensional display at the display unit 11.

FIG. 26(*b*) schematically illustrates the display unit 11 and the image-forming optical system 9 in the display device 1 in the second embodiment in a sectional view taken over the YZ plane. A microlens array 112 constituted with a plurality of microlenses 111 disposed in a two-dimensional pattern is disposed at the display surface of the display unit 11, as shown in the figure. The microlenses 111 are each disposed in correspondence to a plurality of display pixels P at the display unit 11. The display unit 11 and the microlens array 112 are disposed so as to form a predetermined tilt $-\theta$ relative to the ZX plane. It is to be noted that while a single microlens 111 is disposed in correspondence to 5×5 display pixels P in the example presented in FIG. 26(*b*) in order to simplify the illustration, each microlens 111 is actually disposed in correspondence to a greater number of display pixels P. The microlens array 112 is disposed at a position set apart from the display surface of the display unit 11 by a distance matching the focal length f of the microlenses 111 toward the Z direction + side. Each microlens 111 projects light traveling from display pixels P onto a specific image plane located along the Y direction based upon the image on display. It is to be noted that lenticular lenses may be used in place of the microlenses 111.

The image-forming optical system 9 is disposed above the microlens array 112 (toward the Y direction + side), at a position set apart from the microlens array 112 over a predetermined distance so as to range parallel to the ZX plane. The image-forming optical system 9 adopts a structure similar to that illustrated in FIG. 1(*c*) in reference to which the first embodiment has been explained. A plurality of mirror elements 90 disposed within the image-forming optical system 9 each reflect light emitted from display pixels P and form a real image forming an angle θ relative to the ZX plane through convergence (see FIG. 26(*b*)). The magnification factor of this real image is 100%, i.e., its size matches that of the display pixels P. In other words, light emitted from the display unit 11 is reflected at the plurality of mirror elements 90 so as to form an image at a midair image forming position above the stage 14.

In order for the various light points LP that compose a midair image 30 to be formed in space, the light forming a given light point LP is emitted from some of the display pixels P, each covered by one of a plurality of different microlenses 111 at the display unit 11. It is to be noted that the light point LP, which is an image displayed in midair via the display unit 11 and the microlenses 111, is a midair image. In the example presented in FIG. 26(b), light emitted from the shaded display pixels P is projected via the corresponding microlenses 111 to form the light point LP. In this situation, the display pixels P corresponding to the plurality of different microlenses 111 are assigned in a number matching the number of display pixels P covered by a single microlens 111 (5×5 in the example presented in FIG. 26(b)). Based upon the pattern in which these display pixels P are assigned, the position of a light point LP formed in midair relative to a direction running perpendicular to the display surface of the display unit 11 can be adjusted. The midair image 30 is composed of an image formed along the Y direction via the image-forming optical system 9 with light points LP thus formed. The position of the midair image 30 along the Z direction can be thus adjusted by altering the image displayed by the display unit 11.

FIG. 26(c) is a block diagram showing the essential configuration of the display device 1 in the second embodiment. FIG. 26(c) shows the control unit 20, and the display unit 11 and the operation detector 13 that are controlled by the control unit 20. The control unit 20 may include structural elements similar to the image generation unit 201, the display control unit 202, the calibration unit 203, the detection reference control unit 204 and the storage unit 205 in the first embodiment shown in FIG. 2. In addition, the display device 1 in the second embodiment may detect the reach position or the specified position and control the display mode for an auxiliary image 31 by adopting any of the various methods explained in reference to the first embodiment and the variations thereof.

In the second embodiment, the image generation unit 201 generates auxiliary image data used to display an auxiliary image 31, constituting a second portion different from an icon 30A constituting a first portion, which includes a first range 311 and a second range 312, and the display control unit 202 displays the auxiliary image data via the display unit 11. As a result, the auxiliary image 31, i.e., an image to be used as the base for a second display, is brought up on display at the display unit 11, and the auxiliary image 31 is displayed over a region R1 shown in FIG. 26(a) by the display unit 11 as a fourth display. The fourth display provided in the region R1 is displayed via the image-forming optical system 9, in midair as the auxiliary image 31 constituting the second display. It is to be noted that the image generation unit 201 may generate auxiliary image data by controlling the gravitational center position of the luminance distribution or the average value for the luminance distribution so as to match that of the first range 311 (see FIG. 10, FIG. 11, FIG. 13 and FIG. 15) adopting any of the various modes listed in variation 1 of the first embodiment.

It is desirable that the first range 311, which is equivalent to a shadow of an icon 30A constituting a first display, be brought up on display under the icon 30A (toward the Y direction − side). Accordingly, the display control unit 202 executes control to display the auxiliary image data with the display pixels P at the display unit 11 so as to form light points with the auxiliary image data in the region R1 via the image-forming optical system 9 in FIG. 26. Namely, the display control unit 202 allocates the auxiliary image data to the display pixels P so that the region R1 is formed near an area under (toward the Y direction − side) of the image-forming optical system 9. The light forming an image in the region R1 is displayed via the image-forming optical system 9, as the auxiliary image 31 at a position near an area above (toward the Y direction + side) of the image-forming optical system 9, i.e., at a position between the display unit 11 and the icon 30A.

The display control unit 202 executes control so as to bring up display image data used to display the icon 30A, i.e., a first image constituting a base for the icon 30A, via display pixels P. It is desirable that the icon 30A be displayed further upward (toward the Y direction + side) relative to the auxiliary image 31. Accordingly, the display control unit 202 allocates the display image data to the display pixels P so that the display image data form light points in an area further downward (toward the Y direction − side) relative to the region R1, i.e., in a region R2 closer to the image-forming optical system 9.

However, if the display pixels P at which the auxiliary image data are to be displayed are the same as the display pixels P designated for display of the display image data, the auxiliary image data and the display image data cannot be displayed at the same time. Accordingly, when the icon 30A and the auxiliary image 31 are displayed via the display unit 11, the display control unit 202 switches between the display of the auxiliary image data via the display pixels P and the display of the display image data via the display pixels P on a predetermined cycle. As a result, the user 12 is able to view the icon 30A and the auxiliary image 31 located under the icon 30A as midair images.

Calibration processing will be executed as has been explained in reference to the first embodiment and the variations thereof so as to adjust the position of the first range 311 based upon the distance between the reach position or the specified position and the detection reference 40. During this process, the image generation unit 201 generates auxiliary image data by controlling the gravitational center position of the luminance distribution or the average value for the luminance distribution in the same way as that described in reference to the first embodiment and the variations thereof and the display control unit 202 executes control so as to display the auxiliary image data at the display pixels P. Namely, the display control unit 202 displays the auxiliary image data at the display pixels P in step S9 in the flowchart presented in FIG. 7 or in step S28 and step S32 in the flowchart presented in FIG. 9.

It is to be noted that the display device 1 in the second embodiment does not need to execute calibration processing. Namely, the display device 1 in the second embodiment may be a device used simply to display a given image as a midair image 30 and an auxiliary image 31 that includes a first range 311 equivalent to a shadow thereof, instead of a device engaged in a specific operation in response to an operation performed by the user 12.

In addition, while an image equivalent to a shadow image is displayed as the auxiliary image 31 in the example explained above, the first range 311 may instead be a bright image such as an image of an illuminating light source as in the example presented in FIG. 16 in relation to variation 1 of the first embodiment.

Furthermore, an image of a stage, a table, a desk or the like used to indicate the position of the midair image 30, upon which an object is placed, may be displayed as the auxiliary image 31, as has been explained in reference to the first embodiment. Moreover, a stereoscopic auxiliary image 31 may be displayed by the display device 1. Namely, an image of a stage, a table, a desk or the like upon which an object is placed, may be displayed as a stereoscopic auxiliary image 31. In addition, an image of a rod appearing to support the midair image 30 may be displayed as a stereoscopic auxiliary image 31. In such a case, the auxiliary image 31 may be displayed so as to appear as if the midair image 30 is supported by the rod in the auxiliary image 31 by displaying it so that the front end of the rod appears to be connected to the midair image 30. It is to be noted that as has been explained in reference to the first embodiment and as will be explained in reference to variation 2 of the third embodiment, it is desirable to display an auxiliary image 31 deeply related to the midair image 30.

The display device 1 in the second embodiment does not need to include an image-forming optical system 9. Namely, a midair image 30 may be brought up on display by forming an image via the microlens array 112 with light having departed the display unit 11. In such a case, a light transmitting plate through which light can be transmitted may be disposed at a position at which the image-forming optical system 9 is disposed in the sectional view in FIG. 26(a). The display device 1 displays the auxiliary image 31 as a midair image in the vicinity of the light transmitting plate, and light used to display the icon 30A passes through the light transmitting plate and is displayed in midair above the auxiliary image 31 (toward the Y direction + side). As a result, the auxiliary image 31 is displayed near the surface of the body 10 of the display device 1, i.e., a physical object, and the user 12 is thus able to perceive the position of the midair image 30 in reference to the body 10 via the auxiliary image 31.

In the second embodiment, auxiliary image data are displayed by the display unit 11 and the image-forming optical system 9 displays the auxiliary image data as an auxiliary image 31. Thus, the user 12 is able to perceive the position of the icon 30A in relation to the auxiliary image 31 displayed as a midair image and perform an operation at the detection reference 40.

In addition, the auxiliary image 31 is displayed via the image-forming optical system 9 at a position different from that of the midair image 30. As a result, the user 12 is able to perceive the position of the icon 30A based upon its relative positional relationship with the auxiliary image 31.

The display unit 11 in the second embodiment alternately displays the display image data for the midair image 30 and the auxiliary image data. This means that both the midair image 30 and the auxiliary image 31 can be brought up on display by a single display unit 11.

Furthermore, the display device 1 can be provided as a compact unit.

Moreover, the image-forming optical system 9 in the second embodiment displays the midair image 30 at a position set apart from the display unit 11 by a greater distance in comparison to the auxiliary image 31. Thus, the user 12 is able to perceive the position of the icon 30A in the midair image 30 in reference to the auxiliary image 31 displayed at a position below the midair image 30.

In addition, since the midair image 30 is displayed via the image-forming optical system 9 at a position set apart from the display unit 11 by a greater distance compared to the auxiliary image 31, light, having departed the display unit 11, is not allowed to directly enter the eyes of the user 12 readily, and thus, the midair image 30 can be viewed with better ease. When the light from the display unit 11 enters the eyes of the user 12, the eyes of the user 12 will focus on the display unit 11, which may result in the midair image 30 losing the appearance of "floating". Such a problem can be resolved by adopting the structure described above.

It is to be noted that the present embodiment is not limited to the example in which the display control unit 202 switches between the display of the auxiliary image data via the display pixels P and the display of the display image data via the display pixels P on a predetermined cycle as described above. The display control unit 202 may instead simultaneously provide a display of the auxiliary image data via display pixels P and a display of the display image data via display pixels P. More specifically, the display control unit 202 may display the auxiliary image data and the display image data simultaneously, as long as the auxiliary image data and the display image data are displayed via different display pixels P.

If a display pixel P via which auxiliary image data are to be displayed and a display pixel P via which display image data are to be displayed are the same display pixel P (hereafter will be referred to as a same display pixel P), the display control unit 202 uses a given same pixel P to display either auxiliary image data or display image data. In order to support such control, the plurality of display pixels P disposed at the display unit 11 are grouped into display pixels P1 (hereafter will be referred to as first display pixels) at which priority is given to auxiliary image data display and display pixels P2 (hereafter will be referred to as second display pixels) at which priority is given to display image data display. The first display pixels P1 and the second display pixels P2 may be disposed so as to form, for instance, a zigzag pattern at the surface of the display unit 11.

The display control unit 202 uses a given same display pixel P designated as a first display pixel P1 to display auxiliary image data. The display control unit 202 uses a given same display pixel P designated as a second display pixel P2 to bring up the display image data. Through these measures, it becomes possible to display both the icon 30A and the auxiliary image 31 without having to switch between the display of the auxiliary image data and the display of the display image data via the display pixels P on a predetermined cycle.

The display unit 11 displays the display image data and the auxiliary image data at the same time. This means that the control processing load for displaying the display image data and the auxiliary image data can be reduced.

While the display device 1 in the example described above displays the midair image 30 and the auxiliary image 31 via a single set of display unit 11 and image-forming optical system 9, the present embodiment is not limited to this example. For instance, the display device 1 may include a display unit and an image forming optical system used for display of the midair image 30 and another set including a display unit and an image forming optical system used for display of the auxiliary image 31. Namely, the display unit and the image-forming optical system via which the display image data are to be displayed may be disposed by adopting any of the structures described in reference to the first embodiment and the variations thereof.

(Variation 1 of the Second Embodiment)

The display device 1 in variation 1 of the second embodiment adopts a configuration different from that of the display device 1 in the second embodiment and displays an auxiliary image 31 through a method different from the method through which a midair image is displayed. The display device 1 in variation 1 displays an auxiliary image 31 via a liquid crystal display unit. The following is a detailed explanation.

Figure 27:
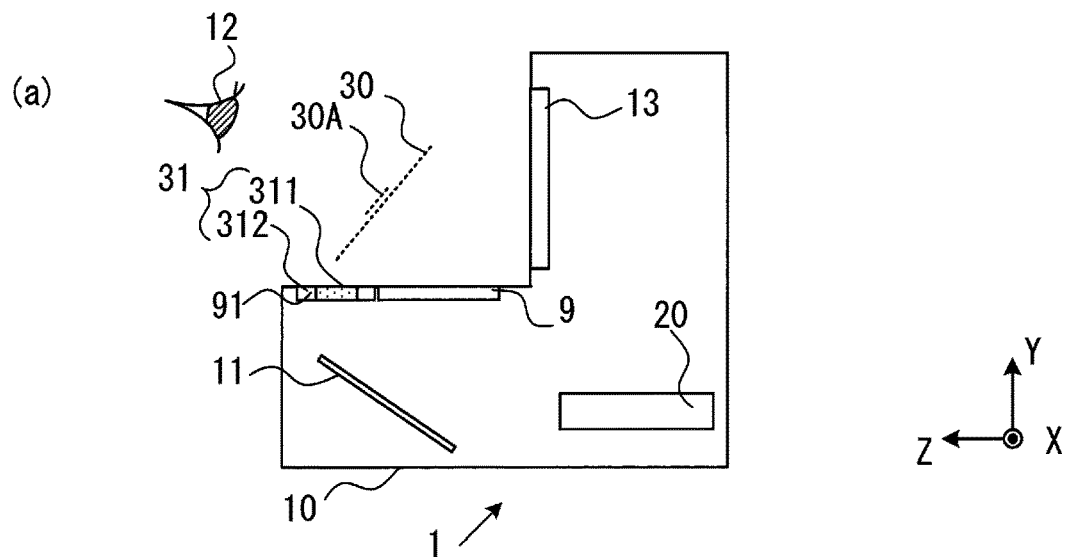
FIG. 27 Illustrations of the structure of the display device in variation 1 of the second embodiment, in a sectional view in (a), in a block diagram showing the essential configuration of the display device in (b) and in a sectional view of a display device in another example of variation 1 of a third embodiment shown in (c)
Figure 27:
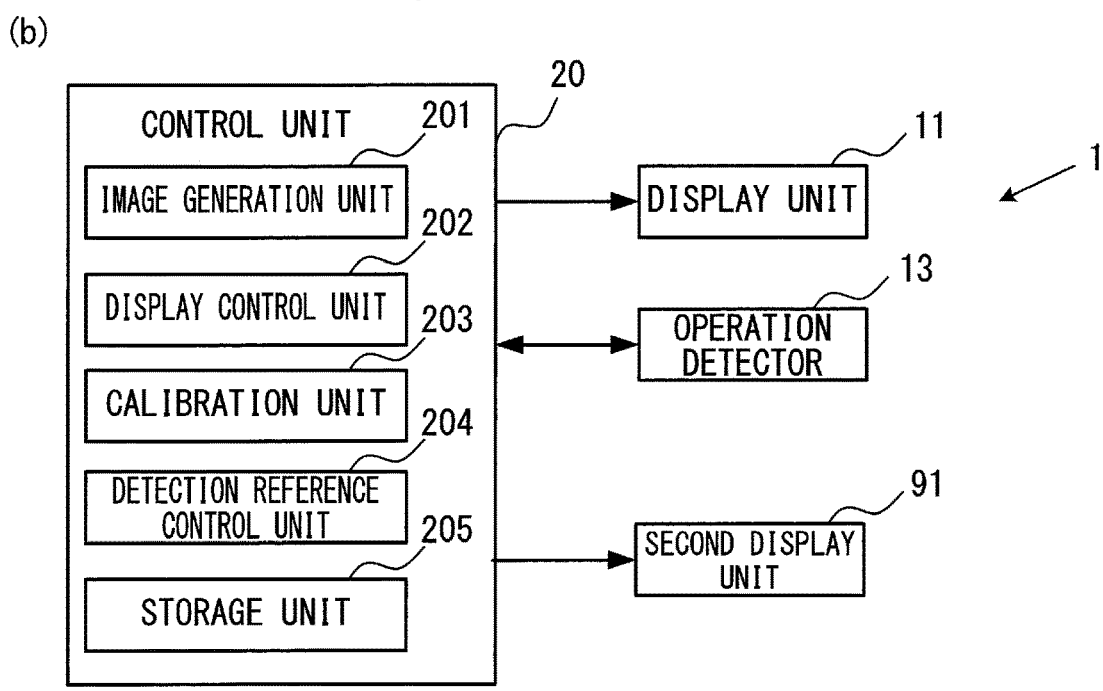
Figure 27:
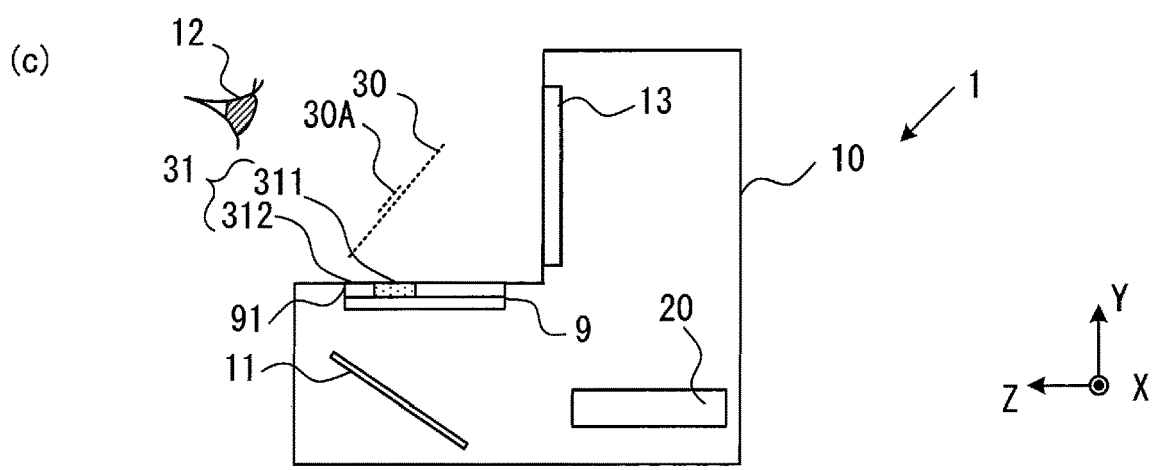

FIG. 27(*a*) schematically illustrates the display device 1 in variation 1 in a sectional view taken over the YZ plane. The display device 1 includes an image-forming optical system 9, a display unit 11, an operation detector 13, a control unit 20 and a second display unit 91, disposed inside a body 10. The display unit 11, the image-forming optical system 9 and the operation detector 13 adopt structures similar to those in the first embodiment and are disposed within the body 10 in the same way as that illustrated in FIG. 26(*a*). The second display unit 91, which is a liquid crystal monitor, is disposed so as to range parallel to the ZX plane. In the example presented in FIG. 27(*a*), the second display unit 91 is disposed beside the image-forming optical system 9 at a position further toward the + side along the Z direction relative to the image-forming optical system 9. It is to be noted that the second display unit 91 may instead be disposed at a position further toward the − side along the Z direction relative to the image-forming optical system 9. In addition, the second display unit 91 does not need to be disposed beside the image-forming optical system 9. For instance, a notched area may be formed over part of the image-forming optical system 9 and the second display unit 91 may be disposed in the notched area.

Furthermore, the second display unit 91 may be an organic EL display unit instead of a liquid crystal monitor.

FIG. 27(*b*) is a block diagram illustrating the essential configuration of the display device 1 in variation 1. FIG. 27(*b*) shows the control unit 20, and the display unit 11, the operation detector 13 and the second display unit 91, which are controlled by the control unit 20. The control unit 20 includes structural elements such as an image generation unit 201, a display control unit 202, a calibration unit 203, a detection reference control unit 204 and a storage unit 205 structured as shown in FIG. 27(*c*). However, the display control unit 202 controls display at the second display unit 91 as well as display at the display unit 11. It is to be noted that the second display unit 91 may include a control unit and in such a case, the control unit in the second display unit 91 may control display at the second display unit 91 based upon control signals provided from the display control unit 202.

The display control unit 202 executes control so as to bring up display image data and auxiliary image data generated by the image generation unit 201 at the display unit 11 and at the second display unit 91 respectively. Namely, the second display unit 91 is a dedicated display unit used exclusively to display an auxiliary image 31 composed of a first range 311 equivalent to a shadow and a second range 312. It is to be noted that the image generation unit 201 may generate auxiliary image data corresponding to the first range 311 adopting any of the various modes (see FIG. 10, FIG. 11, FIG. 13 and FIG. 15) explained in reference to variation 1 of the first embodiment. The auxiliary image 31 that includes a first range 311 equivalent to a shadow is displayed via the second display unit 91 at a position further downward (toward the Y direction − side) relative to an icon 30A displayed in midair. It is to be noted that the second display unit 91 may include a generation unit capable of image generation, and in such a case, the generation unit in the second display unit 91 may generate auxiliary image data in the same way as does the image generation unit 201 explained earlier and an auxiliary image 31 may be displayed at the second display unit 91.

It is to be noted that the positional relationship between the position at which the image-forming optical system 9 is disposed and the position at which the second display unit 91 is disposed is not limited to the example presented in FIG. 27(*a*).

FIG. 27(*c*) schematically illustrates a display device 1 in another example in a sectional view taken over a plane parallel to the ZX plane. The second display unit 91 is disposed above the image-forming optical system 9 (toward the Y direction + side). The second display unit 91 and the image-forming optical system 9 may be disposed so that the lower surface of the second display unit 91 and the upper surface of the image-forming optical system 9 are in contact with each other or they may be disposed with a gap separating them. The second display unit 91 is a liquid crystal monitor manufactured by using a light transmitting material through which light is transmitted.

When the auxiliary image 31 is on display at the second display unit 91 in a configuration having the image-forming optical system 9 and the second display unit 91 disposed as shown in FIG. 27(*c*), the region where the first range 311 and the second range 312 are on display obstructs passage of light from the display unit 11, which is bound to result in lowered visibility of the midair image 30. Such an undesirable condition is prevented by the display control unit 202 by switching between a display (a third display) brought up to allow the light from the display unit 11 to pass through and a display of the auxiliary image 31 via the second display unit 91 on a predetermined cycle so as to display the display image via the display unit 11, i.e., so as to bring up the midair image 30 on display in space. This means that while the display image is on display at the display unit 11, the auxiliary image is not displayed at the second display unit 91 and in this state, the light, having departed the display unit 11, is allowed to pass through the second display unit 91 to form a midair image 30. In other words, while the display image is on display at the display unit 11, light from the display unit 11 passes through the second display unit 91 in a greater amount compared to the amount of light passing through the second display unit 91 when the auxiliary image is displayed thereat.

It is to be noted that the display control unit 202 may execute control other than the control under which the display at the display unit 11 and the display at the second display unit 91 are switched on the predetermined cycle. For instance, the plurality of pixels at the second display unit 91 may be grouped into pixels used to display the auxiliary image 31 (hereafter will be referred to as first pixels) and pixels (hereafter will be referred to as second pixels) through which light from the display unit 11 passes, i.e., pixels that do not display the auxiliary image 31. The first pixels and the second pixels may be disposed at the surface of the display unit 11 in, for instance, a staggered pattern. As an alternative, a pixel row in which first pixels are disposed and a pixel row in which second pixels are disposed may be set in and alternating pattern or a predetermined plurality of pixel rows in which first pixels are disposed and a predetermined plurality of pixel rows in which second pixels are disposed may be set in an interlaced pattern.

Calibration processing will be executed as has been explained in reference to the first embodiment and the variations thereof so that the position of the first range 311 is adjusted based upon the distance between the reach position or the specified position and the detection reference 40. In this situation, the image generation unit 201 will generate display image data and auxiliary image data in the same way as any of those described in reference to the first embodiment and the variations thereof, and the display control unit 202 will engage the display unit 11 to display a display image expressed with the display image data and will engage the second display unit 91 to display the auxiliary image data. Namely, in step S9 in the flowchart presented in FIG. 7 and in steps S28 and S32 in the flowchart presented in FIG. 9, in reference to which the first embodiment has been described, the display control unit 202 displays the display image at the display unit 11 and displays the auxiliary image 31 at the second display unit.

In variation 1 of the second embodiment, the second display unit 91 that displays the auxiliary image 31 is disposed further downward relative to the display of the midair image 30. As a result, the auxiliary image 31 is displayed at a point further downward relative to the midair image 30, which makes it possible for the user 12 to perceive the position of the midair image 30 based upon the display of the auxiliary image 31.

In addition, the second display unit 91 in variation 1 of the second embodiment is disposed at a position different from the position taken by the image-forming optical system 9 via which the midair image 30 is displayed. Thus, the auxiliary image 31 can be displayed at an optimal position relative to the midair image 30.

The display unit 11 in variation 1 of the second embodiment alternately displays the display image data for the midair image 30 and the auxiliary image data. This means that both the midair image 30 and the auxiliary image 31 can be brought up on display by a single display unit 11.

Furthermore, the display device 1 can be provided as a compact unit.

(Variation 2 of the Second Embodiment)

The display device 1 in variation 2 of the second embodiment adopts a configuration different from that of the display device 1 in the second embodiment or variation 1 of the second embodiment and displays an auxiliary image 31 through a method different from the method through which a midair image is displayed. The display device 1 in variation 2 projects an auxiliary image 31 onto a diffuser plate or the like via a projector. The following is a detailed explanation.

Figure 28:
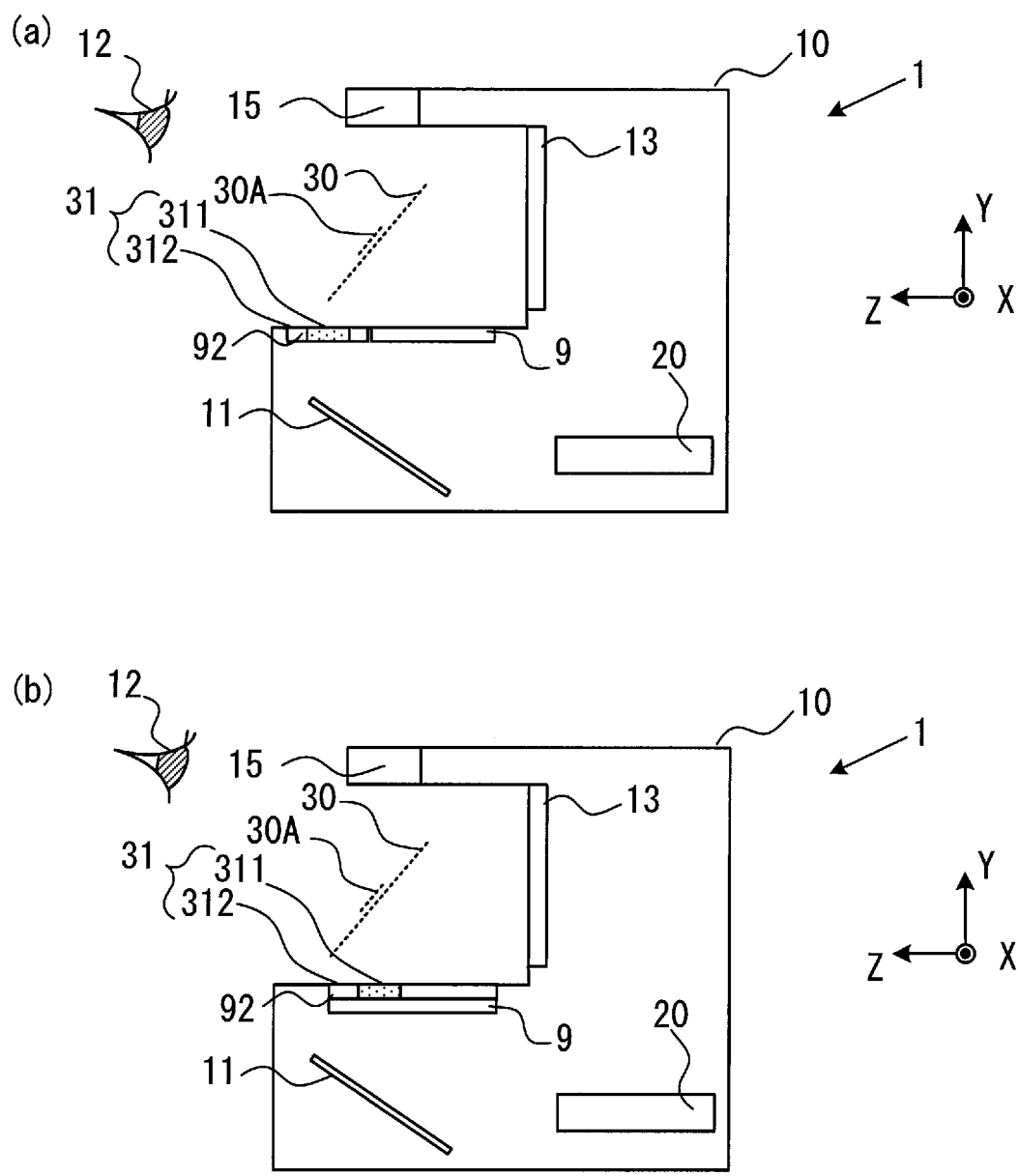
FIG. 28 Sectional views each illustrating the structure of a display device in variation 2 of the second embodiment FIG. 29 Illustrations of the structure of the display device in a third embodiment, in a perspective in (a) and in a block diagram showing the essential configuration of the display device in (b)

FIG. 28(a) schematically illustrates the display device 1 in variation 2 in a sectional view taken over the YZ plane. The display device 1 includes an image-forming optical system 9, a display unit 11, an operation detector 13, a projector 15, a control unit 20 and a diffuser plate 92, disposed inside a body 10. The display unit 11, the image-forming optical system 9, the operation detector 13 and the projector 15 adopt structures similar to those in the first embodiment. The display unit 11, the image-forming optical system 9 and the operation detector 13 are disposed inside the body 10 in the same way as shown in FIG. 26(a). The projector 15 is disposed above the body 10, as in the first embodiment shown in FIG. 1(b), and projects projection light onto the diffuser plate 92 from a point located toward the Y direction + side. In addition, the display device 1 in variation 2 of the second embodiment may adopt an essential configuration similar to that of the display device 1 in the first embodiment shown in FIG. 2.

The diffuser plate 92, which may be constituted of, for instance, frosted glass, is disposed near the image-forming optical system 9 at a position further toward the + side along the Z direction relative to the image-forming optical system 9 in the example presented in FIG. 28(a). It is to be noted that the diffuser plate 92 may instead be disposed further toward the – side along the Z direction relative to the image-forming optical system 9. The projector 15 projects an auxiliary image 31 based upon auxiliary image data generated by the image generation unit 201, as does the projector in the first embodiment. The projector 15 in variation 2 is disposed with its projection direction set so that it projects the auxiliary image 31 toward the diffuser plate 92 from a position above (from a point located on the Y direction + side). The auxiliary image 31 projected by the projector 15 is rendered visible to the user 12 as it is diffused at the diffuser plate 92. An auxiliary image 31, composed of a first range 311 equivalent to a shadow and a second range 312, is thus projected at a position further downward (toward the Y direction – side) relative to an icon 30A in a midair image 30. It is to be noted that the image generation unit 201 may generate auxiliary image data corresponding to the first range 311 adopting any of the various modes (see FIG. 10, FIG. 11, FIG. 13 and FIG. 15) explained in reference to variation 1 of the first embodiment.

As an alternative, the diffuser plate 92 may be disposed above (toward the Y direction + side) the image-forming optical system 9, as illustrated in FIG. 28(b). Such a diffuser plate 92 will include first regions where projection light from the projector 15 is diffused and second regions through which light from the display unit 11 passes, set in, for instance, a zigzag pattern. The light, having departed the display unit 11, passes through the second regions and is used to display a midair image 30, whereas the projection light from the projector 15 is diffused in the first regions and is viewed by the user 12 as an auxiliary image 31. It is to be noted that the image-forming optical system 9 may be disposed above (toward the Y direction + side) the diffuser plate 92. In such a case, the projector 15 will be disposed near the display unit 11 with its projection direction set so as to project the projection light toward the diffuser plate 92 from a point further downward relative to the diffuser plate 92. Namely, the projector 15 will be installed between the diffuser plate 92 and the display unit 11 so as to project projection light toward the diffuser plate 92 located toward the Y direction + side. Such a projector 15 may be constituted with, for instance, an ultra-short focus projector that projects an image over a short range.

The structure described above makes it possible for the user 12 to see the first range 311 equivalent to a shadow at a position further downward (toward the Y direction – side) relative to the icon 30A in the midair image 30.

Calibration processing will be executed as has been explained in reference to the first embodiment and the variations thereof so that the position at which the first range 311 is displayed is adjusted based upon the distance between the reach position or the specified position and the detection reference 40. The image generation unit 201 generates display image data and auxiliary image data as has been explained in reference to the first embodiment and the variations thereof. The display control unit 202 displays a display image expressed with the display image data at the display unit 11, whereas the projector control unit 200 engages the projector 15 to project projection light corresponding to the auxiliary image data onto the diffuser plate 92 so as to project an auxiliary image 31. In other words, processing similar to the processing in the flowchart presented in FIG. 7 and the processing in the flowchart presented in FIG. 9, in reference to which the first embodiment has been explained, is executed.

The projector 15 in variation 2 of the second embodiment projects the auxiliary image 31. As a result, the user 12 is able to perceive the position of the midair image 30 based upon the display of the projected auxiliary image 31.

In addition, in variation 2 of the second embodiment, the light emitted from the projector 15 is diffused at the diffuser plate 92, disposed at a position different from the position taken by the image-forming optical system 9. Thus, the user 12, looking at the auxiliary image 31 displayed at a position further downward relative to the midair image 30, is able to perceive the position of the midair image 30.

It is to be noted that the display device 1 may project a hologram above the display unit 11 as an alternative to the diffuser plate 92 described above. An image of a diffuser plate 92 is stored in advance in the hologram. The projector 15 projects light, identical to the reference light used to store the image, toward the hologram. Since the image of the diffuser plate 92 is stored in the hologram, the projection light from the projector 15, diffracted via the hologram, becomes diffused in a manner similar to the way light is diffused at the diffuser plate 92. As projection light corresponding to the auxiliary image data is projected by the projector 15 onto such a hologram, the auxiliary image 31 becomes visible to the user 12.

In this configuration, frequency bands of the various color components (the R component, the G component and the B component) in the projection light from the projector 15 will be set differently from the frequency bands of the color components (an R' component, a G' component and a B' component) in the light emitted from the display unit 11. Through these measures, it is ensured that the light departing the display unit 11 is not diffracted via the hologram and is instead transmitted through the hologram to form the midair image 30. As a result, the user 12 is able to view the auxiliary image 31 at a position further downward relative to the midair image 30.

It is to be noted that the present variation is not limited to the example in which the frequency bands of the color components (the R component, the G component and the B component) in the projection light from the projector 15 are set differently from the frequency bands of the color components (the R' component, the G' component and the B' component) in the light emitted from the display unit 11. As an alternative, the projector 15 and the display unit 11 may be disposed so that the angle of incidence with which the projection light from the projector 15 enters the hologram is different from the angle of incidence with which the light from the display unit 11 enters the hologram. In this case, the display unit 11 may be disposed so that the angle of incidence with which the light from the display unit 11 enters the hologram is different from the angle of incidence of the reference light used to store the image in the hologram. Through these measures, the efficiency with which the light from the display unit 11 is diffracted via the hologram is lowered and the light from the display unit 11 instead passes through the hologram so as to form the midair image 30. In other words, the projection light from the projector 15 alone is diffracted at the hologram and the light from the display unit 11, which is not diffracted at the hologram, can be used to display the midair image 30 in an optimal manner.

It is to be noted that while the display device 1 in the second embodiment and variations 1 and 2 thereof described above includes at least the control unit 20, the display unit 11 and the operation detector 13, the present embodiment may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described above may be added as needed in order to realize the various advantages described in reference to the second embodiment or either of variations 1 and 2 thereof. In addition, the control device described above may be built into any of various types of electronic devices adopting the second embodiment and the variations thereof.

Furthermore, the present embodiment may be adopted in a detection device configured with the control unit 20 alone or a detection device configured with the control unit 20 and the operation detector 13.

Third Embodiment

In reference to drawings, a display device 1 in the third embodiment will be described. The third embodiment will be described in reference to an example in which the display device 1 in the embodiment is mounted in an operation panel. It is to be noted that the display device 1 in the embodiment does not need to be mounted in an operation panel and may instead be mounted in any type of electronic apparatus as has been explained in reference to the first embodiment and the variations thereof.

The display device 1 allows the user 12 to perceive the display position of a midair image 30, provided as the first display, along the Z direction, by providing an auxiliary image 31 as a second display together with the midair image 30 in the first embodiment, the variations thereof and the second embodiment. In other words, the position of the auxiliary image 31 is used for reference indicating the display position of the midair image 30. The display device in the third embodiment is distinguishable in that it enables the user 12 to perceive the display position of a first portion of a midair image, which is the target of an operation performed by the user 12, by controlling the display mode for a second portion of the midair image that is different from the first portion of the midair image. The following is a detailed explanation.

FIG. 29(a) presents a schematic external view of the display device 1 in the third embodiment in a perspective, and FIG. 29(b) is a block diagram showing the essential configuration of the display device 1. The display device 1 in the third embodiment includes an image-forming optical system 9, a display unit 11, an operation detector 13 and a control unit 20 identical to those in the display device 1 in the first embodiment.

As shown in FIG. 29(b), the control unit 20 in the third embodiment adopts a structure that includes an image generation unit 201, a display control unit 202, a calibration unit 203, a detection reference control unit 204 and a storage unit 205 identical to those in the control unit 20 in the first embodiment shown in FIG. 2. The control unit 20 in the embodiment is able to ascertain a reach position or a specified position by adopting any of the methods explained in reference to the first embodiment and the variations thereof.

It is to be noted that the display device 1 in the third embodiment may further include the image-capturing device 18 (see FIGS. 24 and 25) in variation 8 of the first embodiment.

Figure 30:
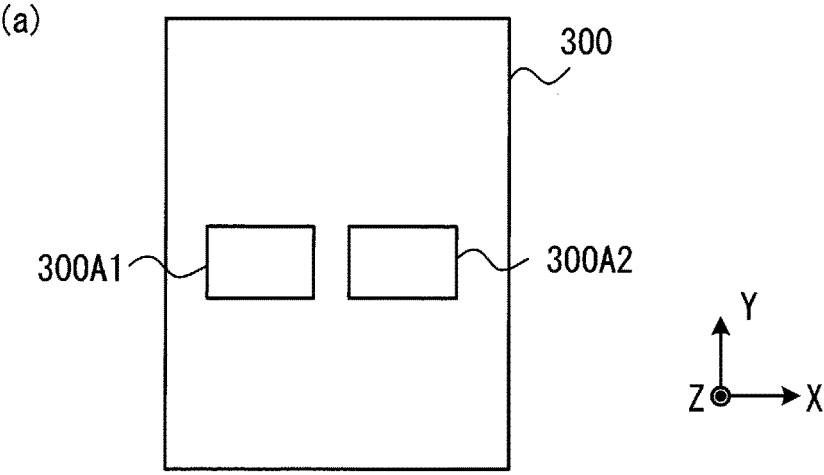
FIG. 30 A schematic presentation of a midair image brought up on display in the third embodiment FIG. 31 A schematic presentation of midair images that may be brought up on display in other examples of variation 1 of the third embodiment FIG. 32 A schematic presentation of a midair image that may be brought up on display in another example of variation 1 of the third embodiment FIG. 33 A schematic presentation of a midair image that may be brought up on display in another example of variation 1 of the third embodiment FIG. 34 Another example of a schematic presentation of a midair image that may be brought up on display in variation 2 of the third embodiment FIG. 35 Illustrations of the structure of the display device in variation 3 of the third embodiment, in a perspective in (a) and in a block diagram showing the essential configuration of the display device in (b)
Figure 30:
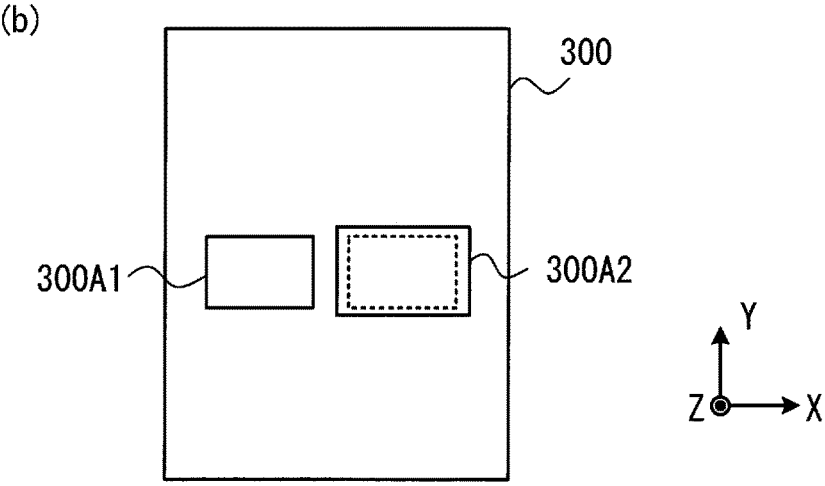
Figure 30:
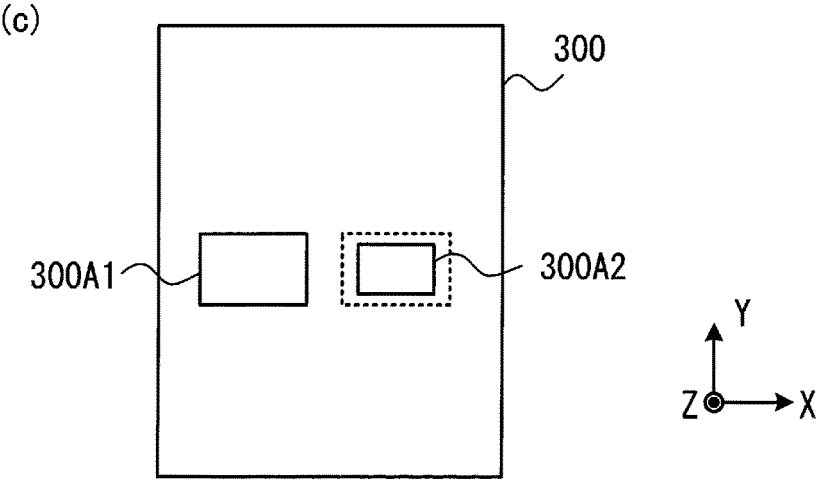

FIG. 30 schematically illustrates a midair image 300 brought up on display by the display device 1 in the third embodiment for calibration processing. The midair image 300 in FIG. 30 includes a first icon 300A1 constituting a first portion and a second icon 300A2 constituting as a second portion. The first icon 300A1 is an icon provided as a first display, which is operated by the user 12 during calibration processing. The second icon 300A2 is an icon provided as a second display in an area (second display area) around an area (first display area) where the first icon 300A1 is displayed, which is used to cause the user 12 to perceive the display position of the first icon 300A1 along the Z direction. Namely, the second icon 300A2 is a depth cue that allows the user 12 to perceive the depth of the icon 300A1 along the Z direction.

The following is an explanation of depth cues. An image projected onto the retina of, for instance, a human being, is a two-dimensional planar image. However, human beings and the like are capable of perceiving a three-dimensional world, since they are able to use various cues to perceive depth in real space. Depth perception cues can be classified into two primary categories; monocular depth cues and binocular depth cues. A monocular depth cue may be the size of another object different from a target object (target) the depthwise position of which must be ascertained, an overlap of different objects, or the like. Human beings and the like are able to perceive the depth of a target object by using such a cue. Binocular depth cues include binocular parallax. When a single target is viewed with both eyes, images of the target are projected with a slight offset onto the retinas of the left and right eyes. Binocular parallax is the term used to refer to this offset. Human beings and the like perceive the depthwise position of the target based upon the extent of the offset.

A human being or the like ascertains the depthwise position of a target by using depth cues, examples of which are listed above. In other words, as the target itself is altered or depth cues are altered, a human being or the like senses that the target is located at a depthwise position different from the actual position. A method through which a perception is created in the user 12 as if the depthwise position of a target (first icon 300A1) has changed by altering a monocular or binocular depth cue (e.g., the second icon 300A2) relative to the target (first icon 300A1) will be explained next.

It is to be noted that a method whereby a monocular depth cue is altered is explained in detail in reference to the third embodiment and the variation thereof. It is to be also noted that an auxiliary image of a shadow described in reference to the first embodiment and the second embodiment, too, may be considered a depth cue for the icon 300A provided as the first display.

FIG. 30(*a*) shows how the first icon 300A1 and the second icon 300A2 may be displayed in an initial display. The image generation unit 201 generates display image data so that the first icon 300A1 and the second icon 300A2 take matching sizes in the initial display.

The reach position 50 with respect to an operation performed by the user 12 for the midair image 300 in this initial display may not arrive at the first icon 300A1 (further on the Z direction + side), i.e., the reach position 50 may not be detected at the detection reference 40, as in the state shown in FIG. 5(*b*). Under such circumstances, the display control unit 202 creates a perception in the user 12 as if the first icon 300A1 is displayed further toward the − side along the Z direction relative to the state shown in FIG. 30(*a*). In variation 1, the image generation unit 201 adjusts the display mode for the second icon 300A2 based upon the distance between the reach position 50 and the detection reference 40 so as to create a perception in the user 12 as if the second icon 300A2 has moved along a direction running closer to the user 12 (toward the Z direction + side). In the example presented in FIG. 30(*b*), the image generation unit 201 adjusts the display mode by increasing the size of the second icon 300A2. In this situation, the image generation unit 201 generates display image data by increasing the size of the second icon 300A2 based upon the distance between the reach position 50 and the detection reference 40. In other words, the control unit 20 ascertains the positional relationship between the position at which the user operation is detected and the detection reference 40 and the area (second display area), where the second icon 300A2 provided as the second display is displayed, is controlled based upon the positional relationship thus ascertained. The control unit 20 controls the display mode for the second display area where the second icon 300A2 is displayed. It is to be noted that while the second icon 300A2 in the initial display is indicated with the dotted lines in FIG. 30(*b*), the initial display second icon is actually not brought up on display. The user 12, looking at this midair image 300, perceives the first icon 300A1 to take a position further toward the Z direction − side relative to the second icon 300A2.

The reach position 50 with respect to an operation performed by the user 12 for the midair image 300 in the initial display may be beyond the first icon 300A1 (further on the Z direction − side) i.e. the reach position 50 may not be detected at the detection reference 40, as in the state shown in FIG. 5(*d*). Under such circumstances, the display control unit 202 creates a perception in the user 12 as if the first icon 300A1 is displayed toward the + side along the Z direction relative to the state shown in FIG. 30(*a*). In variation 1, the image generation unit 201 adjusts the display mode for the second icon 300A2 based upon the distance between the reach position 50 and the detection reference 40 so as to create a perception in the user 12 as if the second icon 300A2 has moved along a direction running away from the user 12 (toward the Z direction − side). In other words, the control unit 20 ascertains the positional relationship between the position at which the user operation is detected and the detection reference 40, and the second icon 300A2 provided as the second display is controlled based upon the positional relationship thus ascertained. In the example presented in FIG. 30(*c*), the image generation unit 201 generates display image data by reducing the size of the second icon 300A2 based upon the distance between the reach position 50 and the detection reference 40. It is to be noted that while the second icon 300A2 in the initial display is indicated with the dotted lines in FIG. 30(*c*), the initial display second icon is actually not brought up on display. The user 12, looking at this midair image 300, perceives the first icon 300A1 to take a position further toward the Z direction + side relative to the second icon 300A2.

It is to be noted that the size of the second icon 300A2 is correlated in advance to the distance between the reach position or the specified position and the detection reference 40 based upon the results of testing or the like, and correlation data indicating the correlation are stored in advance in the storage unit 205. The image generation unit 201 adjusts the size of the second icon 300A2 by referencing the correlation data.

The calibration processing executed in the third embodiment in the display device 1 set in the first calibration processing mode will be explained. In this situation, in step S3 in the flowchart presented in FIG. 7, in reference to which the second embodiment has been described, the display control unit 202 displays the first icon 300A1 and the second icon 300. In step S6 in FIG. 7, the image generation unit 201 calculates a change quantity representing an extent to which the size of the second icon 300A2 is to change. In step S9 in FIG. 7, the display control unit 202 displays the second icon 300A2 with its size adjusted based upon the change quantity having been calculated.

It is to be noted that the calibration processing may be executed in the second calibration processing mode as shown in the flowchart presented in FIG. 9, in reference to which the first embodiment has been described. However, instead of executing the processing in step S28 and step S32 in FIG. 9, the image generation unit 201 calculates a change quantity with respect to the size of the second icon and displays the second icon by adjusting its size based upon the change quantity having been calculated.

In the third embodiment, the image generation unit 201 controls the second icon 300A2, which is an icon different from the first icon 300A1 operated by the user 12, based upon the positional relationship between the position at which the user operation is detected and the detection reference 40. As a result, the user 12 is able to perform an operation at the detection reference 40 based upon the second icon 300A2.

In addition, the image generation unit 201 in the third embodiment controls the display mode for the second display area, i.e., the second icon 300A2. Thus, the user 12 visually recognizing the display mode for the second icon 300A2 is able to perceive the display position of the midair image with better ease.

Furthermore, the image generation unit 201 in the third embodiment adjusts the display mode for the second icon 300A2 displayed near the first icon 300A1 operated by the user 12. As a result, the user 12 perceives as if the position of the first icon 300A1 along the Z direction has changed relative to the second icon 300A2. The user 12, perceiving as if the position of the first icon 300A1 along the Z direction has changed, is expected to perform a subsequent operation at the detection reference 40.

It is to be noted that a perception is created in the user 12 as if the second icon 300A2 has moved along the Z direction by adjusting the size (display mode) of the second icon 300A2 in the midair image, which is not the target of an operation performed by the user 12. This perception, in turn, causes the user 12 to perceive as if the position of the first icon 300A1 in the midair image 300 has moved along a direction opposite from the direction in which the second icon 300A2 has moved. However, a user 12 may perceive the position of the second icon 300A2 displayed as the second display to be the position of the first icon 300A1 in the first display, and such a user 12 may not perceive as if the position of the first icon 300A1 along the Z direction has moved along the direction opposite from the direction in which the second icon 300A2 has moved. Namely, the user 12, having perceived as if the second icon 300A2 has moved along the Z direction, may also perceive as if the first icon 300A1, too, has moved along the same direction. While it depends upon the particular user 12 as to whether or not the position of the second icon 300A2 is perceived to be located at the position of the first icon 300A1, the user 12 will more readily perceive the position of the second icon 300A2 to be located at the position of the first icon 300A1 when the second icon 300A2 and the first icon 300A1 are closely related to each other.

The second icon 300A2 and the first icon 300A1 are closely related to each other when the first icon 300A1 provided as the first display and the second icon 300A2 provided as the second display represent objects that are located close to each other, are in contact with each other, or are configured as integrated parts in the real world. As a general example other than an icon may be brought up on display, the display device 1 may display an image of a painting, as the first display and an image of a picture frame, as the second display. Since an actual painting is normally placed in a picture frame, the position of the picture frame and the position of the painting will match each other in the real world. For this reason, even when the position of the painting in the first display and the position of the picture frame in the second display are offset from each other along the Z direction in the midair image, the user 12 may perceive as if the painting in the first display is located at the position taken by the picture frame in the second display in the midair image. Likewise, when a shadow of the first display is displayed as an auxiliary image in the second display, as has been explained in reference to the first embodiment, the second embodiment and the like, the first display and the second display are closely related to each other. However, the phenomenon with respect to the user perception described above does not readily occur if the first display and the second display are not closely related to each other. For instance, if a midair image expressing an icon of a musical note is brought up as the second display and a midair image of a PET bottle is brought up as the first display, the user 12 will not readily perceive as if the first display is located at the position of the second display, since the PET bottle in the first display and the musical note icon in the second display are not closely related to each other, a musical note icon and a PET bottle are not often found near each other and a musical note icon and a PET bottle would likely never be an integrated whole in the real world.

By altering the display mode for the second display (second icon 300A2) as described above, the direction along which the depthwise position of the first display (first icon 300A1) changes in the user's perception is altered in correspondence to the relationship between the first display (first icon 300A1) and the second display (second icon 300A2).

(Variation 1 of the Third Embodiment)

It is to be noted that while the image generation unit 201 adjusts the display mode by altering the size of the second icon 300A2 in the example explained above, the present embodiment is not limited to this example. Examples of display mode adjustments for another midair image present around the first icon 300A1 will be explained next. In the examples described below, the other midair image is used as a monocular depth cue.

<1. Adjustment of the Display Position of the Second Icon 300A2>

Figure 31:
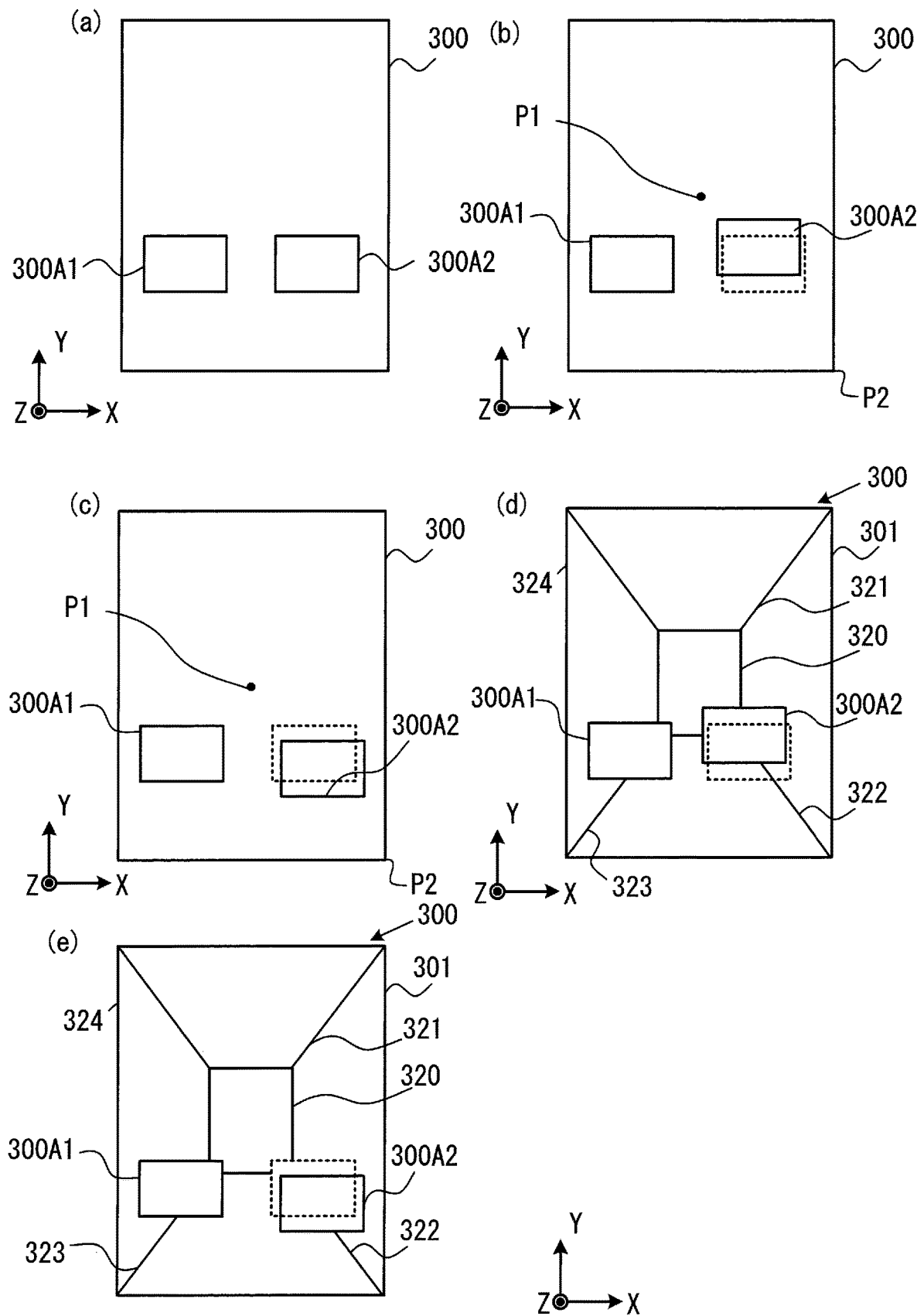

The image generation unit 201 may adjust the display mode by moving the display position of the second icon 300A2, provided as the second display, on the midair image 300. FIG. 31 provides a schematic presentation of an example of a midair image 300 that may be brought up. FIG. 31(a), similar to FIG. 30(a), shows an initial display. FIG. 31(b) shows the second icon 300A2 displayed at a position adjusted so as to create a perception in the user 12 as if the first icon 300A1 has moved closer to the user 12. FIG. 31(c) shows the second icon 300A2 displayed at a position adjusted so as to create a perception in the user 12 as if the first icon 300A1 has moved away from the user 12. Namely, the second icon 300A2 is used as a depth cue for the first icon 300A1. It is to be noted that while the second icon 300A2 in the initial display is indicated with the dotted lines in FIGS. 31(b) and 31(c), the initial display of the second icon is not actually brought up on display. In addition, while the center of the rectangular midair image 300 (i.e., the point at which its diagonals intersect each other) is indicated as a point P1 in FIGS. 31(b) and 31(c) to facilitate the explanation, the point P1 may or may not be displayed in the midair image 300.

In order to create a perception in the user 12 as if the second icon 300A2 has moved further away from the user 12, the image generation unit 201 moves the display position of the second icon 300A2 along a direction running closer to the point P1, as illustrated in FIG. 31(*b*). At this time, the image generation unit 201 moves the second icon 300A2 along a direction in which a line connecting the point P1 and a vertex P2 of the midair image 300 extends. As a result, the user 12 perceives as if the first icon 300A2 has moved closer to himself in reference to the second icon 300A2 displayed at the adjusted display position, and thus, the user 12 is expected to perform an operation at the detection reference 40.

In addition, in order to create a perception in the user 12 as if the second icon 300A2 has moved closer to the user 12, the image generation unit 201 moves the display position of the second icon 300A2 along a direction running away from the point P1, as illustrated in FIG. 31(*c*). At this time, too, the image generation unit 201 moves the second icon 300A2 along the direction in which the line connecting the point P1 and the vertex P2 of the midair image 300 extends. As a result, the user 12 perceives as if the first icon 300A2 has moved away from himself in reference to the second icon 300A2 displayed at the adjusted display position, and thus, the user 12 is expected to perform an operation at the detection reference 40.

It is to be noted that the image generation unit 201 may add a display that can be used as a depth cue for the first icon 300A1 and the second icon 300A2 in the midair image 300, so as to help the user 12 perceive the direction along which the second icon 300A2 moves. FIGS. 31(*d*) and 31(*e*) show how such a midair image 300 may be displayed in a schematic presentation. It is to be noted that FIG. 31(*d*) presents an example in which the display mode for the second icon 300A2 has been adjusted in a manner similar to that shown in FIG. 31(*b*), whereas FIG. 31(*e*) presents an example in which the display mode for the second icon 300A2 has been adjusted in a manner similar to that shown in FIG. 31(*c*). While the second icon 300A2 in the initial display is indicated with dotted lines in FIGS. 31(*d*) and 31(*e*), the initial display of the second icon is actually not brought up on display.

FIGS. 31(*d*) and 31(*e*) show that the image generation unit 201 may display reference lines 320 through 324, to be used as a depth cue, in a perspective form. In this case, the second icon 300A2 and the reference lines 320 through 324 may be regarded as a second display. In other words, the second icon 300A2 and the reference lines 320 through 324 are used as depth cues for the first icon 300A1. A perspective drawing, which simulates a three-dimensional space in a two-dimensional plane, expresses distance by using a plurality of straight lines. In the example presented in FIGS. 31(*d*) and 31(*e*), straight reference lines 321 through 324 are drawn running from the four vertices of a rectangular outline 301 of the midair image 300 toward the center of the rectangle, with a reference line 320 defining a rectangular shape smaller than the rectangular outline 301 set near the center of the rectangle. Namely, a pair of reference lines 321 and 323 constitute part of one of the diagonals of the rectangular outline 301, a pair of reference lines 322 and 324 constitute part of the other diagonal of the rectangular outline 301 and the point at which the diagonals intersect each other is equivalent to the center of the rectangular outline 301.

It is to be noted that while the shape defined by the reference line 320 is similar to the shape defined by the outline 301 in the example presented in FIGS. 31(*d*) and 31(*e*), it is not necessary that these shapes be similar. In addition, it is not necessary that the reference line 320 define a rectangular shape, and instead, it may define a circle, an ellipse or another polygon. Furthermore, it is not necessary that the reference line 320 be drawn.

The reference lines 321 through 324 are straight lines each connecting a vertex of the shape defined by the reference line 320 and a vertex of the shape of the outline 301 of the midair image 300. In a prospective drawn with these reference lines 320 through 324, a vanishing point (a remote point) at which parallel lines meet in the law of perspective is present near the point P1 at the center of the midair image 300. In other words, the reference lines 321 through 324 are a monocular depth cue. Accordingly, the user 12, looking at this midair image 300, experiences a visual perception as if an image set apart from the outline 301 and closer to the vanishing point, i.e., closer to the rectangular reference line 320 located near the central point P1, is located further away. It is to be noted that while there is a single vanishing point in the example presented in FIGS. 31(*d*) and 31(*e*), the present embodiment is not limited to this example and it may be adopted in conjunction with a perspective drawing having a plurality of vanishing points. In addition, while the reference lines 321 through 324 meet at the vanishing point in the example presented in FIGS. 31(*d*) and 31(*e*), the reference lines 321 through 324 do not necessarily extend all the way to the vanishing point.

<2. Adjustment of Sharpness of the Second Icon 300A2>

The image generation unit 201 may adjust the display mode by altering the sharpness. The image generation unit 201 increases the sharpness of the second icon 300A2 shown in FIG. 30(*a*) or FIG. 31(*a*) so as to create a user perception as if the icon 300A2 has moved closer to the user 12. Namely, it creates a user perception as if the first icon 300A1 has moved further away from the user 12 in relative terms. The image generation unit 201 decreases the sharpness of the second icon 300A2 so as to create a user perception as if the icon 300A2 has moved further away from the user 12. This means that the user 12 will experience a perception as if the first icon 300A1 has moved closer to the user 12 in relative terms. The image generation unit 201 adjusts the sharpness by altering the degree of blurring with which the second icon 300A2 is displayed or by altering the degree of whiteness (haziness) in the display of the second icon 300A2 based upon the concept of air perspective (the laws of air perspective).

The image generation unit 201 creates a user perception as if the second icon 300A2 has moved closer to the user 12 by reducing the degree of blurring at the edges of the second icon 300A2, or at a character, a pattern or the like superimposed over the icon and thus displaying it with better definition. The image generation unit 201 creates a user perception as if the second icon 300A2 has moved further away from the user 12 by increasing the degree of blurring at the edges of the second icon 300A2 or at a character, a pattern or the like superimposed thereupon. In addition, the image generation unit 201 creates a user perception as if the second icon 300A2 has moved closer to the user 12 by decreasing the degree of whiteness rendered at the second icon 300A2. The image generation unit 201 creates a user perception as if the second icon 300A2 has moved away from the user 12 by increasing the degree of whiteness rendered at the second icon 300A2.

The image generation unit 201 determines a change quantity representing the extent to which the sharpness of the second icon 300A2 is to be adjusted based upon the distance between the reach position or the specified position and the detection reference 40, and adjusts the sharpness of the second icon 300A2 based upon the change quantity thus determined. As a result, the user 12, perceiving as if the display position at which the first icon 300A1 is displayed in space has moved, is led to adjust the position at which he performs an operation with respect to the midair image 30.

It is to be noted that the display mode for the second icon 300A2 is adjusted through adjustment of the sharpness in the explanation provided above. The image generation unit 201 may also adjust the display mode for the second icon 300A2 by adjusting the sharpness, the size and the display position in an optimal combination.

<3. Adjustment of the Color of the Second Icon 300A2>

The image generation unit 201 may adjust the display mode by altering the color with which the second icon 300A2 in FIG. 30(a) or FIG. 31(a) is displayed. Under normal circumstances, an object taking on a cold color is perceived to be located further away than an object in the same size taking on a warm color. The image generation unit 201 creates a user perception as if the second icon 300A2 has moved further away from the user 12 by rendering the second icon 300A2 in a cold, receding color, such as blue. This means that the user 12, perceiving as if the first icon 300A1 has moved closer to the user 12, is expected to adjust the operation position (the reach position or the specified position).

The image generation unit 201 creates a user perception as if the second icon 300A2 has moved closer to the user 12 by rendering the second icon 300A2 in a warm, advancing color, such as red or yellow.

It is to be noted that in the example described above, the display mode is adjusted by altering the color of the second icon 300A2. However, the image generation unit 201 may adjust the display mode for the second icon 300A2 by adjusting the color, the sharpness, the size and the display position in an optimal combination.

<4. Adjustment of the Luminance of the Second Icon 300A2>

The image generation unit 201 may adjust the display mode by altering the luminance with which the second icon 300A2 in FIG. 30(a) or FIG. 31(a) is displayed. The image generation unit 201 decreases the luminance of the second icon 300A2, thus rendering it darker, so as to create a user perception as if the second icon 300A2 has moved further away from user 12. The image generation unit 201 increases the luminance of the second icon 300A2 and thus renders it brighter so as to create a user perception as if the second icon 300A2 has moved closer to the user 12.

In this example, as the luminance of the second icon 300A2 is raised and thus its brightness increases, the user 12 may perceive as if the second icon 300A2 is located closer to the user 12. Namely, the user 12, perceiving as if the first icon 300A1 is located further away from the user 12, is expected to adjust the operation position (the reach position or the specified position).

It is to be noted that in the example described above, the display mode is adjusted by altering the luminance of the second icon 300A2. However, the image generation unit 201 may adjust the display mode for the second icon 300A2 by adjusting the luminance, the color, the sharpness, the size and the display position in an optimal combination.

<5. Overlap of the Second Icon 300A2 and the First Icon 300A1>

Figure 32:
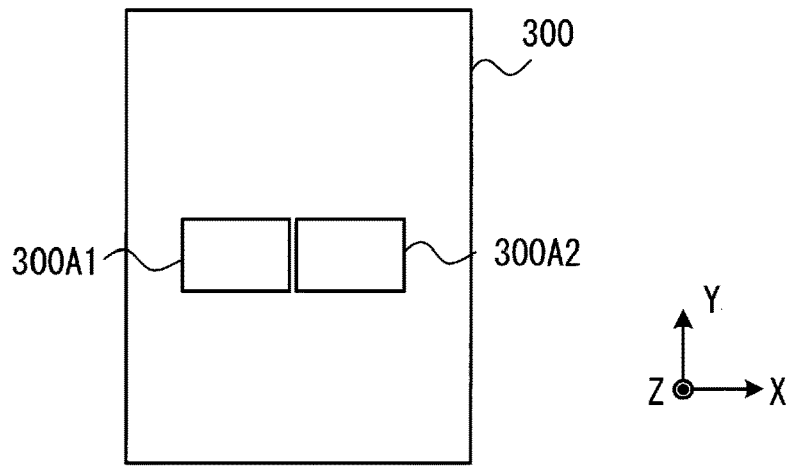
Figure 32:
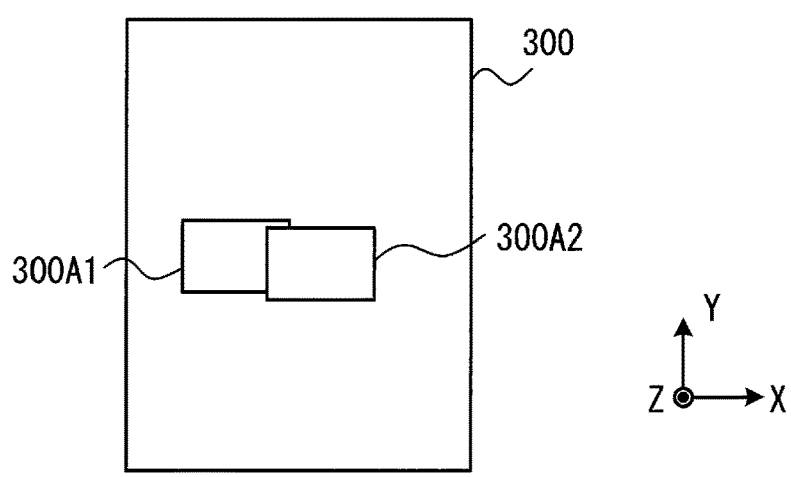
Figure 32:
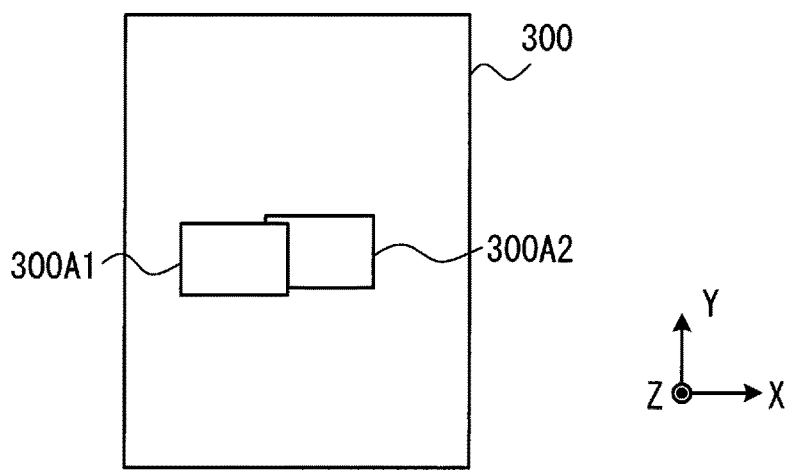

The image generation unit 201 may adjust the display mode by altering the extent to which the first icon 300A1 overlaps with the second icon 300A2. FIG. 32 schematically illustrates a midair image 300. FIG. 32(a) shows a first icon 300A1 and a second icon 300A2 in an initial display. FIG. 32(b) shows the first icon 300A1 and the second icon 300A2 overlapping each other with part of the first icon 300A1 hidden behind the second icon 300A2, as a result of an adjustment in the display mode for the second icon 300A2 made by the image generation unit 201. In this situation, the user 12 perceives as if the first icon 300A1 takes a position further away from the user 12 relative to the second icon 300A2. Namely, when the reach position or the specified position is located closer to the user 12 (toward the Z direction + side) relative to the detection reference 40 (see FIG. 5(b)), the image generation unit 201 adjusts the display mode for the second icon 300A2 as shown in FIG. 32(b).

FIG. 32(c) shows the first icon 300A1 and the second icon 300A2 with part of the second icon 300A2 hidden behind the first icon 300A1, as a result of an adjustment in the display mode for the second icon 300A2 made by the image generation unit 201. In this situation, the user 12 perceives as if the first icon 300A1 takes a position closer to the user 12 relative to the second icon 300A2. Namely, when the reach position or the specified position is located further away from the user 12 (toward the Z direction − side) relative to the detection reference 40 (see FIG. 5(d)), the image generation unit 201 adjusts the display mode for the second icon 300A2 as shown in FIG. 32(c).

The image generation unit 201 calculates an extent to which the first icon 300A1 and the second icon 300A2 are to overlap based upon the distance between the reach position or the specified position and the detection reference 40, and adjusts the extent of overlap of the first icon 300A1 and the second icon 300A2. Thus, the user 12, perceiving as if the position at which the first icon 300A1 is displayed in midair has moved, is led to adjust the position at which he performs an operation for the midair image 30.

In addition, the image generation unit 201 may incorporate an effect rendered through motion parallax. Namely, while the image generation unit 201 moves the second icon 300A2 from the position in the initial display shown in FIG. 32(a), it may alter the extent to which the first icon 300A1 and the second icon 300A2 overlap, as time elapses. Through these measures, the perceived movement of the second icon 300A2 along the depthwise direction can be accentuated.

It is to be noted that in the example described above, the display mode is adjusted for the second icon 300A2 by altering the extent to which it overlaps the first icon 300A1. However, the image generation unit 201 may adjust the display mode for the second icon 300A2 by adjusting the extent of overlap with the first icon 300A1, the luminance, the color, the sharpness, the size and the display position in an optimal combination.

<6. Adjustment of the Shadow Added to the First Icon 300A1>

Figure 33:
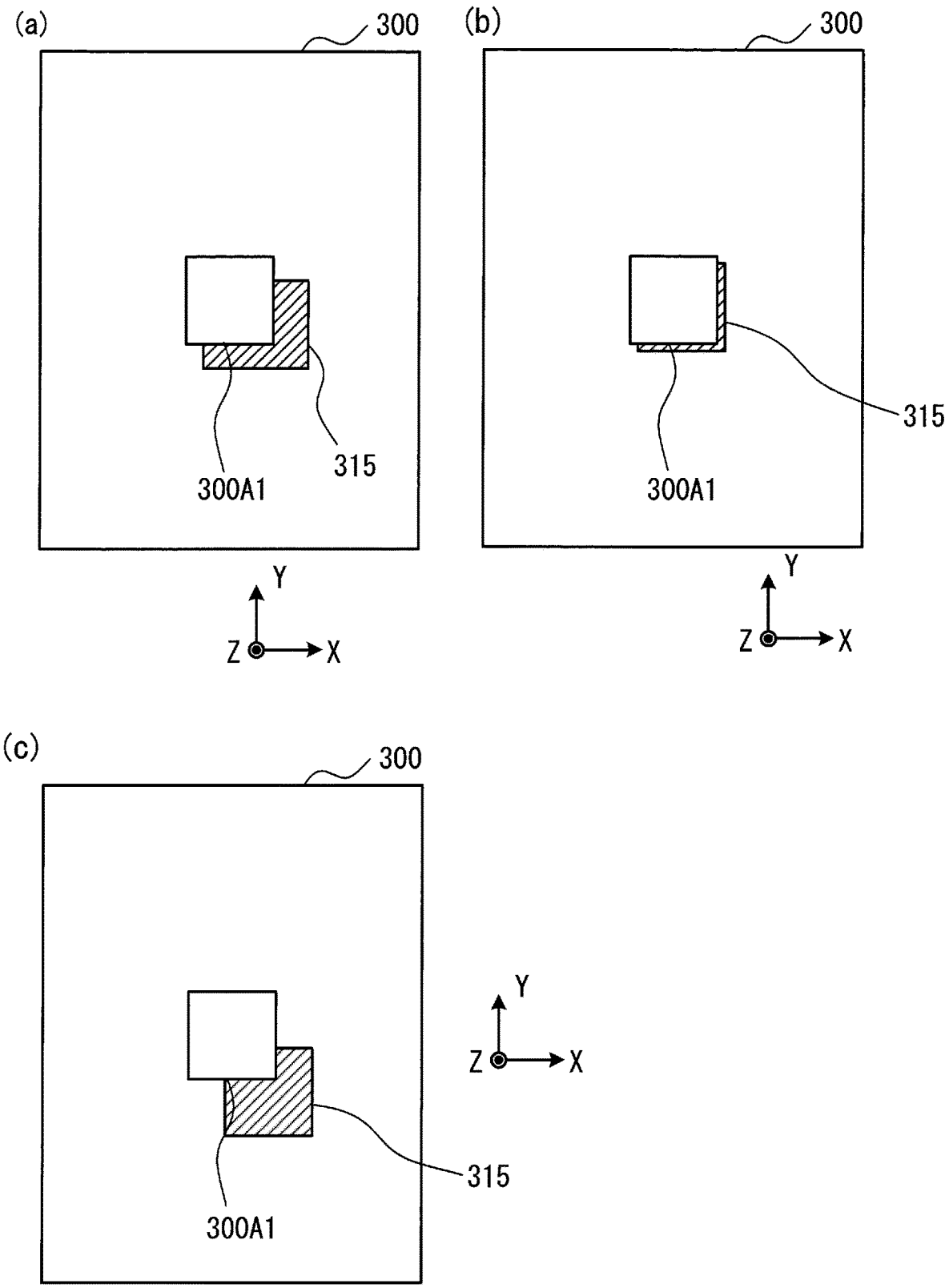

The image generation unit 201 may generate display image data that includes a shadow added to a first icon 300A1. The image generation unit 201 may then alter the shadow added to the first icon 300A1. FIG. 33 provides schematic illustrations, each showing an example of a shadow image 315 that may be formed when hypothetical light is cast on the first icon 300A1 from above. The shadow image 315 formed in correspondence to the first icon 300A1 take different areas in FIG. 33(a), FIG. 33(b) and FIG. 33(c). It is to be noted that the first icon 300A1 assumes the same size and the same display position in the midair images 300 in FIG. 33(a) through FIG. 33(c).

The shadow image 315 in FIG. 33(b) assumes an area smaller than that of the shadow image 315 in FIG. 33(a). The first icon 300A1 in FIG. 33(b), with the shadow image 315 assuming a smaller area, is perceived to be set apart from the shadow image 315 by a smaller distance compared to the distance between the first icon 300A1 shown in the initial display and its corresponding shadow image 315. Namely, the user 12 perceives as if the first icon 300A1 shown in FIG. 33(b) is located further away from the user 12 compared to the first icon 300A1 shown in FIG. 33(a).

The first icon 300A1 shown in FIG. 33(c), with the corresponding shadow image 315 assuming a large area, will be perceived to be set apart from the shadow image 315 over a greater distance compared to the distance between the first icon 300A1 in the initial display shown in FIG. 33(a) and its shadow image 315. Namely, the user 12 perceives as if the first icon 300A1 shown in FIG. 33(c) is located closer to the user 12 compared to the first icon 300A1 in the initial display. The image generation unit 201 incorporates this effect and creates a user perception as if the first icon 300A1 has moved further away from or closer to the user 12 by controlling the area of the shadow image 315 corresponding to the first icon 300A1. Assuming that the midair image 300 in FIG. 33(a) is brought up in the initial display, the image generation unit 201 brings up on display the midair image 300 in the initial display shown in FIG. 33(b) if the reach position 50 is located above the detection reference 40 (see FIG. 5(b)) during the calibration processing. If the reach position 50 is below the detection reference 40 (see FIG. 5(d)) during the calibration processing, the image generation unit 201 brings up on display the midair image 300 in FIG. 33(c).

The image generation unit 201 executes processing for adding a shadow to the icon 300A1 based upon the positional relationship between the user operation and the detection reference 40. As a result, the user, perceiving as if the display position of the icon 300A1 has moved, is led to adjust the position at which he performs an operation.

It is to be noted that in the example described above, the display mode is adjusted through the addition of a shadow image 315. However, the image generation unit 201 may adjust the display mode for the first icon 300A1 by adding the shadow image 315, adjusting the extent of overlap with the second icon 300A2, adjusting the luminance, adjusting the color, adjusting the sharpness, adjusting the size and adjusting the display position in an optimal combination.

It is to be noted that the image generation unit 201 may adjust the display mode by adopting one of the examples of display mode adjustment methods having been explained in reference to in variation 1 of the third embodiment, or it may execute display mode adjustment by combining a plurality of display mode adjustment methods. For instance, the image generation unit 201 may adjust at least one of; the display position of an icon 30A, the size of an icon 30A and the luminance of an icon 30A, based upon the positional relationship between the position at which the user 12 performs an operation and the detection reference 40.

In addition, while examples of display mode adjustment that enable the user 12 to perceive a change occurring in the depthwise position of the first icon 300A1 based upon a monocular cue have been explained above, the present embodiment is not limited to these examples. Namely, the depthwise position of the second icon 300A2 used as a depth cue may be altered through a binocular parallax effect so as to create a perception in the user 12 as if the depthwise position of the first icon 300A1 has changed. For instance, the display device 1 may adopt a structure for midair image generation that allows a parallax image to be brought up via the display unit 11. Namely, the image generation unit 201 may generate an image perceived by the user 12 to have a depth different from the depth of an image displayed at a display unit by displaying an image to be viewed with the right eye and an image to be viewed with the left eye, which manifests a parallactic offset relative to the image viewed with the right eye. The second icon 300A2 may be displayed as an image having a different depth through this method. In more specific terms, the image generation unit 201 may create a perception in the user 12 as if the depth of the second icon 300A2 has changed by adjusting the parallactic offset in the parallax image. The image forming optical system 9 in such a display device may be configured by using, for instance, a lenticular lens of the known art. By altering the depthwise position of the second icon 300 used as a binocular depth cue, as described above, a perception as if the depthwise position of the first icon 300A1 has changed may be created in the user 12.

While the image generation unit 201 displays the second icon 300A2 as the second display in the third embodiment and variation 1 thereof described above, the present invention is not limited to this example. For instance, the image generation unit 201 may display a frame, a desk, a chair, a stage or the like as the second display.

(Variation 2 of the Third Embodiment)

As explained earlier, even a single user 12 may experience different perceptions with respect to the display position of a midair image due to the transmissivity of the midair image. This means that the user 12 may not be able to accurately perceive the position of the midair image and thus, the operation performed by the user 12 may not be detected at the detection reference. Namely, the user 12 may perceive that the midair image position is unstable.

In order to allow the user 12 to perceive the display position of an icon in a midair image with better accuracy in reference to an actual physical object by reducing the extent of instability with respect to the midair image position explained above, the image generation unit 201 displays a midair image in the second display, different from the icon in the first display, so that the midair image in the second display overlaps (connects with) an actual physical object. Namely, the user 12 is able to perceive the icon display position in reference to the physical object via the midair image in the second display. The following is a detailed explanation of this concept.

Figure 34:
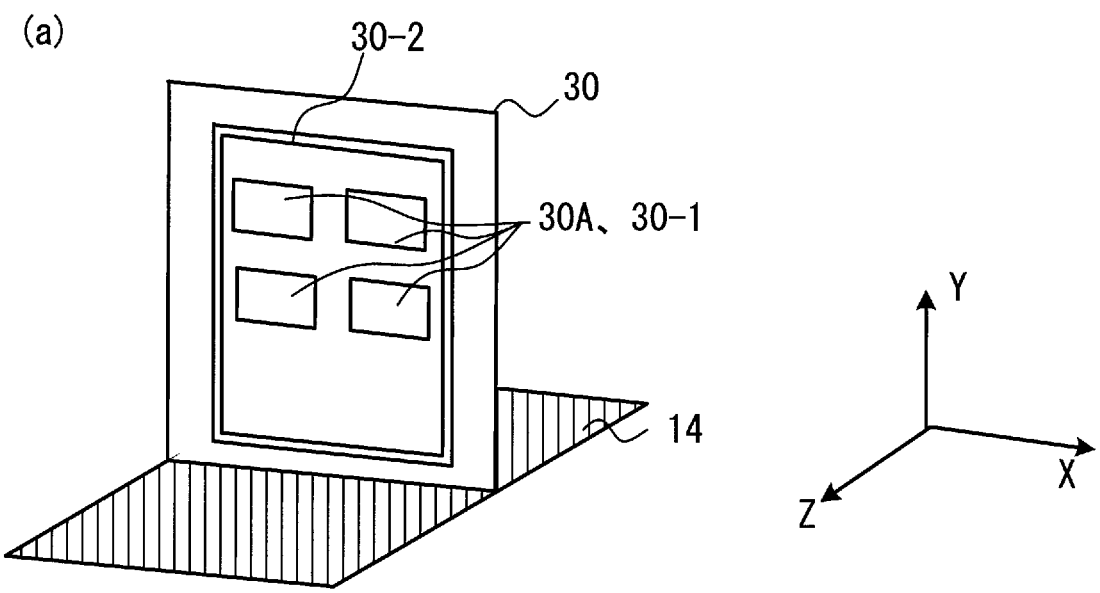
Figure 34:
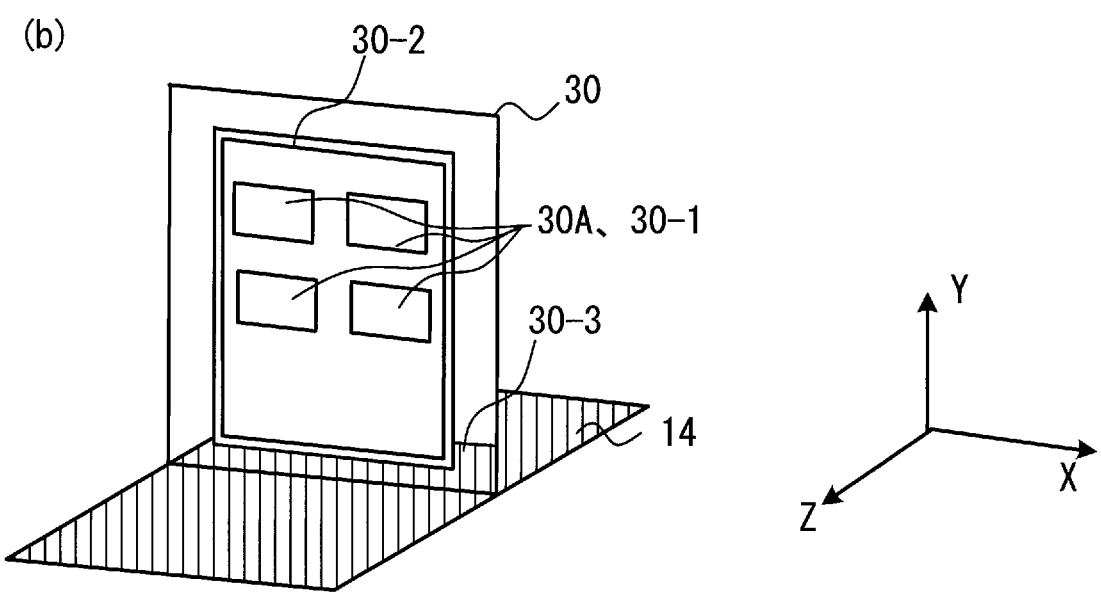

FIG. 34 schematically illustrates a midair image 30 displayed by the display device 1 in variation 2 of the third embodiment and a stage 14. A striped pattern is formed at the surface of the stage 14 (the surface located on the Y direction + side). FIG. 34(a) shows a first midair image 30-1 constituting the first portion of the midair image 30 and a second midair image 30-2 constituting the second portion of the midair image 30. In the example presented in FIG. 34, the first midair image 30-1 constituting the first display includes four icons 30A. It is to be noted that the quantity of the icons 30A is not limited to this example and the midair image 30-1 may include icons 30A in quantities other than four. The second midair image 30-2 provided as the second display is an image of a panel on which the icons 30A are set. The image generation unit 201 generates display image data expressing the second midair image 30-2 placed upon the stage 14. Namely, the image generation unit 201 generates display image data expressing the second midair image 30-2 appearing to overlap the stage 14, which is an actual physical object. This means that the image generation unit 201 generates display image data that include the second midair image 30-2 displayed under the first midair image 30-1 (toward the Y direction − side). Since the position taken by the stage 14 on the display device 1 is stable, the user 12 is able to visually perceive an icon 30A in relation to the second midair image 30-2 displayed so as to appear to be placed upon the physical stage 14 as a depth cue. As a result, the user 12 is able to perceive the relative positional relationship of icon 30A to the stage 14, i.e., the position of the icon 30A along the Z direction, as a stable positional relationship.

Even when the midair image 30 is displayed so that the second midair image 30-2 appears to be placed on the stage 14 as described above, a given user 12 may perceive that the second midair image 30-2 is set apart from the stage 14. In other words, there may be a user 12 who perceives as if the second midair image 30-2 is not placed upon the stage 14. The occurrence of such a situation may be prevented by the image generation unit 201 by generating display image data that include an additional third midair image to be displayed over the area where the second midair image 30-2 overlaps the stage 14 as shown in FIG. 34(*a*). FIG. 34(*b*) shows such a midair image 30. The first midair image 30-1 and the second midair image 30-2 are similar to those in the example presented in FIG. 34(*a*). A third midair image 30-3 may correspond to, for instance, an image expressing the surface of the stage 14 in the vicinity of the bottom of the second midair image 30-2. In this case, the image generation unit 201 generates display image data corresponding to the third midair image 30-3 by using image-capturing data obtained by capturing an image of, for instance, the pattern on the surface of the stage 14, via an image-capturing device or the like. Since this will create a perception in the user 12 as if the second midair image 30-2 is placed on the stage 14, the user 12 will be able to perceive that the icon 30A assumes a more stable position along the Z direction in reference to the stage 14 via the third midair image 30-3.

It is to be noted that the image generation unit 201 may generate display image data expressing the second midair image 30-2 and the first midair image 30-1 at least partially overlapping each other while the second midair image 30-2 appears to overlap the stage 14 via the third midair image 30-3, as explained above. In such a case, the image generation unit 201 displays the first midair image 30-1 and the second midair image 30-2 so that they appear to be in contact with each other without any gap present between them. For instance, the image generation unit 201 may generate display image data expressing a bottle or a PET bottle as the first midair image 30-1, which appears to be placed on a desk displayed as the second midair image 30-2. Since the first midair image 30-1 overlaps the second midair image 30-2 which is visually recognized as a stable image relative to the physical stage 14, the user 12 will be able to view the first midair image 30-1 as a more stable image.

The image generation unit 201 in variation 2 of the third embodiment displays the second midair image 30-2 between the first midair image 30-1 and the physical object (stage 14) disposed further downward (toward the Y direction − side) relative to the first midair image 30-1. As a result, the user 12 is able to easily perceive the position of the first midair image 30-1 in space in reference to the stage 14 via the second midair image 30-2.

In addition, the image generation unit 201 in variation 2 of the third embodiment displays the second midair image 30-2 so as to appear to partially overlap the stage 14. As a result, the user 12, looking at the icons 30A via the second midair image 30-2, displayed so as to appear to be placed on the stage 14, is able to perceive the relative positional relationship between the icons 30A and the stage 14 as a stable positional relationship.

In addition, the image generation unit 201 in variation 2 of the third embodiment displays a third midair image 30-3 corresponding to the stage 14 over the area of the second midair image 30-2 that overlaps the stage 14. The user 12, perceiving that the second midair image 30-2 is placed on the stage 14, is thus able to perceive the position of the icons 30A along the Z direction, in reference to the stage 14 via the second midair image 30-2 and the third midair image 30-3.

The image generation unit 201 in variation 2 of the third embodiment displays the second midair image 30-2 so that it partially overlaps the first midair image 30-1. Since this creates a perception in the user 12 as if the first midair image 30-1 and the second midair image 30-2 take matching positions along the Z direction, the user 12 is able to perceive the position of an icon 30A along the Z direction in reference to the stage 14 via the second midair image 30-2 and the third midair image 30-3.

(Variation 3 of the Third Embodiment)

While the display mode for a midair image provided as the second display around a midair image brought up as the first display in a midair image 30 or 300 is adjusted in the third embodiment and variations 1 and 2 thereof described above, the present embodiment is not limited to this example. The display device 1 may instead include an actual physical object such as a frame near the position at which the midair image 30 is displayed and an index mark or the like, which will help the user 12 perceive the depthwise position of a first icon 300A1, may be displayed at the frame. The display device 1 creates a perception in the user 12 as if the depthwise position of the first icon 300A1 has moved by altering the display mode for the index mark or the like. In this case, the index mark or the like is used as a depth cue with respect to the first icon 300A1. The following is a detailed explanation.

Figure 35:
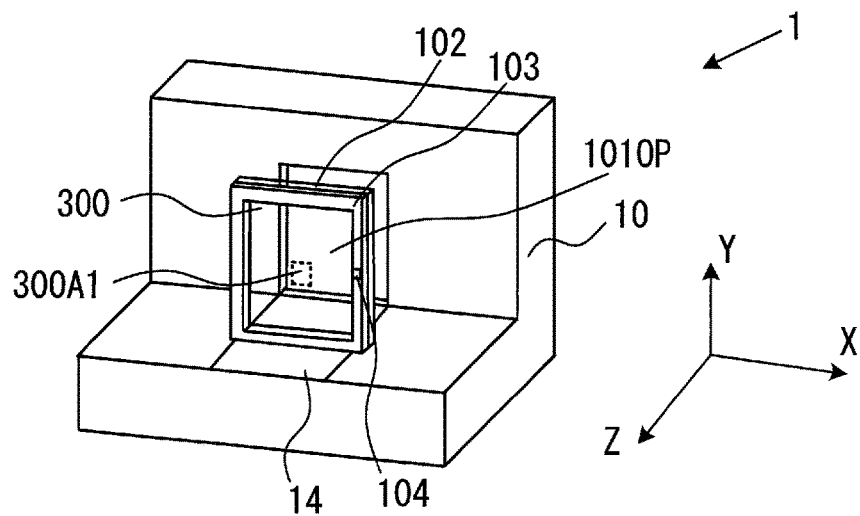
Figure 35:
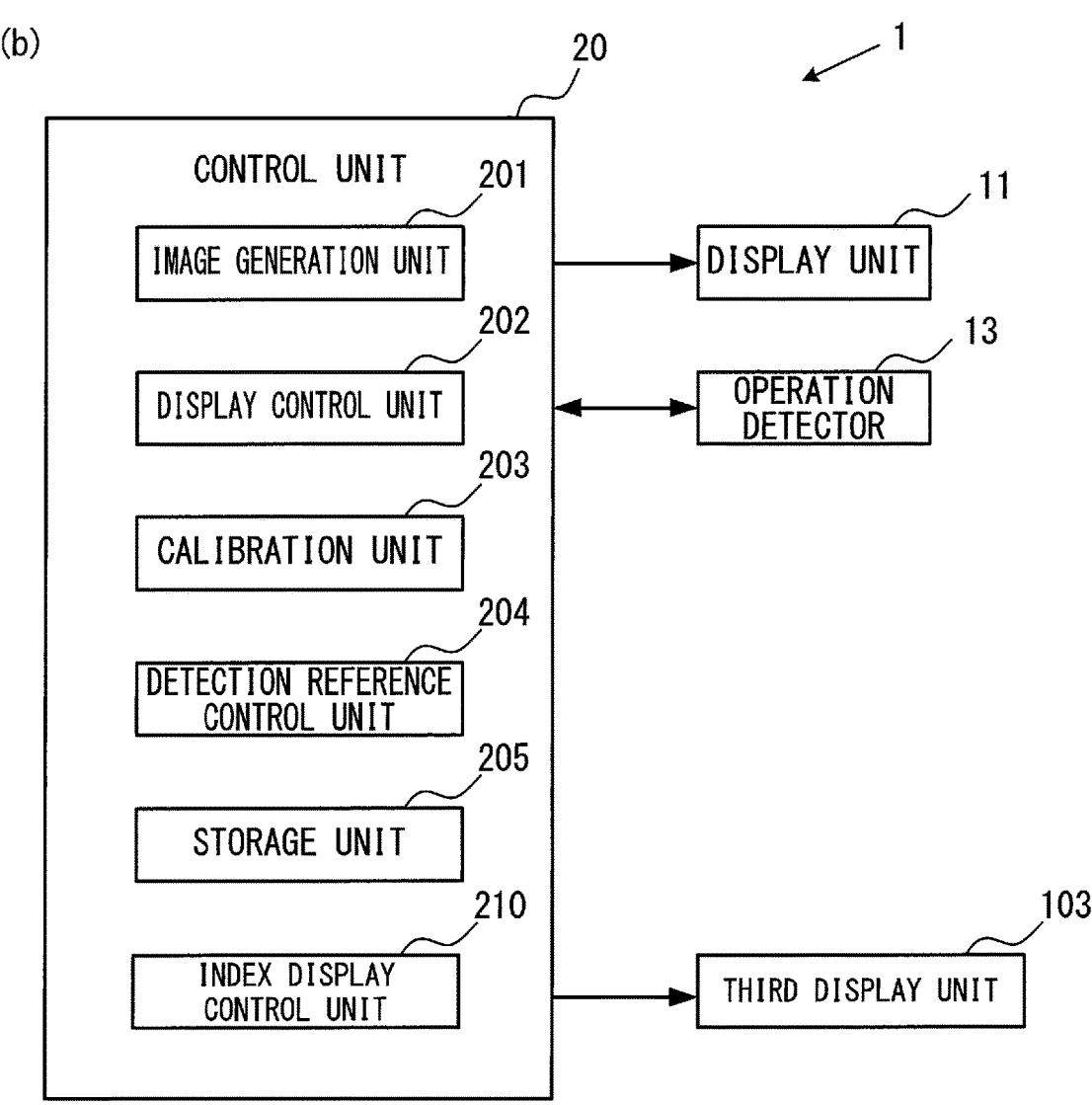

FIG. 35(*a*) presents an external view of the display device 1 in a perspective. This display device 1 includes a frame 102, disposed on the stage 14 in the display device 1 in the third embodiment shown in FIG. 29, and a third display unit 103. FIG. 35(*b*) is a block diagram showing the essential configuration of the display device 1. FIG. 35(*b*) is a block diagram showing a control unit 20, and a display unit 11, an operation detector 13 and a third display unit 103, which are controlled by the control unit 20. In addition to the functions of the control unit 20 in the third embodiment shown in FIG. 29(*b*), the control unit 20 includes an index display control unit 210 that controls the display at the third display unit 103.

It is to be noted that the third display unit 103 may include a control unit that controls the display at the third display unit 103. In such a case, the control unit will control the display at the third display unit 103 based upon control signals provided by the index display control unit 210.

At a body 10 of the display device 1, the frame 102, which is a physical object, is disposed on the stage 14 so as to range parallel to the XY plane. The frame 102 has an opening 102OP and a midair image 300 is displayed in the opening 102OP. The third display unit 103, which may be, for instance, a liquid crystal monitor, is disposed at the surface of the frame 102 located on the + side along the Z direction so that display content can be viewed from the Z direction + side. An index mark 104, which is used as a guide for the user 12 looking at the midair image 300 to help him ascertain the display position of the midair image 300 in space, is displayed at the third display unit 103. The index display control unit 210 controls the third display unit 103 to start display of the index mark 104 when starting the midair image operation mode upon starting up the display device 1 or when starting a calibration processing mode upon starting up the display device 1.

Figure 36:
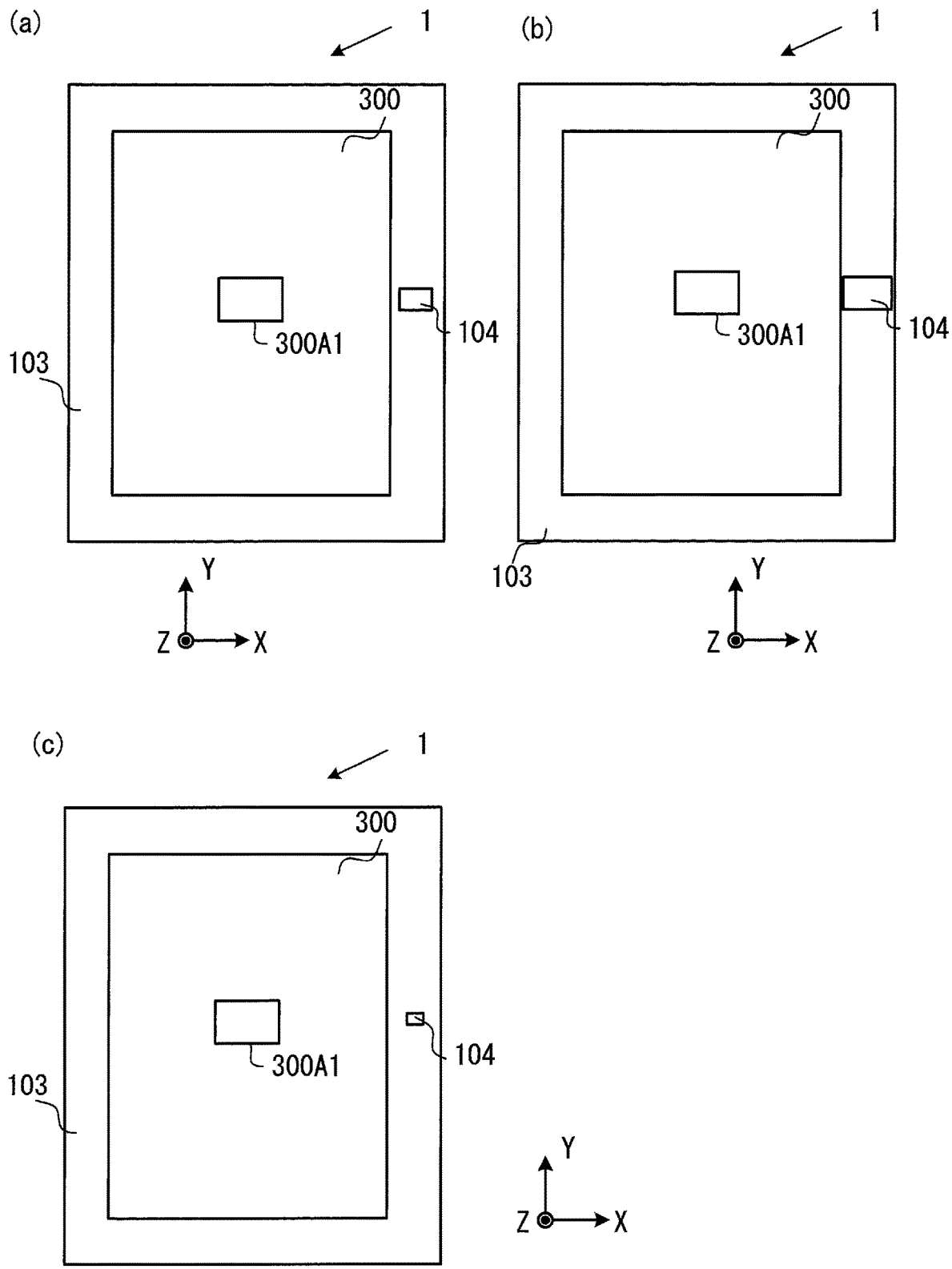
FIG. 36 A schematic presentation of a midair image and an index mark brought up on display in variation 3 of the third embodiment

FIG. 36 schematically illustrates how the midair image 300 and the index mark 104 may be displayed. A rectangular mark is displayed as the index mark 104 in FIG. 36. It is to be noted that the index mark 104 does not need to be a rectangle and may instead be a circle or a symbol such as an arrow or a star or a character such as an alphabet letter. In addition, while a single index mark 104 is displayed on the display surface of the third display unit 103 located on the + side along the X direction in the example presented in FIG. 36, the present embodiment is not limited to this example and a plurality of index marks may be displayed. Furthermore, a single index mark 104 or a plurality of index marks 104 may be displayed at the display surface of the third display unit 103 located on the − side along the X direction, on the + side along the Y direction or on the − side along the Y direction.

FIG. 36(*a*) shows a first icon 300A1 and the index mark 104 in an initial display. Processing executed when the reach position or the specified position with respect to an operation performed by the user 12 for the first icon 300A1 in the initial display is closer to the user 12 (toward the Z direction + side) relative to the first icon 300A1, as shown in FIG. 5(*b*), will be explained below. In this situation, the index display control unit 210 creates a perception in the user 12 as if the first icon 300A1 has moved further away from the user 12 (toward the Z direction − side) by adjusting the display mode for the index mark 104. In the example described below, the index display control unit 210 adjusts the display mode for the index mark 104 by altering its size.

FIG. 36(*b*) presents an example of a display that may be brought up with an adjustment made in the display mode for the index mark 104. In this case, the index display control unit 210 increases the size of the index mark 104 over the size of the index mark 104 in the initial display. The index display control unit 210 increases the size of the index mark 104 based upon the distance between the reach position or the specified position and the detection reference 40. The user 12, looking at the first icon 300A1, experiences a perception as if the first icon 300A1 takes a position further toward the Z direction − side relative to the index mark 104 displayed in a greater size. As a result, the user 12 is expected to perform an operation further toward the Z direction − side, allowing the reach position or the specified position to be detected at the detection reference 40.

Next, processing executed when the reach position or the specified position with respect to an operation performed by the user 12 for the first icon 300A1 in the initial display is performed beyond the first icon 300A1 (toward the Z direction − side), as shown in FIG. 5(*d*), will be explained below. In this situation, the index display control unit 210 creates a perception in the user 12 as if the first icon 300A1 has moved closer to the user 12 (toward the Z direction + side) by adjusting the display mode for the index mark 104.

FIG. 36(*c*) presents an example of a display that may be brought up with an adjustment made in the display mode for the index mark 104. In this case, the index display control unit 210 decreases the size of the index mark 104 over the size of the index mark 104 in the initial display. The index display control unit 210 decreases the size of the index mark 104 based upon the distance between the reach position or the specified position and the detection reference 40. The user 12, looking at the first icon 300A1, experiences a perception as if the first icon 300A1 takes a position further toward the Z direction + side relative to the index mark 104 displayed in a smaller size. As a result, the user 12 is expected to perform an operation further toward the Z direction + side, allowing the reach position or the specified position to be detected at the detection reference 40.

It is to be noted that the relationship of the size of the index mark 104 to the distance between the reach position or the specified position and the detection reference 40 is stored in the storage unit 205 as correlation data indicating their correlation determined in advance based upon the results of testing or the like. The index display control unit 210 alters the size of the index mark 104 by referencing the correlation data.

In addition, while the index display control unit 210 adjusts the display mode for the index mark 104 by altering its size in the description provided above, the present embodiment is not limited to this example. The index display control unit 210 may instead adjust the display mode by adjusting the sharpness, the color or the luminance, as has been explained in reference to the various examples of variation 1.

Furthermore, while the index display control unit 210 adjusts the display mode for the index mark 104 in the description provided above, the present embodiment is not limited to this example. For instance, the third display unit 103 may include a control unit and in such a case, this control unit may adjust the display mode for the index mark 104 in the same way as does the index display control unit 210.

The calibration processing executed in the display device 1 set in the first calibration processing mode will be explained next. In this case, in step S3 in the flowchart presented in FIG. 7 in reference to which the first embodiment has been described, the display control unit 202 brings up a midair image 300 in an initial display and the index display control unit 210 brings up the index mark 104 at the third display unit 103 in an initial display (see FIG. 36(*a*)). In step S6 in FIG. 7, the index display control unit 210 calculates a change quantity representing the extent to which the display mode for the index mark 104 is to be adjusted. In step S8 in FIG. 7, the display control unit 202 displays the midair image 300 and the index display control unit 210 displays the index mark 104 at the third display unit 103 in a display mode having been adjusted based upon the change quantity (see FIGS. 36(*a*) and 36(*c*)).

It is to be noted that the calibration processing will be executed in the second calibration processing mode as shown in the flowchart presented in FIG. 9 in reference to which the first embodiment has been described. However, instead of the processing in step S28 and S32 in the flowchart in FIG. 9, the index display control unit 210 calculates a change quantity with respect to the display mode for the index mark 104 and displays the index mark 104 at the third display unit 103 in a display mode having been adjusted based upon the change quantity.

It is to be noted that while the display device 1 in the third embodiment and its variations 1 through 3 described above includes at least the control unit 20, the display unit 11 and the operation detector 13, the present embodiment may instead be adopted in a control device configured with the control unit 20 alone or a control device configured with the control unit 20 and the operation detector 13. In addition, the control unit 20 only needs to include, at least, the calibration unit 203 and the image generation unit 201. A structural element among the structural elements described above may be added as needed in order to realize the various advantages described in reference to the third embodiment or variation 1. Furthermore, the control device described above may be built into any of the various types of electronic devices adopting the first embodiment and the variations thereof.

Moreover, the present embodiment may be adopted in a detection device configured with the control unit 20 alone or a detection device configured with the control unit 20 and the operation detector 13. In addition, the control unit 20 only needs to include at least the calibration unit 203 and the image generation unit 201. In order to enable such a detection device to achieve the various advantages described in reference to the third embodiment or variations 1 through 3, a structural element among the structural elements described earlier may be added into the detection device as deemed necessary.

In all the embodiments and variations described above, a midair image may be generated by condensing laser light in midair and forming plasma with air molecules so as to emit light in midair. Through this method, a three-dimensional image is generated as a real image in midair by controlling the laser light condensing position at any desired position in the three-dimensional space. In another midair image generation method, an image may be generated in midair via a display device having a function of creating fog in the air in addition to a projector function by creating a screen with the fog in the air and projecting an image onto the screen formed with the fog (fog display).

A program enabling the various types of processing to be executed at the display device 1 to move the position of a midair image 30 may be recorded into a computer-readable recording medium, and the calibration may be executed based upon the program read into a computer system. It is to be noted that the "computer system" in this context may include an OS (operating system) and hardware such as peripheral devices.

It is to be also noted that the "computer system" may include a homepage provider environment (or a display environment) in conjunction with the WWW system. In addition, the "computer-readable recording medium" may be a non-volatile writable memory such as a flexible disk, a magneto-optical disk, a ROM or a flash memory, a portable medium such as a CD-ROM, or a storage device such as a hard disk built into a computer system. Furthermore, the "computer-readable recording medium" may be a storage medium capable of holding a program over a specific length of time, such as a volatile memory (e.g., DRAM (dynamic random access memory)) in a computer system functioning as a server or a client when the program is transmitted via a communication network such as the Internet or via a communication line such as a telephone line.

The "program" stored in a storage device or the like in a computer system may be transmitted to another computer system via a transmission medium or on a transmission wave in a transmission medium. The "transmission medium" through which the program is transmitted in this context refers to a medium having a function of information transmission, examples of which include a network (communication network) such as the Internet and a communication line such as a telephone line. The program described above may enable only some of the functions described earlier. Furthermore, the program may be a differential file (differential program) that works in conjunction with a program already recorded in the computer system so as to enable the functions described earlier.

As long as the features characterizing the present invention remain intact, the present invention is in no way limited to the particulars of the embodiments described above and other modes or combinations that are conceivable within the technical teaching of the present invention are also within the scope of the invention.

The disclosure of the following priority application is herein Incorporated by reference:

Japanese Patent Application No. 2016-128211 filed Jun. 28, 2016

REFERENCE SIGNS LIST

1 . . . display device, 9 . . . image-forming optical system, 11 . . . display unit, 13 . . . operation detector, 15 . . . projector, 18 . . . image-capturing device, 19 . . . sound collector, 20 . . . control unit, 91 . . . second display unit, 103 . . . third display unit, 200 . . . projector control unit, 201 . . . image generation unit, 202 . . . display control unit, 203 . . . calibration unit, 204 . . . detection reference control unit, 206 . . . velocity•acceleration detection unit, 207 . . . reach position predicting unit, 208 . . . sound detection unit, 209 . . . image analysis unit, 210 . . . drive control unit, 212 . . . detection unit, 213 . . . decision-making unit

The invention claimed is:

1. A control device for controlling a detection unit configured to detect an operation performed by a user to a first image that is displayed in midair, the control device comprising:
an acquisition unit configured to ascertain a positional relationship between a position of a detection reference used to detect the operation and a position at which the operation is detected; and
a display control unit configured to control a display mode of a second image based upon the positional relationship, wherein:
the control device is configured to adjust, without adjusting a display mode of the first image, a brightness of the second image that is displayed at a different position from where the first image is displayed;
the operation is a pressing operation performed by the user to press at a position of the first image;
the second image represents a shadow of the first image; and
the display control unit is further configured to move the shadow so that, from a point of view of the user, the shadow moves either toward the user or away from the user along a direction determined based upon the pressing operation.

2. The control device according to claim 1, wherein:
the control device adjusts the position of the detection reference in a case that the detection unit does not detect the operation during a predetermined period from beginning a detection of the operation.

3. The control device according to claim 2, wherein the detection unit detects the operation performed by the user to the first image without detecting an action of the user to the second image.

4. The control device according to claim 1, wherein:
the display control unit changes the display mode of the second image in a case that the detection unit does not detect the operation during a predetermined period from beginning a detection of the operation.

5. The control device according to claim 1, wherein:
the display mode of the second image is at least one of a display position, size, a display image, luminance distribution and display density.

6. The control device according to claim 1, wherein:
the position of the detection reference has a three dimensional area; and
a part of the user or a member operated by the user that reaches to the three dimensional area is detected as the operation performed by the user.

7. A display device comprising the control device according to claim 1.

8. The control device according to claim 1, comprising a processor and associated memory, wherein
the processor is programmed to function as the acquisition unit and is configured to adjust the brightness of the second image.

9. The control device according to claim 1, wherein
the control device is configured to adjust, without adjusting the display mode of the first image, the position of the detection reference based upon the positional relationship ascertained by the acquisition unit.

10. The control device according to claim 1, wherein the second image is darker than the first image.

11. The control device according to claim 1, wherein
the control device changes the brightness of the second image according to the operation performed by the user.

12. The control device according to claim 1, wherein
the controller changes the brightness of the second image according to a response to the operation performed by the user to the first image.

13. A method for detecting an operation performed by a user to a first image that is displayed in midair, the method comprising:
ascertaining a positional relationship between a position of a detection reference used to detect the operation and a position at which the operation is detected;
controlling a display mode of a second image based upon the positional relationship; and
without adjusting a display mode of the first image, adjusting a brightness of the second image that is displayed at a different position from where the first image is displayed, wherein:
the operation is a pressing operation performed by the user to press at a position of the first image;
the second image represents a shadow of the first image; and
the method further comprises moving the shadow so that, from a point of view of the user, the shadow moves either toward the user or away from the user along a direction determined based upon the pressing operation.

* * * * *